United States Patent [19]

Bernardis et al.

[11] Patent Number: 4,782,517
[45] Date of Patent: Nov. 1, 1988

[54] SYSTEM AND METHOD FOR DEFINING AND PROVIDING TELEPHONE NETWORK SERVICES

[75] Inventors: Jeffrey J. Bernardis, Belle Mead; Charles F. Fowler, Whitehouse Station; Barry K. Schwartz, Delaware Township, Hunterdon County, all of N.J.

[73] Assignee: Bell Communications Research, Inc., Livingston, N.J.

[21] Appl. No.: 904,973

[22] Filed: Sep. 8, 1986

[51] Int. Cl.$^4$ ............................................. H04M 3/42
[52] U.S. Cl. ..................................................... 379/201
[58] Field of Search ............... 379/244, 113, 112, 269, 379/284, 201, 34, 10, 11, 214, 213, 383, 384

[56] References Cited

U.S. PATENT DOCUMENTS 4,022,983 5/1977 Braun et al. ......................... 379/201
4,611,094 9/1986 Asmuth et al. ...................... 179/7.1

OTHER PUBLICATIONS

"The Software Architecture for a Large Telephone Switch", Brian K. Penney and J. W. J. Williams, *IEEE Transactions on Communications*, vol. COM-30, No. 6, Jun. 1982.
"Evolution of High-Level Programming Languages Used in the Development of Large Telephone Switching Systems", Anderson, Sasso, and Wirth, *ISS '84*, Florence, 7-11, May 1984, Session 13 C Paper 3.
"Using SDL in Telephone Exchange Development", J. R. W. Smith, *ISS '84*, Florence, 7-11, May 1984, Session 33A Paper 2.
"Computer-Aided CHILL Program Generation from System Specifications: Design Experience from the MELBA Project", Jackson, Fidge, Pascoe, Gerrand, *ISS '84*, Florence, 7-11, May 1984, Session 33A Paper 4.
"Functional Specification of Call Processing by State Transition Diagram", Kawashima, Futami, Kano, *IEEE Transactions on Communication Technology*, vol. COM-19, No. 5, Oct. 1971.
"Functional Programming Language for Switching Description and Its Hardware Architecture", Imase, Hirakawa, Okada, Kajiwara, *ISS '84*, Florence, 7-11, May 1984, Session 13 C Paper 2.
"Using Artificial Intelligence Techniques in the Design of Software for Digital Switching Systems", Bourgault and Dincbas, *ISS '84*, Florence, 7-11 May 1984, Session C Paper 4.
"New Approaches for Software Development and Production Environment", Bourgonjon, *ISS '84*, Florence, 7-11, May 1984, Session 33 A Paper 1.

*Primary Examiner*—James L. Dwyer
*Attorney, Agent, or Firm*—James W. Falk; John T. Peoples

[57] ABSTRACT

A telephone system allows a user to provide new services to terminations in a telephone network. A server having program sequences for controlling its operation connects the terminations and the telephone network. Using certain of its program sequences, the server monitors the occurrence of a request event at one of the terminations. A processor, distinct from the server, controls the server by accessing a directly accessible database to extract a state transition rule to provide control information corresponding to the response event. Information is returned to the terminations in response to the control information. The database storing the state transition rules is directly accessible by the user for changing the state transition rules to modify the services without changing the program sequences of the server. State transition rules within the database may be inserted, deleted or modified using conventional database management techniques.

33 Claims, 17 Drawing Sheets

220

240

SYSTEM AND METHOD FOR DEFINING AND PROVIDING TELEPHONE NETWORK SERVICES

FIELD OF THE INVENTION

This invention relates to the field of telephone network services. In particular, it relates to quickly defining, trialing, modifying, and implementing telephone services for a telephone network.

BACKGROUND OF THE INVENTION

New customer services are continually being developed by the telephone operating companies in order to meet the needs of the telephone customers. As more services become available, the operating companies or users seek to develop an even broader range of telephone services. Conventionally, however, each new telephone service has to undergo lengthy and expensive design and testing before that telephone service is actually marketed because the service is defined by program sequences within very large packages of program sequences which resided in complex intelligent digital switches. It is often desirable to offer for test marketing various new telephone services, but before any new telephone service could be test marketed it still requires the lengthy and expensive design and test. Accordingly, the prior art did not provide a fast and simple way of designing and testing new telephone services to be made available to the telephone customers.

In the prior art it was known to implement telephone services on large intelligent switching systems using Stored Program Control (SPC) switches such as the Northern Telecom DMS-100 family communications switching systems. These are high capacity digital switches with a large number of microprocessor controlled peripheral modules, running under the control of a central control computer. The software required for such a machine is extensive. For example, "The Software Architecture for a Large Telephone Switch" by Brian K. Penny and J. W. J. Williams, IEEE Transactions on Communications, Vol. Com-30, No. 6, June 1982, teaches a DMS-100 family switching system which requires central control software of up to 500,000 lines of high level language program sequence source code and peripheral modules of up to 128K bytes of memory.

The software required for call processing in telephone switching systems is very large because of the large number of pieces of equipment switched by a large switching system as well as the great diversity of connected telephony equipment and the many possible types of services required. A conventional way of providing this software is the use of driver software, using conditional statements, to select executive procedures which perform the required operations in the required sequence. This type of software package is commonly known as a generic.

With this approach, it is necessary to recompile or at least to relink large parts of the generic program sequences if new procedures or new services are added to the system. Additionally, recompiling and relinking of the generic is usually required if old services are modified. Furthermore, these large software packages often have to be tailored and patched for individual installations where they are used.

For reliability, many telephone switching systems are "hard coded" to avoid memory volatility. In hard coding, electronic circuitry represent the compiled program sequences of the generic within the switch. These circuits are often replaced in their entirety to update a system to a more recent version of the software. Thus updating the program sequences of a telephone switch with new services is a very difficult and a very expensive procedure because a large amount of hard coded circuitry has to be replaced.

The trialing of new telephone services prior to their implementation in the field has also been a very difficult process. Because the program sequences defining the new telephone service or feature are part of the switching system software, trialing software for new or updated telephone services requires working with the very large packages of telephone switching system program sequences. This overall process results in very long delays in getting new services tested and deployed, sometimes as long as several years. New technology in the field of telephony is emerging so rapidly that development and deployment delays measured in terms of years are unacceptable.

An attempt to solve this problem is a digital telephone switch implementation which interfaces to a local switch of the overall telephone network and conducts bidirectional communication with an external processor. The external processor executes conventional program sequences which specify a telephone service being trialed. The processor is informed by the digital switch that some event has occurred, such as the seizure of a trunk, and the switch receives commands from the external processor instructing it how to respond to the event in accordance with the service being trialed. The commands are specified according to the conventional program sequences within the external processor.

Thus a service could be trialed on the external processor system by designing and modifying service program sequences on the external processor without modification of a generic. This external processor also permits changing or adding features to a telephone service prior to or during a trial. However the services of the overall telephone network which are not being trialed are still implemented in a conventional manner separate from the external processor. Since the commands defining the features are contained in the program sequences executed by the external processor, changing or adding features on this system still requires rewriting of program sequences. The rewriting of the program sequences is a highly skilled time consuming task. Furthermore a limited number of new services could be trialed on this system and previously defined services which are controlled by the network rather than this trialing system, could not be modified as they interacted with the trialed service.

PCT International Application Number PCT/U.S. 84/01610 teaches a method for defining an individual service for an individual customer. A telephone service is performed by a customer program which is defined by the customer using conventional program sequences and executed on the customer's host computer external to the telephone network when a call is processed. This method permits configuration of a new individual customer service without modification to the telephone network switching system software. However, this method can not implement a new service on a network wide basis because the service is specific to the customer which designed it and an individual host computer external to the telephone system is required by every customer which uses the service. Furthermore, designing a service still requires writing program sequences to define the service and modifications to the service still require changes to the program sequences.

SUMMARY OF THE INVENTION

A telephone system allows a user to provide new services to terminations in a telephone network. A server having program sequences for controlling its operation connects the terminations and the telephone network. Using certain of its program sequences, the server monitors the occurrence of a request event at one of the terminations. A processor, distinct from the server, controls the server by accessing a directly accessible database to extract a state transition rule to provide control information corresponding to the response event. Information is returned to the terminations in response to the control information. The database storing the state transition rules is directly accessible by the user for changing the state transition rules to modify the services without changing the program sequences of the server.

GENERAL DESCRIPTION

Figure 1:
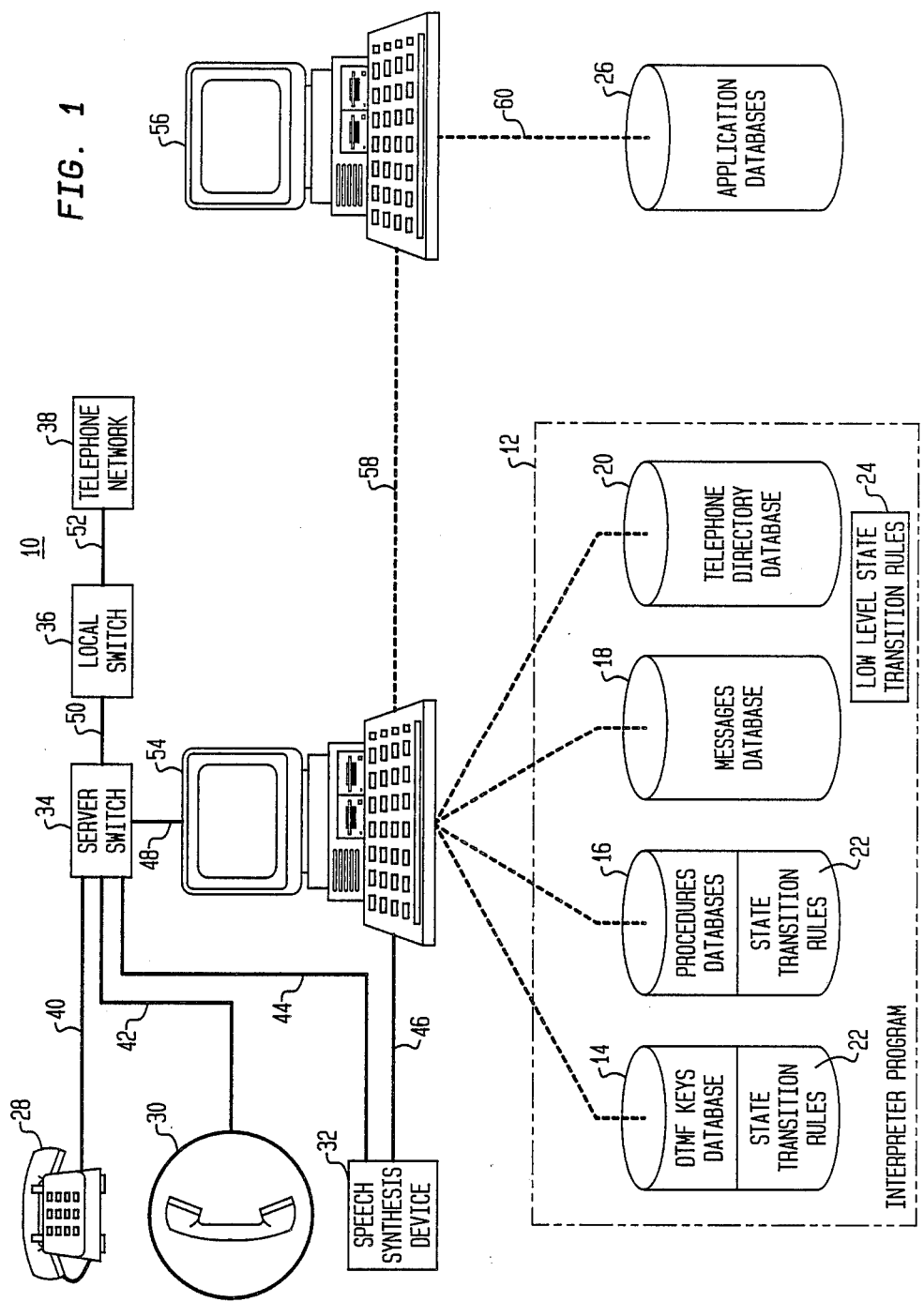
FIG. 1 is a block diagram of the telephone system of the present invention for defining and trialing telephone services. Telephone stations are connected to a server switch which interfaces them with each other and the telephone network. The server switch is also connected to a processor which runs an interpreter program for providing the intelligence for controlling the switch.

Referring now to FIG. 1, there is shown telephone services definition and trialing system 10 for a user of the present invention. System 10 includes (1) event driven server switch 34 which is connected to a plurality of terminations such as telephone station 28, telephone pay station 30, and speech synthesis device 32, and (2) local switch 36 which couples server switch 34 to telephone network 38. Server switch 34 is a "dumb switch" connected to a processor 54 by way of asynchronous serial bidirectional communication channel 48. Interpreter program 12, executed by processor 54, contains the intelligence for performing telephone services and processing telephone calls within system 10.

Local switch 36 and telephone network 38 may be simulators when system 10 is used in a laboratory environment for defining and trialing telephone services. In another embodiment, when system 10 is deployed in the field, an actual local switch 36 and an actual telephone network 38, may interface with server switch 34. Furthermore, telephone network 38 may include a plurality of server switches each having a respective processor, local switches and terminations. Server switches within telephone network 38 may communicate with each other and with server switch 34 through local switch 36. Thus the plurality of processors within telephone network 38 may communicate with each other through the plurality of servers to route information through network 38 and to control terminations.

By executing interpreter program 12, processor 54 controls server switch 34 in response to request events initiated by terminations of server switch 34. Request events are detected by server switch 34 and transmitted by server switch 34 to processor 54 by way of asynchronous serial bidirectional communication channel 48. Response events which specify primitive switch functions within server switch 34 are communicated to server switch 34 from processor 54 by way of channel 48 in response to the request events. Response events from processor 54 control the operation of the terminations of server switch 34 according to state transition or feature definition rules 22 residing in databases 14,16 thereby causing server switch 34 and its terminations to perform the telephone services of system 10.

In order to determine response events (in response to received request events) for controlling the operation of the terminations of server switch 34, interpreter program 12 is provided with a plurality of databases. Dual Tone Multi Frequency (DTMF) keys database 14 specifies system response as specified by conventional state transition rule 22 according to the keys of telephone stations 28,30 which are pressed by a user of system 10. DTMF keys database 14 is organized as a 12-tree data structure because each successive key press by a user of telephone stations 28,30 selects one of twelve possibilities since each telephone station 28,30 is provided with twelve keys. Thus each key press by a user may select one of twelve branches at a node of the 12-tree of DTMF keys database 14.

Each of the twelve branches at a node in the 12-tree of DTMF keys database 14 may specify one of a small number of primitives. The primitives in the branches of the 12-tree are conventional commands, easily understood by those skilled in the art, which may be converted by interpreter program 12 into conventional commands known by server switch 34. These conventional commands known by server switch 34 control the primitive switch functions within server switch 34. Thus the primitives within the 12-tree data structure of keys database 14 form the state transition rules 22 of keys database 14.

Each branch within keys database 14 may also specify a procedure as well as a primitive. A procedure is a frequently used sequence of primitives or other invoked procedures. Procedures are stored in procedures databases 16 and are accessed by interpreter program 12 as indicated by a procedure name within one of the branches of keys database 14 selected by user key presses at telephone stations 28,30. State transition rules 22 therefore reside in procedures databases 16 as well as database 14 because all procedures in databases 16 may be resolved into primitives which may be interpreted to commands known to server switch 34.

Interpreter program 12 is also provided with databases 18,20,26. Messages database 18 includes text messages such as instructions for the user of telephone stations 28,30 to hang up and redial. The messages of messages database 18 are applied to server switch 34 by speech synthesis device 32 by way of line 44 and server switch 34 under the control of processor 54. Telephone directory database 20 specifies the response of interpreter program 12 to special telephone numbers such as 411, 911 and 555-1212. Application databases 26, accessed by way of processor 56, include special applications such as validating credit cards and translating the digits of toll free 800 numbers into conventional ten digit phone numbers.

Interpreter program 12, which accesses databases 14,16 to receive state transition rules 22, also contains a small number of low level state transition rules 24. Low level state transition rules 24 are state transition rules which do not change according to different telephone services.

When telephone stations 28,30 are operated by a user, request events are communicated to server switch 34 by telephone lines 40,42 respectively. Request events from telephone lines 40,42 include such events as telephone lines 40,42 going offhook, telephone lines 40,42 going onhook or a digit being dialed by a user of telephone stations 28,30. Server switch 34 monitors lines 40,42 to detect request events initiated by telephone lines 40,42. Upon detecting a request event, server switch 34 communicates the request event to processor 54 by way of bidirectional communications channel 48. Interpreter program 12 executing on processor 54 then interprets the request event.

Interpreter program 12 executing on processor 54 interprets request events from server switch 34 by accessing records within DTMF keys database 14. Each record within DTMF keys database 14 contains twelve record lines, one record line corresponding to each of the twelve keys of telephone stations 28,30 and therefore to each of the branches of the 12-tree, thereby providing the 12-tree structure previously described for interpreting key depressions by a user. Depending on which one of the twelve keys of telephone stations 28,30 is pressed, interpreter program 12 selects a corresponding record line within an accessed record of DTMF keys database 14. Additionaly, an offhook event would cause an access to procedures databases 14 for the startup/restart/answer procedure.

The accessed record line may contain a primitive or a procedure name. A procedure name within the selected record line causes interpreter program 12 to access a record within procedures databases 14. The lines within a record of procedures databases 16 each set forth an additional primitive or procedure name. The lines within the records of databases 14,16 thus specify, in the form of primitives or procedures, changes in the state of telephone lines 40,42 to be implemented by server switch 34. These records accessed from databases 14,16 thus contain state transition rules 22. It will be understood by those skilled in the art that not all rules contained within rules 22 immediately change the state of a termination. Rather, rules 22 define features or services of a telephone system in which a plurality of feature definition rules 22 or state transition rules 22 may be applied in order to change a state.

A record accessed by interpreter program 12 from procedures databases 16 under the direction of a record line within a record of keys database 14, may include a sequence of primitives, a sequence of invoked procedures also resident within procedures databases 16, or a mixture of primitives and procedures. When interpreter 12 encounters another invoked procedure within a record from procedures databases 16, an additional record from procedures databases 16, corresponding to the invoked procedure, is accessed. Following this method, all procedures, and therefore all lines within records of DTMF keys databases 14, are ultimately resolvable into a sequence of primitives.

Each primitive of the resulting sequence of primitives is provided with a corresponding set of instructions known to processor 54. A resulting sequence of primitives may thus be interpreted and represented within processor 54 as a sequence of sets of known instructions. The resulting sequence of sets of known instructions, collected by interpreter program 12 according to accessed primitives, is then executed by processor 54 to produce the commands known to switch 34. These switch commands cause server switch 34 to perform the primitive switch functions required to implement telephone services as indicated by request events such as depressions of keys of stations 28,30.

This building block approach to determining and executing state transmission rules 22 to be applied in response to request events facilitates the design and trialing of telephone services in addition to implementing the services as described. Using this building block approach, a telephone service designer can insert records into DTMF keys database 14 or procedures databases 16 in which the inserted records contain primitives which specify the state transition rules required to implement a new or modified telephone service. These inserted state transition rules are then accessed when designated keys for requesting the service are pressed or when other events, such as an offhook, occur. Thus a new service may be added to system 10 by adding data records containing primitives corresponding to primitive switch functions to databases 14,16 rather than by rewriting program instructions of generic software. Additionally, existing telephone services or telephone services being trialed may be modified by inserting, deleting, or modifying data records within databases 14,16 without rewriting program instructions.

DETAILED DESCRIPTION

Server 34 to Processor 54 Communication

Figure 2:
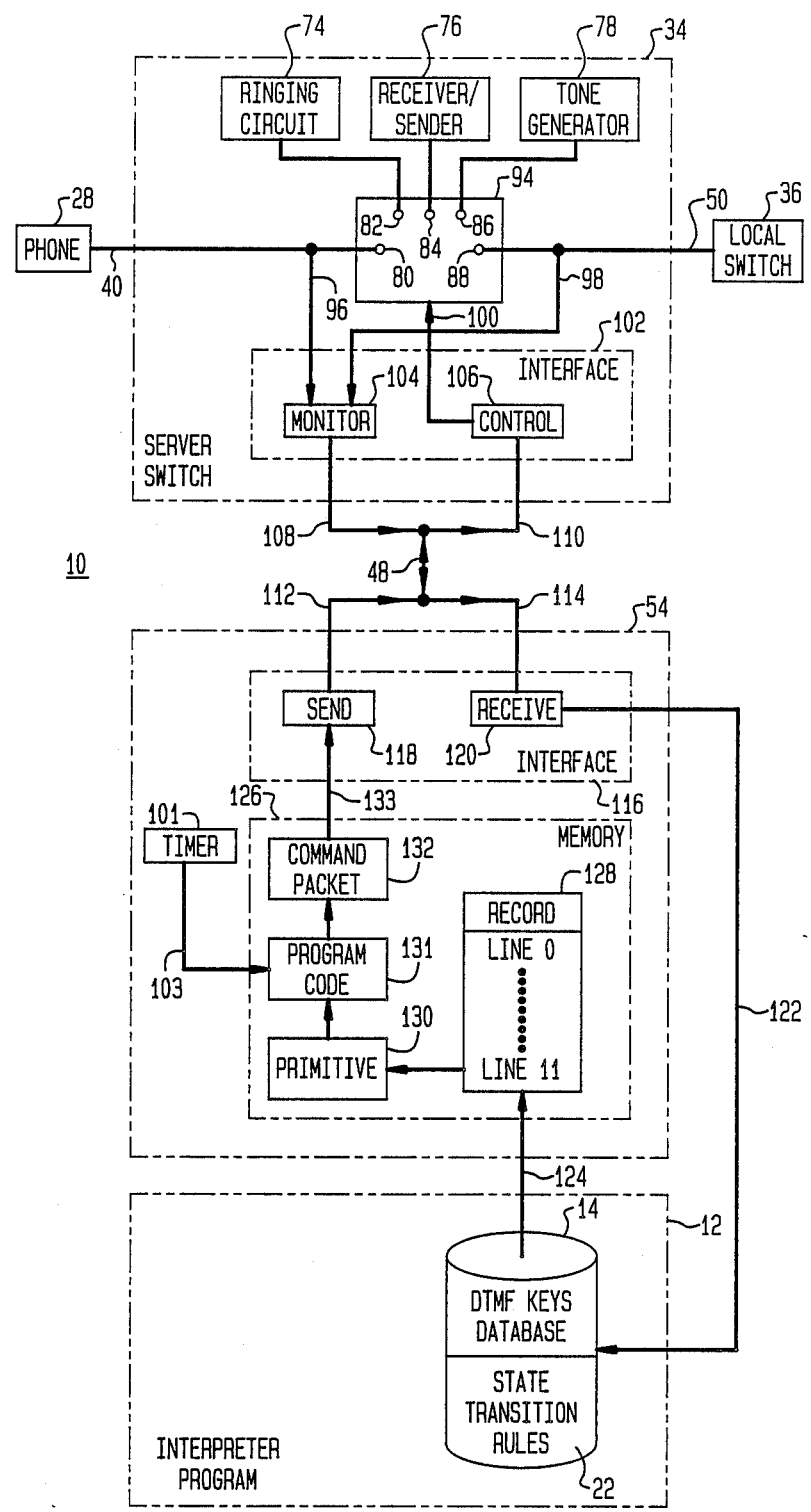
FIG. 2 shows a block diagram including structures, control sequences and formats of portions of the system of FIG. 1.

Referring now to FIG. 2 there is shown for the purpose of illustration a block diagram of portions of system 10 including structures, control sequences and formats. Portions of system 10, including procedures databases 16, are not shown in order to simplify the drawing. It will be understood by those skilled in the art that the functions of some of the blocks of the block diagram of FIG. 2 are physically realized partially by hardware and partially by software. Furthermore, the functions of some separate blocks shown in FIG. 2 may be performed by a single piece of hardware.

Processor 54 is coupled to server switch 34 by way of bidirectional communication channel 48 and telephone station 28 is coupled to server switch 34 by way of line 40, as previously described. Local switch 36 is coupled to server switch 34 by way of line 50. The conventional primitive switch functions of a "dumb switch" are performed by server switch 34. These switch functions include such things as recognizing OFFHOOK and ONHOOK events on telephone line 40, detecting an incoming call from local switch 36, providing audible signals such as ringing, busy and dial tone to telephone line 40, generating AMA billing records, and collecting and forwarding sets of digits.

Within server switch 34 ringing circuit 74 is provided for producing ringing signals and tone generator circuit 78 is provided for producing busy signals and dial tones.

Receiver/sender circuit 76 is provided for receiving digits from telephone station 28 and sending them to a logic circuit shown symbolically as switch 94. Within switch 94 contact 82 may be used for receiving a ringing signal from ringing circuit 74, contact 84 may be used for receiving digits from receiver/sender circuit 76 and contact 86 may be used for receiving a dial tone or busy signal from tone generator circuit 78. Additionally, contact 80 is provided within switch 94 for transmitting signals to and from telephone station 28 by way of telephone line 40 and contact 88 is provided for transmitting signals to and from local switch 36 by way of line 50. Switch 94 electrically couples contacts 80, 82, 84, 86, 88 according to control signals received by way of line 100.

Server switch interface 102 is provided for interfacing server switch 34 with processor 54 by way of bidirectional communication channel 48. Server switch interface 102 includes monitor 104 for monitoring telephone line 40 by way of line 96 and for monitoring line 50 by way of line 98. It will be understood by those skilled in the art that while only two pieces of equipment are shown being monitored by monitor 104 in order to simplify the drawing, a large number of pieces of equipment may also be monitored by monitor 104 of server switch interface 102.

Server switch interface 102, upon the detection of a request event within server switch 34 by monitor 104, applies request event information packets to bidirectional communication channel 48 by way of monitor line 108 for transmission of the request event information packets to processor 54. Equipment within server switch 34, such as lines 40,50 and receiver/sender 76 have equipment numbers for purposes of internal equipment identification. Therefore a request event information packet transmitted by interface 102 to processor 54 may include an equipment number in addition to an event identification. Furthermore, pieces of equipment within server switch 34 may be associated as a group and assigned a group name. Therefore request event information packets may contain event identification and a group name rather than event identification and an equipment number.

Server switch request interface 102 also includes control 106. Control 106 receives control command packets from processor 54 by way of channel 48 and control line 110, and controls the operation of switch 94 by way of line 100 according to the received command packet.

The request event information packets transmitted from server switch 34 to processor 54 by way of bidirectional communication channel 48 when server switch 34 detects a request event include the following:

| Event Identification | Format |
| --- | --- |
| Digits Received | DG eqno dig1, dig2, |
| Digits Sent | DS eqno |
| End Acknowledgement | EA |
| Initialize Acknowledgement | IA |
| Offhook | OF eqno |
| Onhook | ON eqno |
| Reserve Acknowledgement | RA eqno |
| Reserve Negative Acknowledgement | RN eqno |
| Ring Acknowledgement | GA eqno |
| Ring Negative Acknowledgement | GN eqno |

-continued

| Event Identification | Format |
| --- | --- |
| Start Acknowledgement | SA |
| Seize Acknowledgement | ZA eqno |
| Seize Negative Acknowledgement | ZN eqno |

Thus, for example, if monitor 104 determines by way of monitor line 96 that telephone line 40 has gone offhook, server switch interface 102 transmits to processor 54, by way of line 108, the event identification OF indicating an OFFHOOK request event and an internal equipment number which identifies telephone line 40 as the telephone line going offhook. When server switch 34 completes the collection of digits from telephone line 40, interface 102 transmits to processor 54 a request event information packet containing the event identification DG along with the equipment number of telephone line 40 and the digits it collected in receiver/sender 76. In this manner, request events may be communicated from server switch 34 to processor 54.

In the preferred embodiment, as previously described, server switch 34 is a "dumb" switch. It will be understood by those skilled in the art that even though server switch 34 functions as such a "dumb" switch it contains electronic circuits which enable it to monitor request events, generate request event information packets in response to request events, and to process control command packets received from processor 54. This internal processing by server switch 34 is controlled by internal server switch program sequences for controlling its own operations. The internal server switch program sequences are distinct from state transition rules 22 which define features and services.

Processor 54 to Server Switch 34 Communication

Processor 54 contains processor interface 116 for interfacing processor 54 with server switch 34. Processor interface 116 is provided with receive 120 for detecting and receiving a request event information packet from server switch interface 102 by way of channel 48 and receive line 114. Send 118 is also provided in processor interface 116 for transmitting control command packets to interface 102 of server switch 34 by way of send line 112 and channel 48 in order to cause server switch 34 to control terminations according to state transition rules 22. Processor 54 also includes memory 126 for storing and processing records of databases 14,16, such as record 128.

When a request event information packet is received by receive 120 processing is performed by interpreter program 12. Processing by interpreter program 12 may cause an access to DTMF keys database 14 or procedures databases 16. For purposes of illustration an access to DTMF keys database 14, by way of line 122 is shown. Record 128, accessed from DTMF keys database 14, is then transmitted by way of line 124 to memory 126 of processor 54. According to which one of the twelve keys of telephone station 28 was depressed by the user, a corresponding record line of the twelve lines within record 128 containing a conventional primitive, such as primitive 130, is selected from record 128. As previously described the record line accessed from DTMF keys database 14 may also contain a procedure name indicating that the named procedure should be accessed from procedures databases 16. The use of primitive 130 from record 128 in FIG. 2 is by way of example only.

Program code 131 corresponding to primitive 130 is then determined by interpreter program 12. Each primitive within databases 14,16 has such a corresponding program code 131 which sets forth, in instructions known to the operating system of processor 54, a program for implementing the accessed primitive 130. The program code 131 for each primitive within databases 14,16 is set forth in a structured format understandable to those skilled in the art in Appendix 1. Programming code 131 is then executed by processor 54 thereby generating control command packet 132 known to server switch 34. During execution of program code 131 timer 101 interfaces with code 131 by way of line 103 to control the timing specified in primitive 130 and to control other timing functions. Control command packet 132 is transmitted from memory 126 to send 118 of processor interface 116 by way of line 133 and therefore transmitted to server switch 34 by way of channel 48 thereby causing a service or feature to be implemented on telephone system 10.

The control command packets, such as command packet 132, which send 118 of processor 54 may transmit to server switch 34 by way of bidirectional communication channel 48 to communicate a response event to server switch 34 include:

| Command | Format |
|---|---|
| Answer | AW eqno |
| End | EN |
| Give Path | GP eqno1, eqno2 |
| Initialize | IN |
| Receive Digits | RD eqno digno |
| Release Line | RL eqno |
| Reserve Ports | RV grpnm |
| Ring | RI eqno 1, [eqno 2] |
| Ring Distinct | RO eqno [eqno 2] |
| Send Digits | SD eqno dig1, dig2, |
| Seize Port | SP grpnm |
| Start | ST |

The command packets produced by interpreter program 12 and transmitted by way of bidirectional channel 58 (FIG. 1) may be used to communicate with server devices other than a switch. For example, these packets may be used for communicating between processor 54 and an intelligent peripheral or between processor 54 and a vendor feature node or another server in network 38 to route information through the plurality of servers or to control the terminations of the plurality of servers for example.

Telephone Service Feature Definition

Figure 3:
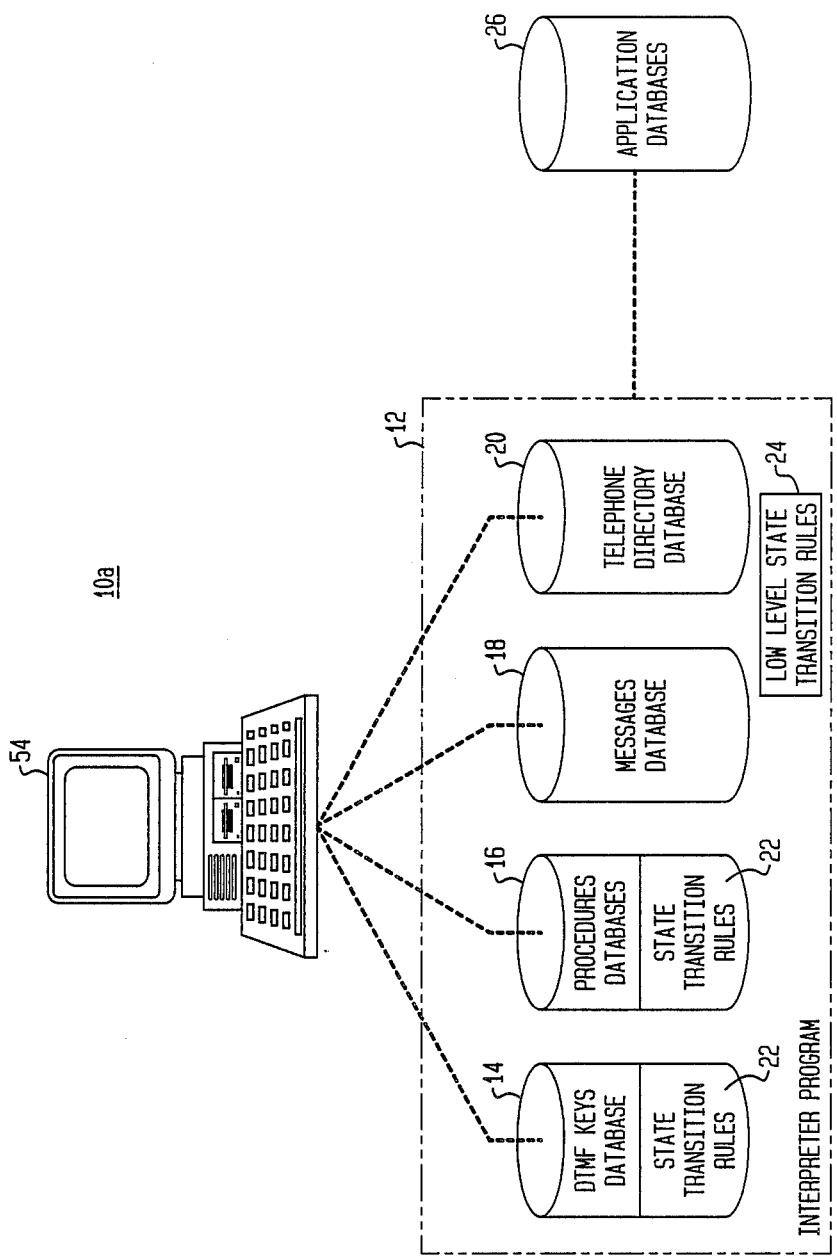
FIG. 3 shows an alternate embodiment of the system of FIG. 1.

Referring now to FIG. 3, there is shown telephone services feature definition workstation and trialing system 10a for allowng a user to define telephone services. System 10a includes processor 54 and interpreter program 12. Interpreter program 12 has access to databases 14,16,18,20,26 and includes low level state transition rules 24 as previously described. Using feature definition system 10a, state transition rules 22 may be entered into databases 14,16 in the form of conventional primitives and conventional invoked procedures which are resolvable into conventional primitives.

System 10a is used for defining and trialing services for a telephone network by entering records into databases 14,16 for controlling the operation of terminations within a telephone network. Using processor 54 records may be entered into DTMF keys database 14 in the format shown in Appendix 2 in which each record includes twelve lines, one line corresponding to each key which may be pressed on telephone station 28. These lines within a record of keys database 14 specify primitives or procedures which define a feature or service when the record line is selected by a key press. The format of the records of DTMF keys database 14 shown in Appendix 2 will be described in detail later.

Additionally, using processor 54 procedures within procedures databases 16 may be defined in the format shown in Appendix 3. The format of the records of procedures databases 16 shown in Appendix 3 will be described in detail later. Thus system 10a may be used to perform a telephone network feature algorithm specification technique in which the algorithm to perform a feature is specified within records of databases 14,16. Furthermore, records may be entered into messages database 18 and telephone directory database 20 using feature definition system 10a. Records are entered from processor 54 into databases 14, 16 using cconventional database entry techniques and a conventional database manager such as C-Tree Database Manager.

Using telephone services features definition workstation and trialing system 10a, several different versions of a service being trialed may be implemented in different procedures databases 16 in which each different version of the service may be accessed by individual sequences of key presses. Thus the different versions of a service being trialed may be conveniently compared. By inserting appropriate records, execution may be moved from one version of the service to a different version during trialing to permit dynamic changing and trialing of telephone services.

Termination States

The processing of a request event by interpreter 12 running on processor 54 requires sequencing changes, from one state of another state, of a termination in response to the initiation of a request event. Therefore each possible state of a termination must be set forth. While only one telephone line 40 is shown in FIG. 2 s may be in any of the possible states. It will also be understood by one skilled in the art that the states described may exist only as abstractions within interpreter program 12 which are useful in understanding the operations of a termination during performance of a telephone feature or service.

Telephone line 40 can be one of nine possible states. The IDLE state is the initial state of telephone line 40. It is the state of telephone line 40 when telephone station 28 is onhook for a period of time. When telephone station 28 is offhook and server switch 34 is waiting for digits from telephone station 28, line 40 is in the WAIT-DIGIT state. The period of time during which server switch 34 waits for a digit from telephone station 28 may be measured by timer 101 within processor 54 while telephone line 40 is in the WAIT-DIGIT state and the WAIT-DIGIT state may be terminated if more than a predetermined amount of time elapses between received digits.

Telephone line 40 may also be in the WAIT-SPEAK state. Processor 54 may signal by way of line 46 to speech synthesis device 32 for speech synthesis device 32 to perform a message announcement from messages database 18 to telephone line 40. While server switch 34 couples speech synthesis device 32 to telephone line 40 and speech synthesis device 32 announces a message to telephone line 40, line 40 is defined to be in the WAIT-SPEAK state.

Server switch 34 may apply a ringing signal from ringing circuit 74 to telephone station 28 by way of line 40 by electrically connecting contacts 80 and 82 when a remote station, through local switch 36 for example, dials telephone line 40. Until the called telephone station 28 is answered or the calling remote station of local switch 36 terminates the call, telephone line 40 is in the RINGING state.

When server switch 34 establishes a voice path to telephone line 40, for example by electrically connecting contacts 80 and 82, telephone line 40 is defined to be in the TALKING state. Server switch 34, by means of switch 94, may also apply a tone to telephone line 40, such as a busy signal from tone generator circuit 78, by electrically connecting contacts 80 and 86 or a dial tone from tone generator circuit 78 by electrically connecting contacts 80 and 86. When server switch 34 applies such tones, under the control of a control command packet from processor 54, telephone line 40 is in the TONE state.

Telephone line 40 may also be in the RING-BACK state. When telephone station 28 dials a remote telephone station the remote station is put into the RINGING state and a ringing signal is applied to the called remote station as previously described. During this time the calling telephone line 40 is placed in the RING-BACK state and a ringback signal is applied to calling telephone line 40 by server switch 34 to indicate that the called remote station is ringing.

A plurality of resources are provided for telephone line 40 by way of server switch 34 as will be described later. These resources include such things as receivers/senders within server switch 34 such as receiver/sender 76 for receiving and sending digits, speech synthesis device 32 and trunk lines 50 for connecting server switch 34 to local switch 36. These resources are allocated to telephone line 40 as required under the control of state transition rules 22 within databases 14,16. If telephone line 40 requires allocation of a resource that is currently unavailable, telephone line 40 is put into the WAIT-RESOURCE state while system 10 waits for the resource to become available to be allocated to line 40.

As terminations within system 10 initiate request events the request events may back up while waiting to be processed. Backed up request events are therefore placed in a conventional request event queue (not shown) while waiting to be processed. If a request event from telephone lines 40 is placed in the queue for future processing, enqueued telephone line 40 is in the ENQUEUED state.

Primitives

Processor 54 interprets response events received from server 34 by accessing records within databases 14,16 and controls the operation of the terminations of server switch 34 to change the state of the terminations according to state transition rules 22 specified in the form of primitives in these records as previously described. Thus primitives are drivers that provide communication between processor 54 and server switch 34 for driving event driver server switch 34. Depending on which key of telephone station 28 is pressed, interpreter program 12 selects a corresponding record line within a record from DTMF keys database 14 as also previously described. A line within these records of keys database 14 contains either a conventional primitive or the name of an invoked procedure within procedures databases 16 which can be resolved into a sequence of primitives.

After being accessed from lines of records within databases 14,16 primitives are interpreted by interpreter program 12 by executing a block of program instructions associated with the accessed primitive. Thus the primitives themselves are not executed. Rather, they are interpreted into blocks of program instructions which are executed. The set of program instructions corresponding to each primitive is a set of instructions known to processor 54. Processor 54 may be an IBM PC/AT and the known set of instructions may be executed on PC DOS. The instructions for each primitive are set forth at the end of the specification as Appendix 1 and are written in a structured format understandable by those of ordinary skill in the art.

These instructions are executed in response to request event information packets from server switch 34 and produce control command packets for server switch 34 and are therefore switch dependent. However by modifying the instructions set forth in Appendix 1 according to different switches to produce control command packets known to other switches, state transition rules 22 contained in databases 14,16 for performing telephone services may be transported from one switch to another.

A line within a record of DTMF keys database 14 is ultimately reducible to a sequence of these primitives. This sequence of primitives is interpreted by interpreter program 12 into a program consisting of the sets of instructions known to processor 54 and corresponding to the accessed primitives. This program thus formed of building blocks of sets of program instructions corresponding to accessed primitives is executed by processor 54. Execution of this program by processor 54 thereby produces appropriate control command packets for transmission to server switch 34 to supply the appropriate response event for the initiating request event as specified by the state transition rules 22 formed of the interpreted primitives.

The general form of a primitive is:

name arg1 arg2 arg3 . . . argn

According to this format the name of each primitive is specified and followed by n argument. The interpretation and execution of several of the primitives set forth causes a change in the state of a termination. For example the ALLOCATE primitive is used to allocate to a telephone line, such as telephone line 40, a resource such as a receiver/sender 76 or speech synthesis device 32. The primitive name ALLOCATE is followed by the name of the resource to be allocated and optionally a timer argument for timer 101 within processor 54. The timer argument can be specified as a number of seconds to wait, an instruction to wait indefinitely, or an instruction not to wait at all.

The ALLOCATE primitive returns TRUE if the specified resource is successfully allocated to the telephone line. A FALSE is returned if the resource name is invalid, if a timeout occurs as determined by timer 101, or if the telephone line being allocated the resource already has too many resources or is onhook. If the desired resource is unavailable and waiting is permitted as indicated by the timer argument, the telephone line is put into the WAIT-RESOURCE state by the ALLOCATE primitive and timer 101 is started.

FREE, also followed by a resource name, is used to return the named resource from the telephone line to which it was allocated back to the resource pool and to generate a RESOURCE-AVAIL event indicating that the freed resource is available to be allocated to another telephone line. If another telephone line 40,42 is enqueued and waiting for the resource, instead of returning the resource to its pool and initiating a RESOURCE-AVAIL event, FREE may allocate the resource to the next telephone line waiting in the queue for the resource. FREE returns FALSE only if the named resource was not actually allocated to the telephone line from which the FREE primitive attempts to return the resource. Otherwise FREE returns TRUE.

The ANNOUNCE primitive causes processor 54 to signal speech synthesis device 32 by way of line 46 to announce a message to a telephone line 40,42. The primitive name is followed by the name of a message within messages database 18 causing processor 54 to access the named message from messages database 18 and to provide the message to speech synthesis device 32 to be applied to telephone line 40,42 by way of line 44 and server switch 34. In an alternate embodiment, additional messages may be stored on an external disk file (not shown). To cause processor 54 to access a message stored on an external disk file the primitive name is followed by the file name.

Figure 8:
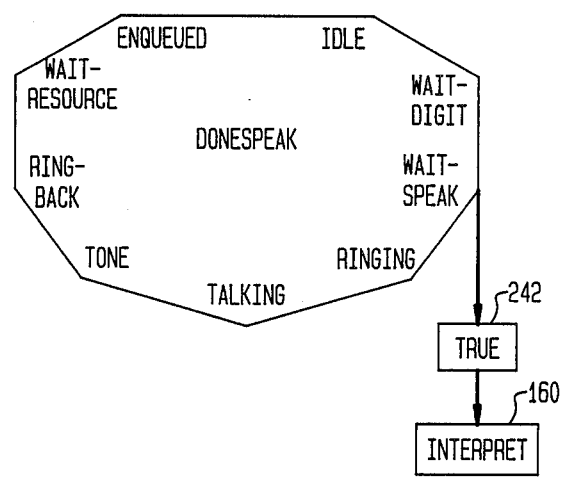

ANNOUNCE returns TRUE if the message name or file name is located within messages database 18 or the external disk file and the message is applied to telephone line 40. A FALSE is returned if the name is invalid, if speech synthesis device 32 is not allocated and connected to telephone line 40 or if telephone line 40 is onhook. If the message is applied to telephone line 40, line 40 is put into the WAIT-SPEAK state in which telephone line 40 waits for speech synthesis device 32 to complete the announcement of the designated message. When speech synthesis device 32 is finished announcing the designated message, speech synthesis device 32 initiates a DONESPEAK event which is received by processor 54 and processed as shown in FIG. 8.

The COLLECT primitive is used to collect dialed digits from telephone station 28. Optionally, a number of digits to be collected and a line buffer in which the collected digits are to be stored may be supplied. A set value for timer 101 may also be specified. Additionally, a key stroke which may prematurely stop the collection process may be specified. COLLECT returns TRUE when the specified number of digits is received or if the stop key is entered. A FALSE is returned if interdigit timer 101 expires or if telephone line 40 goes unhook. COLLECT puts telephone line 40 into the WAIT-DIGIT state until either the specified number of digits is collected or a timeout occurs. The COLLECT primitive assumes a DTMF receiver is already connected to the line.

Connections between telephone line 40 and tones, resources and other possible terminations within server switch 34 may be specified by the CONNECT primitive. The CONNECT primitive is followed by either the name of the resource being connected to telephone line, the name of the tone being applied to telephone line 40, or the name of a conference to which telephone line 40 is to be connected. Optionally a timer value for timer 101 and an alternate connection may be specified in which the first connection is made for the specified duration. The alternate connection is made immediately upon the expiration of timer 101. CONNECT returns TRUE if the connections are successfully made and returns FALSE otherwise. CONNECT puts line 40 into the TONE state if connection to a tone is specified and successfully made.

Two more primitives which cause the state of a telephone line to be changed are ENQUEUE and DEQUEUE. ENQUEUE puts telephone line 40 onto a queue when lines are backed up as previously described. It must be accompanied by a queue name and may optionally be accompanied by a time value for timer 101 which may specify the maximum time telephone line 40 is to wait in the queue to prevent line 40 from remaining in the queue indefinitely. If no timer value is specified, telephone line 40 waits in the specified queue indefinitely. ENQUEUE returns FALSE if telephone line 40 is onhook or if the queue name is missing, and returns TRUE otherwise. The ENQUEUE primitive puts telephone line 40 into the ENQUEUE state. Similarly, DEQUEUE removes telephone line 40 from a named queue. DEQUEUE returns FALSE if the queue name is missing and returns TRUE otherwise.

The primitive EXIT halts execution of a record line within a record from keys database 14 or procedures databases 16 and jumps execution completely out of all procedure nesting. EXIT always returns TRUE and places telephone line 40 into the IDLE state.

Two state transitions are caused by the RING primitive. The arguments of RING are the type of ring, either standard ringing or distinctive ringing, the telephone line 40 to which a ringing signal from ringing circuit 74, for example, is to be applied, and optionally the equipment number of a telephone line to which previously specified telephone line 40 is to be connected when the called party goes offhook. A timeout may also be specified. RING returns FALSE for any syntactic error, invalid line number, a timeout, or if the specified telephone line is offhook. Otherwise RING returns TRUE. When successfully interpreted and executed, the primitive RING puts the calling telephone line into the RING-BACK state and puts the called telephone line into the RINGING state.

Telephone line 40 is placed into the TALKING state by the TALK primitive. The TALK primitive returns FALSE if telephone line 40 is onhook and returns TRUE otherwise.

The primitive ROUTE routes a collected string of digits which has been stored in a buffer. The number of the buffer containing the digit string to be routed may be specified. A yes/no argument may be entered to indicate whether interpreter program 12 should search telephone directory database 20 for a number translation. ROUTE returns FALSE if telephone line 40 is onhook, the specified buffer is invalid, or if the specified buffer is empty. Otherwise ROUTE returns the return code of the procedure it invokes.

The ANSWER primitive merely instructs server switch 34 to answer a call on an incoming line 50. ANSWER takes no arguments and always returns TRUE.

The CLEANUP primitive also takes no arguments and always returns TRUE. This primitive is used to clean out various keyboard buffers associated with telephone line 40. CLEANUP should always be executed prior to handling any call.

In addition to receiving digits in response to a COLLECT primitive, buffers may be set to desired values. To set a buffer, the SET primitive is used followed by the number of the buffer and, optionally, an expression to be assigned to the buffer. Another operation which may be performed on the buffers is a test operation. This operation is specified by the primitive TEST in which logical string comparisons may be performed. TEST returns TRUE if the logical expression tested is true and returns FALSE otherwise. Additionally, the TEST primitive may test whether telephone line 40 is in the IDLE state, whether a conference is active, and whether a conference is full.

Digits may be pulsed over specified equipment using the PULSE primitive. The PULSE primitive is followed by specification of the equipment to be pulsed, a resource, a tone, or a conference, and the digits to be pulsed. PULSE returns FALSE if the telephone line is onhook, an invalid number of parameters is specified, or if the equipment specification is invalid. Otherwise PULSE returns TRUE.

RECEIVE connects a DTMF receiver/sender, such as receiver/sender 76, to a telephone line 40 and causes a dial tone to be applied to the line. The telephone line is placed into the WAIT-DIGIT state and digits are then received from the telephone line into the connected receiver/sender.

Several primitives are used only to control execution within a procedure. For example, JUMP causes execution within interpreter program 12 to jump to another record line or path within an executing procedure. If no record line is specified in the argument field of the JUMP primitive a default of record line 0 is used causing execution to jump to record line 0. JUMP returns FALSE if the number of path is invalid and TRUE otherwise. RETURN causes execution to return from an executing procedure to the procedure which called it. The argument of the primitive RETURN is either TRUE or FALSE. RETURN thus returns either TRUE or FALSE as determined by its argument.

Execution may be caused to switch to a record within DTMF keys database 14 using the SWITCH primitive. SWITCH takes a DTMF key record name to which execution is to proceed as its argument. The DTMF key record specified as the argument of the SWITCH primitive must reside in DTMF keys database 14. Optionally one of the twelve keys provided on telephone stations 28,30 may be specified as an argument after the target DTMF key record name within the SWITCH primitive. This specified key indicates which one of the twelve lines within the target DTMF key record is executed when the target record is accessed. If no such argument is specified, execution proceeds to the line in the target record which corresponds to the last user key press of the initiating telephone station. SWITCH returns FALSE if the DTFM key record name argument is missing or invalid or if the switch key is not a valid key value. Otherwise, SWITCH returns the return code of the procedure or primitive it invokes.

The CONF primitive may be used to set up a four or eight telephone line conference. CONF takes as arguments the maximum number of telephone lines that can be attached to conference and the name given to the conference. It returns FALSE if the number of telephone lines is invalid, if a conference could not be reserved, or if the initiating telephone line is onhook. Otherwise the CONF primitive returns TRUE.

Interpreter program 12 may format and send requests to a generic stored control program and interpret the results of the request. The primitive for producing this interaction with the stored control program is GETSCP. This provides access to applications database(s) 26.

The STAT primitive turns statistics gathering on or off depending on its binary argument.

DTMF Keys Database 14 Records

As previously described, interpreter program 12 executing on processor 54 interprets request events initiated by the terminations of server switch 34 by accessing records from DTMF keys database 14 or, by way of DTMF keys database 14, from procedures databases 16. Each record within DTMF keys database 14 contains twelve record lines, one record line corresponding to each of the twelve keys provided on telephone stations 28,30. Depending on which one of the twelve keys of telephone stations 28,30 is pressed, interpreter program 12 selects a corresponding record line within an accessed record of DTMF keys database 14.

Each of the twelve record lines within a record of keys database 14 is provided with three columns. The first, or main, column contains a primitive or procedure to be executed when the record line is selected by a key press. When executed primitive or procedure in the main column may return a logical value of TRUE or FALSE. If TRUE is returned and an entry is provided within the second, or TRUE, column of the selected record line, the entry in the TRUE column is executed. The entry in the TRUE column may be another primitive or procedure. Similarly, if FALSE is returned by an executed procedure or primitive in the main column and an entry is provided within the third, or FALSE, column of the selected record line, the entry in the FALSE column is executed.

For example the TRUE column or the FALSE column of a selected record line may contain the primitive SWITCH followed by the name of another key record within keys database 14. This causes the named record of the argument field of SWITCH in keys database 14 to be accessed as previously described and the user key press selects a record line from this named record and processing switches to the named record. The SWITCH primitive may also appear in the MAIN column to which processing switches.

DTFM keys database 14 includes the records set forth in Appendix 2 in a structured format understandable to those skilled in the art. The records are set forth labeled as tables. To illustrate how records within database 14 are accessed and executed, record firstkey, set forth in Appendix 2 as Table 2-10, is described. Firstkey is accessed in response to execution of procedure startup when a telephone line in the IDLE state goes offhook as described below for FIG. 6.

Referring now to Table 2-10, record line 1 contains procedure internpa of procedures databases 16 set forth in Appendix 3 as Table 3-4. When the first digit pressed by a user is the number one, causing line 1 of record firstkey to be selected, a telephone number such as a long distance number is expected and procedure internpa handles the call by collecting more digits and switching to another record within keys database 14.

If the key of the initiating telephone station corresponding to the numbers two, three, five, seven or eight is pressed procedure coll_rte is accessed because procedure coll_rte is set forth in the main column of lines 2, 3, 5, 7 and 8 within record firstkey. Procedure coll_rte, residing in procedures databases 16 and set forth as Table 3-25 in Appendix 3, collects six more digits, stores them in buffer zero, and times out if more than five seconds elapses between digits as indicated by the arguments 6 0 5 in the main column of record firstkey on lines 2, 3, 5, 7 and 8. This is done because when one of these digits is the first one pressed by a user a conventional seven digit telephone number is expected. Procedure coll_rte after collecting the remaining six digits causes the call to be routed.

If, however, the first key pressed by a user is the number four, causing line 4 of record firstkey to be selected, the COLLECT primitive contained in the main column of line 4 is accessed. The COLLECT primitive collects one more digit, places the collected digit into buffer zero, and times out after five seconds as specified by the arguments 1 0 5 of the COLLECT primitive. If the one digit is successfully collected, causing primitive COLLECT to return TRUE, the SWITCH primitive in the TRUE column of line 4 is accessed. This causes interpreter program 12 to access key record d4xx which is the argument of the COLLECT primitive of line 4. Record d4xx is also resident in keys database 14 and is set forth as Table 2-5.

Referring now to key record d4xx set forth in Table 2-5, if the key for number one is pressed, execution is switched to record d41x set forth as Table 2-4. If any other number key is pressed procedure coll_rte collects the remaining five digits and routes the call as shown on lines 2-9,0 of Table 2-5. When record d4xx is entered, interpreter program 12 is searching for a 411 because the first key pressed was a four. Thus if the second key pressed is the number one, interpreter program 12 continues searching for a 411 by accessing record d41x. If the second key pressed is not the number one, some telephone number beginning with a form other than 411 is being dialed and call rte collects the remaining digits and routes the call as previously described.

Referring now to key record d41x of Table 2-4, record d41x routes the call if the number one is again pressed by the user thereby selecting line 1 of Table 2-4 which contains the ROUTE primitive. This is done because the user has completed dialing 411. If any number other than one is pressed a conventional seven digit number is being dialed and procedure coll_rte collects the remaining four digits and routes the call. If record d41x or record d4xx receives * or #, they access procedure reorder from procedures databases 16, set forth as Table 3-85, causing execution to exit.

Thus if 411 is dialed execution is routed by record d41x and if a seven digit number beginning with four or four one is dialed, the remaining digits are collected and routed by procedure coll_rte. Thus interpreter program 12 recognizes that the 411 path in the 12-tree does not extend any farther.

Returning now to Table 2-10, record firstkey, which switches when the first key pressed is the number four, is shown. COLLECT primitives collecting one more digit are also shown on record lines 6,9 as was previously described for line 4. If either COLLECT primitive successfully collects another digit a SWITCH primitive in the TRUE column of the selected record line 6 or 9 is accessed. These paths collect 611 or 911 in a manner similar to the manner described in which the path beginning at line 4 collected 411.

If the first key pressed by the user is * or #, reorder is executed as previously described because * and # are not defined to be valid first keys in system 10. If the first key pressed is the number zero, procedure op_asst, set forth in Table 3-63, is accessed to provide operator assistance.

Procedures

Primitives which are known to be commonly used may be grouped together as a procedure and given a procedure name. These procedures reside in procedures databases 16 as previously described. Procedures need not be only sequences of primitives. Procedures may include primitives, invoked procedures, or a mixture of primitives and other invoked procedures also resident in procedures databases 16.

Thus when a record is accessed from DTMF keys database 14 the line within the accessed record selected by a user key press may be a primitive or a procedure name. A procedure name in the record line causes interpreter 12 to access procedures databases 16 to access another group of either all primitives or a mixture of primitives and procedures. The procedures within the invoked procedures are all ultimately resolved into primitives and all primitives are translated into their set instructions which is known to the operating system of processor 54 as previously described and as set forth in Appendix 1.

Procedure records residing within procedures databases 16 are configured to have three columns as shown in Appendix 3, in which a plurality of panels are set forth, each panel labeled as a Table an describing a procedure within procedures databases 16. These procedures may be entered into procedures databases 16 by feature definition system 10a as previously described. The procedures set forth in Appendix 3 are effective to implement a plurality of telephone services within system 10. The three columns of the panels are: (1) a main column which contains a sequence of primitives or invoked procedures, (2) a TRUE column and (3) a FALSE column.

Execution of a procedure begins on record line 0 in the main column and accesses encountered primitives and procedures which may return a TRUE or a FALSE. If TRUE is returned when the main column of a record line is executed and if there is an entry in the TRUE column of the executing record line, execution begins to proceed down the TRUE column beginning at the executing line. If there is no entry in the TRUE column execution continues at the next line of the main column. Likewise, if a FALSE is returned by the primitive or procedure in the main column and there is an entry in the FALSE column of the executing line, execution begins in the FALSE column beginning at the executing line. If there is no entry in the FALSE column, execution continues at the next line of the main column. When execution reaches the last entry of whichever column it is currently executing, the procedure is done.

To illustrate how procedures are accessed from procedures databases 16 and performed by interpreter program 12, the procedures required to implement the GAB telephone service are illustrated. GAB service is a telephone network service that allows two or more telephone subscribers to conduct a conversation on any topic using multiline bridging which forms a conference of users. The GAB phone numbers are in the public domain and sessions are set up on a first come, first served basis. GAB service is assigned a conventional seven digit telephone number which is stored in a record in telephone directory database 20. When this telephone number is dialed by a user, the first procedure executed within the GAB telephone service is the procedure GABMENU shown in Appendix 3 as Table 3-39.

The first item in the procedure GABMENU is the involved procedure dtmfon which is shown in the main column of line 0 of procedure gabmenu. The invoked procedure dtmfon is another procedure residing in procedures databases 16 and set forth in Appendix 3 as Table 3-33. Referring now to Table 3-33, interpreter program 12 executes procedure dtmfon which allocates a DTMF receiver/sender such as receiver/sender 76 from the pool of DTMF receiver/senders that is available within server switch 34. The ALLOCATE primitive with a RS argument for allocating the receiver/sender is set forth in the main column line 0 of Table 3-33. The allocated DTMF receiver/sender receives the keys pressed by the subscriber and sends them to interpreter program 12.

If a DTMF receiver sender cannot be allocated, procedure dtmfon returns a FALSE as previously described. Execution of procedure dtmfon would therefore proceed to column 3, the FALSE column, of line 0 of procedure dtmfon rather than continue in the main column. Execution of column 3 of line 0 causes procedure dtmfon to return FALSE to its calling procedure gabmenu.

If a receiver/sender is successfully allocated by the ALLOCATE primitive, the ALLOCATE primitive returns TRUE. Since there is no entry in the TRUE column of line 0, execution of procedure dtmfon continues along the main column where the allocated receiver/sender is connected to the dialing telephone line by the CONNECT primitive on line 1 of procedure dtmfon. Since no more procedures or primitives are listed after line 1 of the main column of procedure dtmfon, procedure dtmfon is completed and execution returns to the calling procedure, procedure gabmenu, shown in Table 3-39.

If procedure dtmfon returns TRUE, execution of procedure gabmenu continues at record line 1 of the main column which contains an ALLOCATE primitive. The resource being allocated in the argument field of the ALLOCATE primitive is speech synthesis device 32. Since an optional second parameter, a timeout value, is not specified, the ALLOCATE primitive of line 1 of procedure gabmenu places the dialing line in the WAIT-RESOURCE state indefinitely until speech synthesis device 32 can be allocated. If procedure dtmfon returns FALSE to procedure gabmenu, execution of procedure gabmenu continues in column 3 of line 0 causing execution to exit from procedure gabmenu.

After allocating speech synthesis device 32 on record line of procedure gabmenu, execution proceeds to record line 2 of gabmenu which contains a CONNECT primitive. The CONNECT primitive causes the resource, speech synthesis device 32, to be connected to the dialing telephone line.

Execution then proceeds on line 3 with the primitive ANNOUNCE having as its argument a message named gabav1. In response to this ANNOUNCE primitive, interpreter program 12 accesses messages database 18 for a message named gabav1. This message (not shown) welcomes the user to the GAB selection service.

Following announcement of the welcome to the dialing telephone line, the procedure testgabs is called at record line 3 of procedure gabmenu. At record line 4, column 3 a FREE primitive is shown. This causes intrepreter program 12 to free the receiver/sender allocated in procedure dtmfon if procedure testgabs returns a FALSE. If procedure testgabs returns a FALSE, execution then proceeds to record line 5 of column 3 in which speech synthesis device 32 is also freed. Following the freeing of both the DTMF receiver/sender and speech synthesis device 32, execution of gabmenu is complete if testgabs turns a FALSE.

Procedure testgabs, invoked at record line 4 of procedure gabmenu, is shown in Appendix 3 as Table 3-95. Line 0 of the main column of procedure testgabs uses the SET primitive to set buffer two to a value of zero. This is an example of a case in which a rule within rules 22 is necessary for feature definition but does not result in an actual state transition. However a state transition may occur in the future as a result of this SET.

Following the zeroing of buffer two, procedure testgab is invoked twice, once for gab1 at record line 1 and once for gab2 at record line 2. Gab1 and gab2 are conference bridges (not shown) within server switch 34 suitable for use in GAB conferences. Testgabs is a procedure which determines whether a specified conference bridge, such as conference bridges gab1 or gab2, is in use. If either or both conference bridge is in use, the user is offered an opportunity to join one of the conferences in progress. Otherwise, the user is offered an opportunity to try again or to terminate the call.

Procedure testgab, invoked at record lines 1 and 2 of procedure testgabs, is shown as Table 3-94. Referring now to Table 3-94, the primitive TEST is used to test the conference referred to as $0 which causes the argument conference gab1 of line 1 of procedure testgabs to be tested. If the TEST primitive returns FALSE, indicating that the tested conference is not active, procedure testgab continues execution in column 3 of line 1 of procedure testgab and returns with a FALSE to the calling procedure testgabs.

If however, the conference gab1 is active, a 1 is placed in buffer two by the SET primitive of line 1 of procedure testgab. Execution then continues to record line 2 of procedure testgab where a test is made whether the active conference is full by the TEST primitive using cnf1 as an argument to indicate that the test this time is whether the conference is full. The $0 of record line 2 of procedure testgab again indicates to procedure testgab that the argument gab1 is being tested.

If the active conference gab1 is at its maximum, execution proceeds to column 2 of line 2, the TRUE column. This causes an ANNOUNCE primitive to be executed. The $0f1 argument of the ANNOUNCE primitive causes a conference full message (not shown) residing within messages database 18 to be announced to the user. Thus speech synthesis device 32 announces to the user that the tested conference is full. Interpreter program 12 then executes the next record line of the TRUE column. The next record line of the TRUE column, line 3, contains a RETURN primitive with a false argument. Therefore, execution then returns to procedure testgabs with a FALSE.

However, if the gab1 conference is not full, execution of testgab proceeds from the TEST primitive of record line 2 to the the ANNOUNCE primitive of line 4 in the MAIN column. This causes interpreter program 12 to access messages database 18 to receive and announce a message (not shown) indicating to the user that the conference is available. This is followed by an announcement of message gabprmpt, on line 5 of procedure testgab, instructing the user to hit any button if joining in conference gab1 is desired.

Line 6 of procedure testgab causes buffer five to be loaded with a default null value. Line 7 uses the COLLECT primitive to collect one digit and store it in buffer five with a two second timeout. If the user fails to hit any key within two seconds, the primitive COLLECT returns FALSE and execution proceeds to the FALSE column of line 7 and returns to the calling procedure TESTGABS with a FALSE value due to the RETURN primitive in the FALSE column. If a digit is successfully collected in line 7, execution proceeds to column 1 of line 8 in which execution is returned to procedure testgab with a TRUE.

Referring again to Table 3-95, execution of testgabs proceeds to column 2 of line 1 if testgab returned TRUE indicating that the user intends to join the conference gab1. Column 2 of line 1 contains the procedure connbab with the argument gab1. Procedure conngab is shown as Table 3-29. Executing the main column of procedure congab the receiver/sender and speech synthesis device 32 are freed and a CONNECT primitive is encountered. The CONNECT primitive provides a tone and a permanent high for two seconds because of the T PH 2 arguments following the CONNECT primitive. The permanent high is a relatively high frequency tone which may be defined to indicate a desired operation such as a user prompt. The user is then connected to the conference gab1 by the C, $0 arguments of the CONNECT primitive. Line 3 of procedure conngab causes execution to return to the calling procedure testgabs with a TRUE.

Returning now to Table 3-95, at line 2 of procedure testgabs, testgab is again called to perform the same operations for the conference gab2. Execution proceeds to line 3 of procedure testgabs when conference gab2 testing is completed as described for conference gab1. At. line 3 of testgabs, a TEST primitive determines whether buffer two is zero by means of the arguments %2 eq zero. Buffer two contains zero if there are no GAB sessions in progress because execution of procedure testgab never proceeds to line 1 of procedure testgab in which buffer two is set to one unless at least one of the conferences is active.

If buffer two is zero, as determined by the TEST primitive of column 1 of line 3 of procedure testgabs, execution proceeds to the TRUE column of line 3 in which the message gabnone is announced informing the user that no conferences are available. Execution then continues in the TRUE column to the RETURN primitive of line 4 causing execution to return to the procedure which called testgabs with a FALSE.

However, if either gab1 or gab2 is active, execution proceeded to line 1 during execution of procedure testgab in which buffer two was set to a value of one. This causes execution of procedure testgabs to proceed from the TEST primitive to the next line in the main column and encounter an ANNOUNCE primitive. The announcement of line 5 causes a message (not shown) from messages database 18 to be announced instructing the user to hit any button to cause the list of active GAB sessions which may be accessed to be repeated. That each active conference is in fact active was announced at line 4 of procedure testgab when procedure testgab was called to test the respective conference.

A COLLECT primitive in line 6 of column 1 of procedure testgabs waits five seconds for the user to enter the digit prompted in line 5. If the user fails to press a key in five seconds, the COLLECT primitive returns FALSE and execution proceeds to column 3 of line 6 in which a RETURN primitive causes execution to return to procedure gabmenu with a FALSE. If a digit is successfully collected by the COLLECT primitive of line 6 execution proceeds to line 7 in which a JUMP to a default location of 0 within the current procedure testgabs is executed causing procedure testgabs to begin again.

Returning now to Table 3-39, gabmenu, the procedure which called procedure testgabs, is shown. Procedure testgabs was called from line 4 of procedure gabmenu, in which line 4 column 3 contains a FREE primitive. If procedure testgabs returns FALSE, first the receiver/sender and then speech synthesis device 32, allocated by procedure dtmfon, and primitive CONNECT of lines 0 and 2 of procedure gabmenu, are freed and returned to their respective resource pools to be made available to other users. Execution of procedure gabmenu is then complete and execution returns to whichever procedure called procedure gabmenu.

Databases 18, 20, 26

Messages announced by speech synthesis device 32 are stored in messages database 18. These messages are text messages which may be entered into messages database 18, along with an identifying name, using system 10a shown in FIG. 3. The identifying name of a message may appear in records of databases 14,16, in the argument field of an ANNOUNCE primitive for example, causing processor 54 to direct that an announcement of the message be performed.

Thus when interpreter program 12 determines that a message is to be applied to telephone line 40, the specified message is retrieved from database 18 and transmitted from processor 54 to speech synthesis device 32 by way of line 46. Speech synthesis device 32 applies the message to server switch 34 by way of line 44 and server switch 34 patches the message over to lines 40, 42 according to the primitive received by server switch 34 by way of line 48.

Telephone directory database 20 is also provided for interpreter program 12. Directory database 20 is provided with records specifying a telephone number and a procedure with parameters permitting telephone directory database 20 to identify system 10 response to special telephone numbers. For example, user-dialed 411, 911 and 555-1212 digit springs are handled by reference to telephone directory database 20. Telephone directory database 20 should be distinguished from telephone directories such as the white pages or the yellow pages.

Applications records are stored on application databases 26 and are accessed by interpreter program 12 through communication with processor 56 over channel 58. No routines are stored in databases 26. Thus applications databases 26 are external to interpreter program 12. Applications databases 26 include data only.

Processor 56 receives application records from databases 26 by way of line 60. Records within applications databases 26 may include references to procedures within procedures databases 16 to perform items such as alternate billing, including third party billing the credit card validation, and translating toll free 800 numbers into conventional ten digit long distance numbers for routing by processor 54. The data necessary to determine whether to permit a request for alternate billing or to validate a credit card, as well as the conventional ten digit numbers corresponding to 800 numbers are also contained within applications databases 26.

Applications databases 26 may contain procedures similar to the procedures of procedures databases 16 as previously described. The procedures of applications databases 26 may define telephone features which are too large, complex or specialized for inclusion in procedures databases 16. For example applications databases 26 may contain procedures for performing complex algorithms. Procedures from applications databases 26 are received by processor 54 by way of line 58 and interpreted by interpreter program 12 in the same manner as described for interpretation of procedures from procedures databases 16.

Interpreter Program 12

Figure 4:
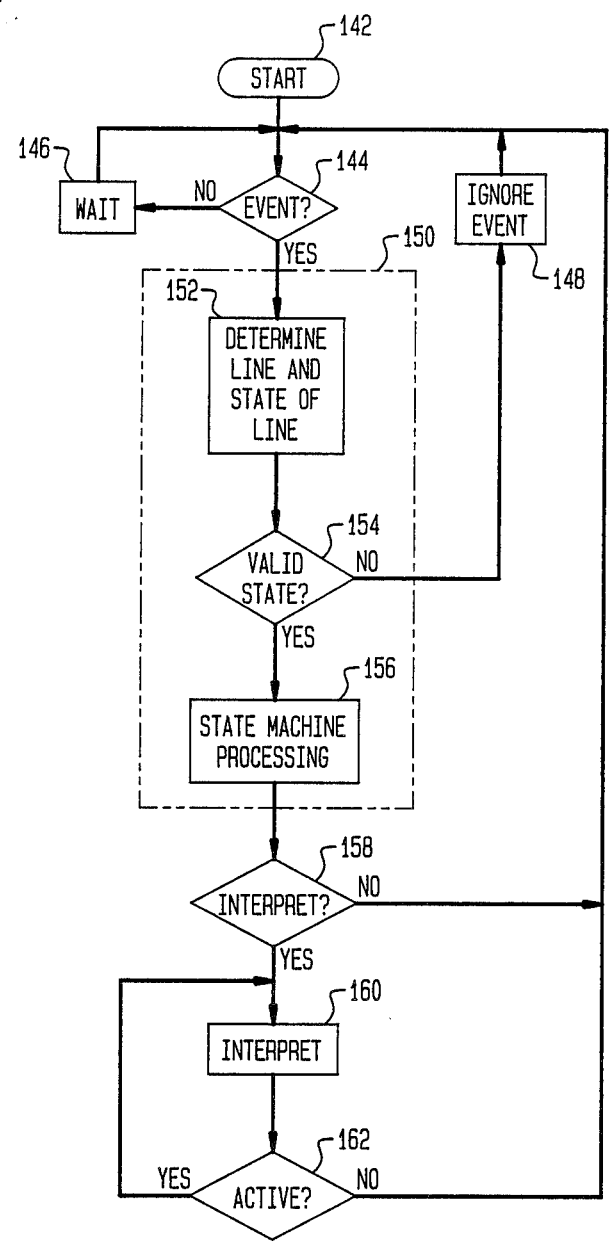
FIG. 4 shows a flowchart representation of the main loop of the interpreter program of the system of FIG. 1.

Referring now to FIG. 4, there is shown a flow chart representation of main routine 140 of interpreter program 12 which executes on processor 54 to perform telephone services according to state transition rules 22. Main routine 140 begins at start 142 and a determination is made at decision 144 whether there are any unprocessed request events backed up in the request event queue. If there are no unprocessed request events in the request event queue, routine 140 waits as shown in block 146 and returns to decision 144 to again check the request event queue.

When a request event is removed from the request event queue, a determination is made in block 152 which termination, such as telephone lines 40,42, initiated the dequeued request event. The determination is made on the basis of the equipment number or the group name contained within the request event information packet transmitted from server switch 34 to processor 54 as previously described. Additionally a determination is made of the state of the telephone line which initiated the request event. For example, interpreter program 12 may determine at block 152 that telephone line 40 has initiated an OFFHOOK event or that telephone line 42 has initiated a DIGIT event.

At decision 154 a determination is made whether the initiating telephone line is in a valid state for initiating the request event which was dequeued. For example, if telephone line 42 was in the TALKING state, a negative determination results from decision 154 in response to a DIGIT event because digits from telephone line 42 cannot be processed by interpreter program 12 while telephone line 42 is in the TALKING state. An invalid event is ignored as shown in block 148 and the next request event is dequeued from the request event queue.

If the state of the telephone line is valid for the dequeued request event, as determined in decision 154, state machine processing begins as shown at block 156. State machine processing includes such steps as loading procedures, making logical determinations, canceling timer 101, implementing low level state transition rules 24 and saving digits received with a request event command package as set forth in detail below. The steps of routine 140 defined generally by dotted line 150 are set forth in detail below in FIGS. 5-15.

Following the state machine processing of block 156, a determination is made at decision 158 whether interpreter program 12 should proceed to interpret or should return to the beginning of routine 140 and dequeue another request event from the request event queue. In all but a few cases, as set forth below, execution proceeds to block 160 in which interpretation is performed.

During the interpretation of block 160, interpreter program 12 accesses a line within a record of a DTMF keys database 14 thereby accessing a primitive or a procedure from procedures databases 16 as previously described. All accesses to databases 14,16 produce either primitives or procedures which are reduced to primitives as previously described. The primitives are then used by interpreter program 12 to provide corresponding sets of instructions which may be executed by processor 54. These sets of instructions corresponding to the primitives residing in databases 14,16 are set forth in Appendix 1 as also previously described.

Periodically a determination is made at decision 162 whether the initiating telephone line is still active. When this decision is made, as well as whether the telephone line is active, are both determined according to the particular primitive being interpreted as set forth in the programming details of the primitives in Appendix 1. If the initiating telephone line is still active, interpretation in block 160 continues. If the initiating telephone line is not active, execution returns to decision 144 and a determination is made whether any further request events are in the request event queue.

State Machine Processing 156

Referring now to FIGS. 5-15, a more detailed description of the operations defined generally by dotted line 150 is provided. When a termination within system 10 is changed from one state to another state in response to a request event, the resulting state of the termination may depend on its state prior to the arrival of the request event. Thus a case statement is provided for each of the possible request events which interpreter program 12 may process. The response of interpreter program 12 to each request event, depending on the state of the initiating termination, is set forth.

Figure 5:
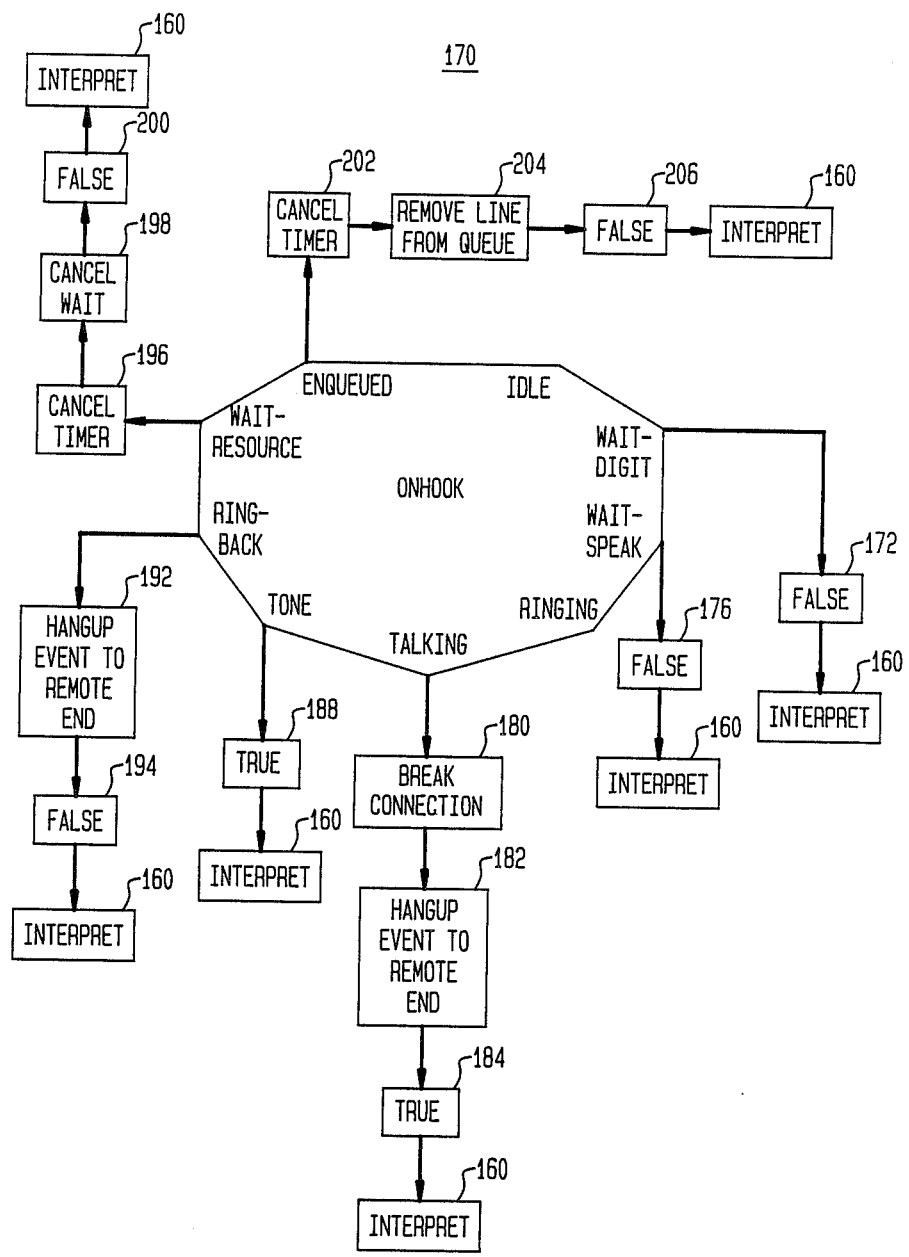
FIGS. 5-15 show case statement representations of response events in the control sequences of FIG. 2 according to individual request events for each state of a telephone line.

Referring now to FIG. 5, case ONHOOK 170 for the ONHOOK request event is shown. Each corner of the case statement symbol corresponds as labeled to one of the nine possible states of the initiating termination. If no state machine processing steps are shown at a corner corresponding to an initiating termination state, the indicated state is not a valid state for the request event received and the request event is ignored as described for block 148 of FIG. 4. For example, no state machine processing is defined for an ONHOOK request event when an initiating telephone line is in the IDLE state since a telephone line must already be onhook in order to be in the IDLE state. Similarly, a response to an ONHOOK request event is not defined for a telephone line which is in the RINGING state.

If an initiating telephone line is in the WAIT-DIGIT state, server switch 34 is waiting for digits from the initiating telephone line. If the event request received from an initiating telephone line in the WAIT-DIGIT is an ONHOOK event, a FALSE is returned to main routine 140 by routine 170 as shown in block 172. Thus when execution proceeds to interpret in block 160, interpreter program 12 determines that the initiating telephone line will send to more digits since it has been hung up and execution of the COLLECT primitive which placed the telephone line into the WAIT-DIGIT state is terminated at interpret block 160. This causes the initiating telephone line to be placed into the IDLE state and results in a negative determination at decision 162 of main routine 140. When execution enters block 160 by any path of case ONHOOK 170, the initiating telephone line is placed into the IDLE state by interpreter program 12.

Similarly, if the initiating telephone line is in the WAIT-SPEAK state, indicating that speech synthesis device 32 is applying a message to the initiating telephone line when the ONHOOK request event arrives, a FALSE is returned as shown in block 176 before execution proceeds to interpret in block 160. Thus resources may be freed when a telephone line using the resources is hung up and placed into the IDLE state.

If an initiating telephone line is in the TALKING state when the ONHOOK request event is received, state machine processing steps take place because the initiating telephone line was hung up while a voice path was established. The voice path connection to the initiating telephone line is broken as shown in block 180 and a HANGUP event is sent to the remote end in block 182. A logical value of TRUE is returned to interpreter program 12 as shown in block 184. If the initiating telephone line is in the TONE state when an ONHOOK request event is received, a logical value of TRUE is returned as shown in block 188.

If an initiating telephone line is in the RING-BACK state when the ONHOOK request event is received, a HANGUP event is generated for transmission to the calling party as shown in block 192, because the initiating telephone line was hung up while the called party's station was ringing. A FALSE is returned as shown in block 194 to indicate to interpreter program 12 that the call is terminated and execution proceeds to interpret block 160 where the initiating telephone line is placed into the IDLE state.

While in the WAIT-RESOURCE state, a timer such as timer 101 may be run to terminate attempts to allocate a resource when the desired resource is unavailable for more than a predetermined period of time as specified in an argument field of the primitive which specified the resource. Thus if an ONHOOK request event is received while the initiating telephone line is in the WAIT-RESOURCE state, timer 101 is canceled as shown in block 196 and the wait for the resource is canceled in block 198. A FALSE is returned in the event of an ONHOOK request while the initiating telephone line is in the WAIT-RESOURCE state as shown in block 200. Execution then proceeds to interpret in block 160 where the initiating telephone line is placed into the IDLE state as previously described.

Figure 6:
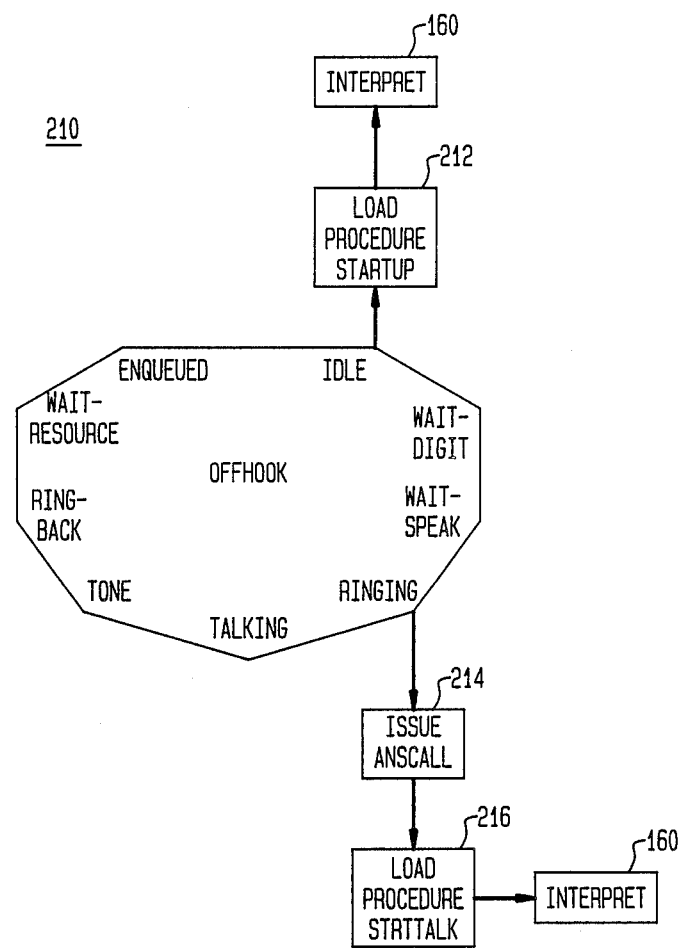

Referring now to FIG. 6, case OFFHOOK 210 is shown. If an initiating telephone line is in the IDLE state an OFFHOOK request event triggers the loading of procedure startup as shown in block 212. It will be understood by those skilled in the art that different startup procedures are required for different terminations. The startup procedure for conventional telephone stations, such as stations 28,30, is set forth in Appendix 3 as Table 3-90. Execution then proceeds to interpret block 160 to execute procedure startup in which key record firstkey may be loaded from DTMF keys database 14. The structure and function of key record firstkey have been previously described.

If the OFFHOOK event is received from an initiating telephone line which is in the RINGING state, event ANSCALL is initiated as shown in block 214 because the ringing line has been answered. Procedure strttalk for starting the initiating termination in the TALKING state is loaded in block 216. It will be understood by those skilled in the art that different procedures are required to start different terminations in the TALKING state. A typical procedure of the type required for a telephone station such as stations 28,30 is set forth in Appendix 3 as Table 3-92. Execution then proceeds to interpret at block 160 in which a voice path to the initiating telephone line is established and the initiating telephone line is placed into the TALKING state.

For all possible states of the initiating telephone line other than the IDLE and RINGING states, an OFFHOOK event is ignored as described for block 148. For example, an OFFHOOK event must be undefined if the initiating telephone line is enqueued, connected to a voice path or receiving a dial tone because the telephone line must already be offhook in order to be in these states.

Figure 7:
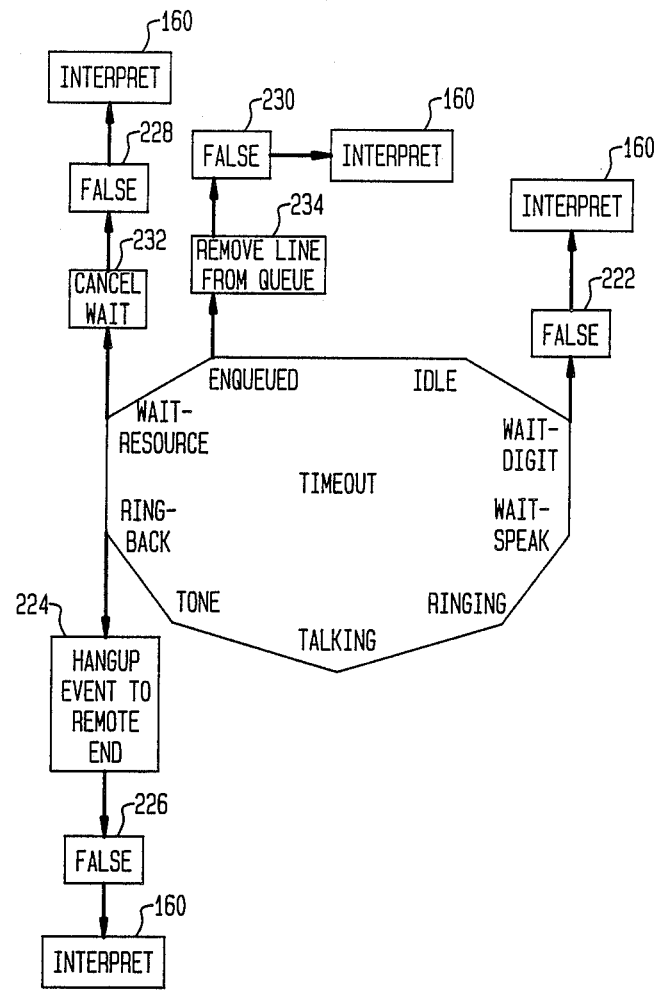

Referring now to FIG. 7, case TIMEOUT 220 is shown. If a TIMEOUT request event is received while the initiating telephone line is in the WAIT-DIGIT state, the user has delayed longer than a predetermined period of time between digits and the wait must be terminated. Therefore, a FALSE is returned as shown in block 222 and execution proceeds to interpret at block 160. Within block 160 of the WAIT-DIGIT state of case TIMEOUT 220, the initiating telephone line may be reordered and placed into the TONE state depending on the state transition rules 22 of the procedure being executed when the TIMEOUT event is received. In general it is possible for a response event to cause no actual state transitions.

If an initiating telephone line is in the RING-BACK state, the user is receiving a ringback while the called telephone line rings. However, in certain special cases the user cannot be permitted to tie up the equipment indefinitely if the called telephone line remains unanswered. Therefore timer 101 may be loaded with a predetermined time limit when a telephone line is placed in the RING-BACK state. When this limit expires, a HANGUP event is transmitted by way of server switch 34 and local switch 36 to telephone network 38 and the remote end thereby terminating the ringing at the called telephone line. The RING-BACK state of the calling telephone line is caused to be terminated by returning a FALSE in block 226 and execution proceeds to interpret at block 160.

Similarly, if the TIMEOUT request event is received while a telephone line is in the WAIT-RESOURCE or ENQUEUED state, a FALSE is returned as shown at blocks 228, 230 respectively to indicate that the time permitted for waiting for a resource or for being enqueued has expired. Execution then proceeds to interpret at block 160.

Referring now to FIG. 8, case DONESPEAK 240 is shown. When a telephone line is in the WAIT-SPEAK state it is receiving an announcement from speech synthesis device 32. When speech synthesis device 32 completes announcement of the message, the DONESPEAK 240 request event is initiated by speech synthesis device 32. When a DONESPEAK request event is received while the telephone line is in the WAIT-SPEAK state, the connections within server switch 34 between line 44 of speech synthesis device 32 and the telephone line receiving the message from speech synthesis device 32 may be disconnected. A TRUE is returned as shown in block 242 and execution proceeds to interpret at block 160. The DONESPEAK request event is ignored for all other states.

Figure 9:
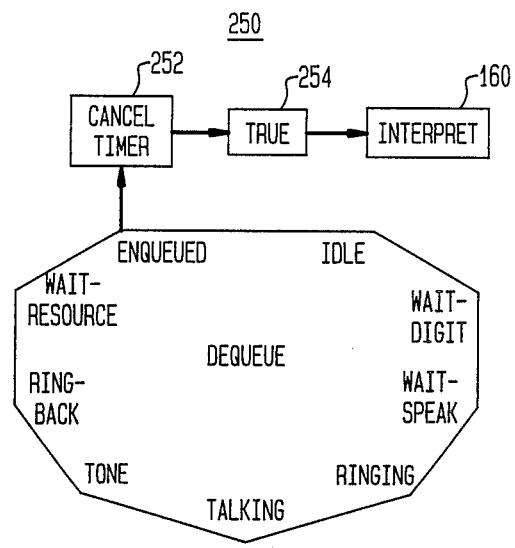

Referring now to FIG. 9, case DEQUEUE 250 is shown. When a telephone line is in the ENQUEUED state, timer 101 may be set to prevent the telephone line from being enqueued indefinitely. Therefore, when the telephone line is dequeued, timer 101 is canceled as shown in block 252 and TRUE is returned as shown in block 254. Execution then proceeds to interpret at block 160 in which the next state of the initiating telephone line is determined by the request event which was dequeued.

Figure 10:
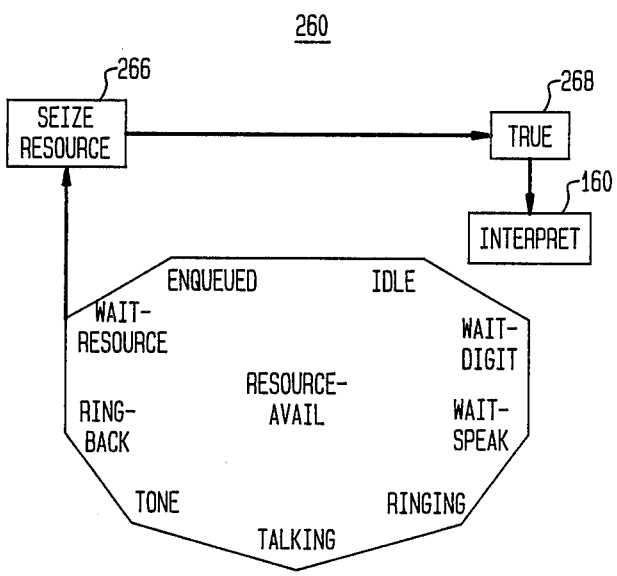

Referring now to FIG. 10, case REDSOURCE-AVAIL 260 is shown. When a telephone line is waiting for a resource, it is placed in the WAIT-RESOURCE state until the resource is available. Availability is indicated with the issuance of a RESORCE—AVAIL event by the line that is freeing that resource. The resource is seized as shown in block 266 and a TRUE is returned as shown in block 268. Execution then proceeds to interpret at block 160 in which the next state of the initiating telephone line is determined by the primitive or procedure which requested the resource.

Figure 11:
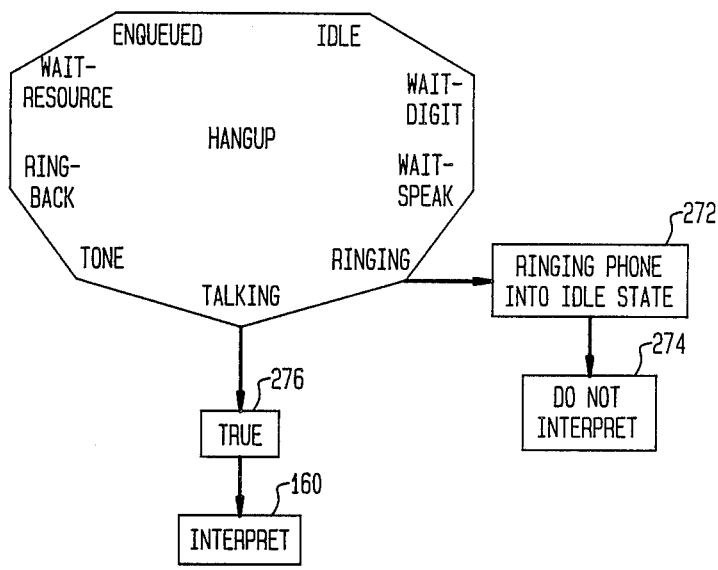

Referring now to FIG. 11, case HANGUP 270 is shown. If an initiating line is in the RINGING state, it is receiving a signal from ringing circuit 74 because a calling telephone has dialed it as previously described. When the calling telephone line hangs up, initiating the HANGUP event, the called telephone line is placed into the IDLE state as shown in block 272. Block 272 is thus an example of a low level state transition rule 24 performed during the state machine processing of block 156 in which the state of the initiating telephone line is changed without an access of keys database 14 or procedures databases 16 by interpreter program 12. There is no need of further interpreting as shown in block 274 and a negative determination is made at decision 158 of main routine 140, causing main routine 140 to check the request event queue at decision 144 rather than to interpret at block 160.

If the HANGUP event is received while the initiating telephone line is in the TALKING state, a TRUE value is returned as shown in block 276 and execution proceeds to interpret at block 160 in which the voice path of the initiating line is disconnected. All states other than RINGING and TALKING are invalid for a HANGUP event.

Figure 12:
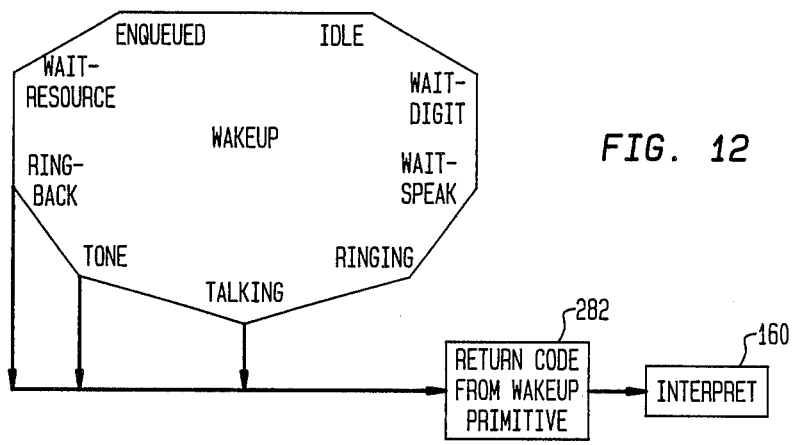

Referring now to FIG. 12, case WAKEUP 280 is shown. The WAKEUP event is initiated as needed to wakeup and synchronize terminations within system 10. A return code is specified in an argument field of the primitive for use by interpreter program 12 during interpretation as shown in block 282.

Figure 13:
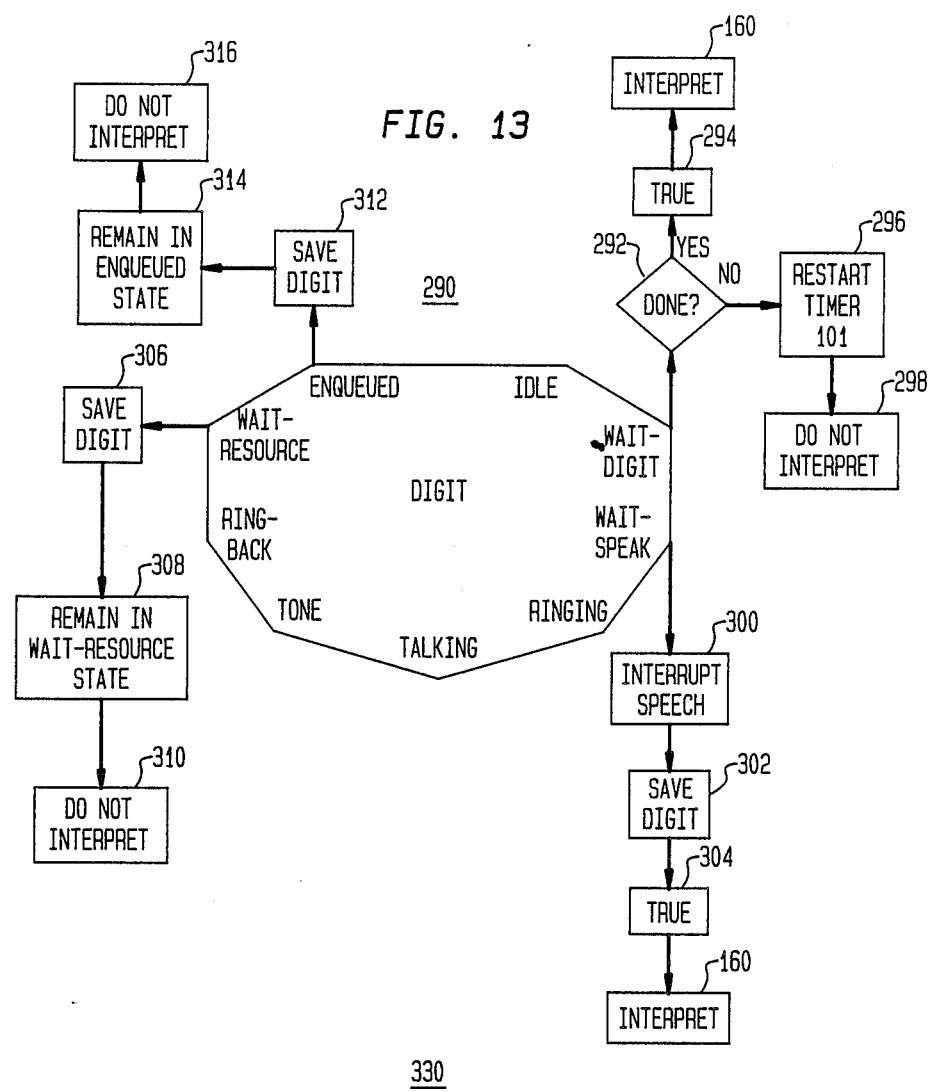

Referring now to FIG. 13, case DIGIT 290 is shown. If the initiating telephone line is in the WAIT-DIGIT state when a digit is dialed by a telephone user thereby initiating a DIGIT request event, the digit received is automatically saved in a buffer as indicated in the argument field of the COLLECT or RECEIVE primitive and a determination is made at decision 292 whether the digit received satisfies the number of digits requested by the COLLECT or RECEIVE primitive.

If the digit giving rise to the DIGIT request event under consideration satisfies the number of digits requested, TRUE is returned as shown in block 294 and execution proceeds to interpret at block 160. If more digits are expected, as determined at decision 292, timer 101 is restarted to keep track of the interdigit time as shown in block 296 and the initiating telephone line remains in the WAIT DIGIT state and interpreter program 12 does not interpret as shown in block 298.

Receipt of a DIGIT request event while the initiating telephone line is in the WAIT-SPEAK state causes a premature interruption of the message being announced by speech synthesis device 32 as shown in block 300. The digit received is saved as shown in block 302. TRUE is returned as shown in block 304 and execution proceeds to interpret at block 160.

When a digit arrives while the initiating telephone line is in the WAIT-RESOURCE state, the digit is saved as shown in block 306 and the initiating telephone line remains in the WAIT-RESOURCE state as shown in block 308. The initiating telephone line continues to wait for the resorce to be allocated and interpreter program 12 does not interpret as shown in block 310. Similarly, if the initiating telephone line is in the ENQUEUED state, the received digit is saved as shown in block 312. The initiating telephone line remains in the ENQUEUED state and interpreter program 12 does not interpret as shown in blocks 314,316.

Figure 14:
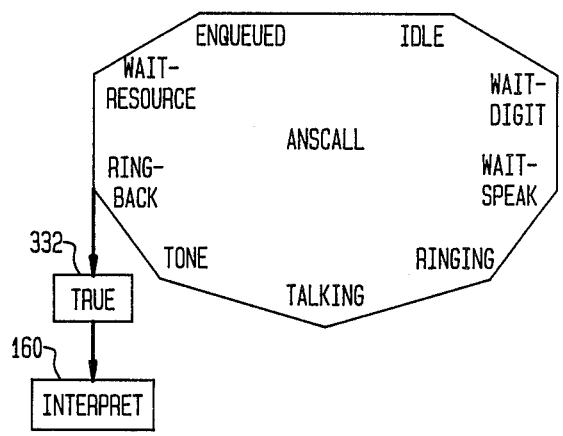

Referring now to FIG. 14, case ANSCALL 330 is shown. ANSCALL is an internally generated request event for indicating that the called telephone line has been answered. Thus when a calling telephone line 40 is in the RING-BACK state and event ANSCALL is received, a logical TRUE is produced as shown in block 332 and execution proceeds to interpret at block 160. Event ANSCALL is undefined for all other states.

Figure 15:
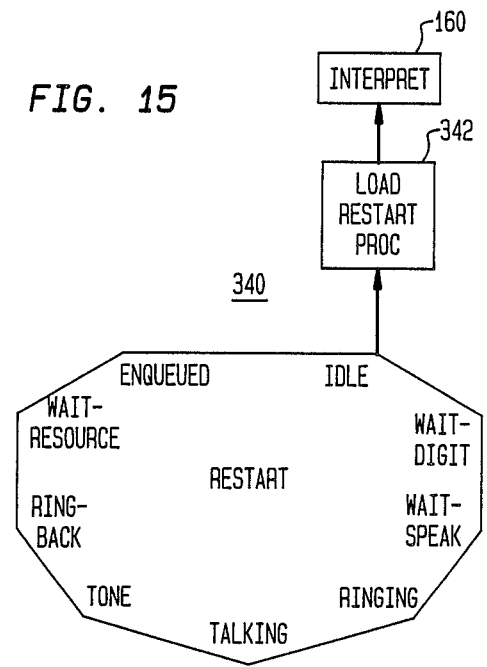

Referring now to FIG. 15, case RESTART 340 is shown. RESTART is a request event generated internally to interpreter program 12 when the interpretation of lines of a procedure comes to a logical end and the initiating telephone line is still OFFHOOK. This situation may occur for example, when a user leaves a telephone OFFHOOK after the remote end has hung up. Interpreter program 12 thus loads procedure restart, set forth in Table 3-86 of Appendix 3, as shown in block 342 and proceeds to interpret procedure restart in block 160. Procedure restart includes record firstkey, residing in keys database 12 and set forth in Appendix 2 as Table 2-10, for causing interpreter program 12 to prepare to receive key presses from telephone stations 28,30 as previously described.

Figure 16:
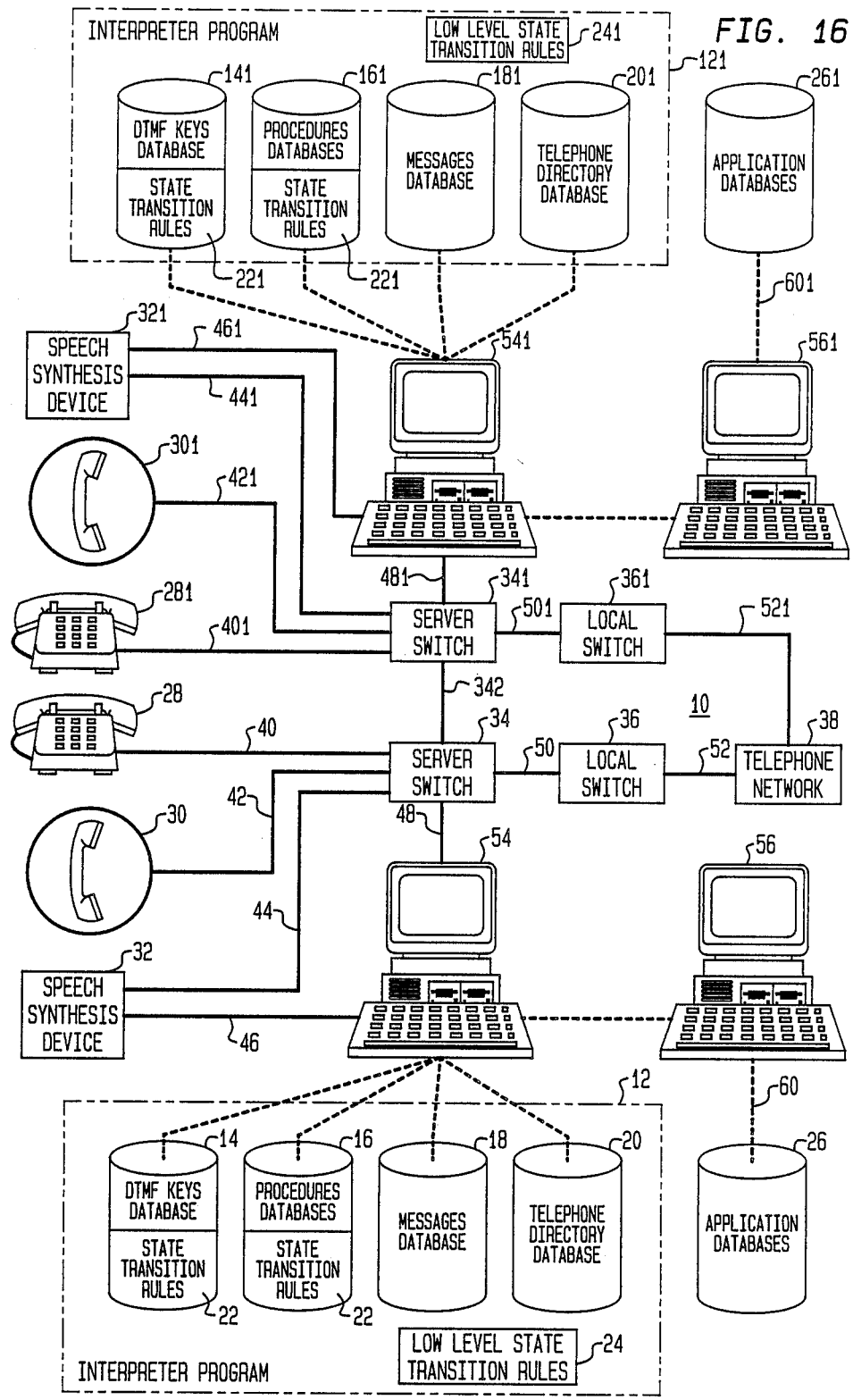
FIG. 16 is a block diagram of multiple server means for interconnecting groups of terminating means to the telephone network.

The foregoing discussion has focused on the case of single server means interconnecting a simple grouping of terminating means to the telephone network. A logical extension to this arrangement for serving a larger geographical area is to provide additional server means to interconnect other groupings of terminating means to the telephone network. The plurality of server means are directly connected to pass control information among the server means to establish call connections. Such an arrangement is depicted in FIG. 16, which is basically FIG. 1 replicated fo the case of two server means. The replicated elements of FIG. 16 have the numeral one appended to reference numeral of the counterpart element from FIG. 1. Also, link 342 interconnects server mans 34 and 341. With the arrangement of FIG. 16, it is now possible to transmit control information generated by one server means to the other server means and thereby activate and control the other server means.

APPENDIX 1

Instructions of Primitives

Bernardis-Fowler-Schwartz 1-1-1

```
/*
 * PRIMITIVE: ALLOCATE
 */
allocate(lp, arg)
struct phone_line *lp;
char *arg;
{
    int timer;
    char r_name[9], msp_cmd[32];
    int s, r, o, n, l, eqp;
    struct phone_line *llp, *eq2lp();

if (lp -> on_off == E_ONHOOK) {
        return(0);
    }

/* parse the arguments */
    n = sscanf(arg, "%s %d", r_name, &timer);
    if (n == 0) {
        w_printf(tr_wnd, "Need a resource name\n");
        return(0);
    }
    if (n == 1) timer = -1;

/* find slot in the line structure */
    for (s=0; s<MAXLRSC; s++)
        if (lp -> ln_rsc[s].rsc_equip == 0) break;
    if (s >= MAXLRSC) {
        w_printf(tr_wnd, "Line %04d has too many resources\n", lp -> line_equip);
        return(0);
    }

/* identify the resource */
    for (r=0; r<MAXRSC; r++)
        if (strcmp(r_name, rsc[r].rname) == 0) break;
    if (r >= MAXRSC) {
        w_printf(tr_wnd, "Unknown resource name: '%s'\n", r_name);
        mexit();
    } if (MSP_MANAGED(r) && timer > 0) {
        w_printf(tr_wnd, "Cannot set timer for MSP-managed resources\n");
        timer = -1;
    } o = 0;
    if (PC_MANAGED(r)) {
        /* look for a free instance of this resource */
        for (o=0; o<rsc[r].n_rsc; o++) {
            if (rsc[r].r_occ[o].rln == NULL) {
                /* found one */
                /* make sure that the MSP hasn't seized it */
                if (MSP_MANAGED(r)) {
                    llp = eq2lp(rsc[r].r_occ[o].reqp);
                    if (llp == NULL) break;
                    if (llp -> state == IDLE) break;
                }
                else break;
            }
        }
        if (o >= rsc[r].n_rsc) {
            /* all resources are busy - queue up if possible */
            if (timer != 0) {
                if (rsc[r].rlast) rsc[r].rlast -> qnxt = lp;
                lp -> qnxt = NULL;
                rsc[r].rlast = lp;
                if (rsc[r].rfrst == NULL) rsc[r].rfrst = lp;
                new_state(lp, WT_RSC);

set_tmr(lp, timer);
```

```
            }
            return(0);
        }
    } rsc[r].r_occ[o].rln = lp;
    eqp = rsc[r].r_occ[o].reqp;

if (MSP_MANAGED(r)) {
        switch (rsc[r].r_arg) {
        case ARGEQP:
            sprintf(msp_cmd, "%s %04d", rsc[r].r_msp, rsc[r].r_occ[o].reqp);
            break;
        case ARGNM:
            sprintf(msp_cmd, "%s %s", rsc[r].r_msp, rsc[r].rname);
            break;
        default:
            w_printf(tr_wnd, "Invalid resource argument spec\n");
            mexit();
        }
        eqp = msp_get(msp_cmd, rsc[r].r_ack, rsc[r].r_nak);
        if (eqp == 0) {
            /* MSP didn't give it to us */
            rsc[r].r_occ[o].rln = NULL;
            return(0);
        }
        if (!PC_MANAGED(r))
            seteqp(lp, eqp); /* direct evts from this resource to this line */
    } strcpy(lp -> ln_rsc[s].rsc_nm, r_name);
    lp -> ln_rsc[s].rsc_equip = eqp;
    lp -> ln_rsc[s].rsc_port  = rsc[r].r_occ[o].rport;
    lp -> ln_rsc[s].rsc_occ   = r;
    return(1);
}
/*
 * PRIMITIVE: ANNOUNCE
 */
announce(lp, arg)
struct phone_line *lp;
char *arg;
{
    int n, i;
    struct s_announce ann;
    char ann_nm[9], ann_fl[16];

if (lp -> on_off == E_ONHOOK) {
        return(0);
    } for (i=0; i<MAXLRSC; i++)
        if (strcmp(lp -> ln_rsc[i].rsc_nm, spchdvc) == 0) break;

if (i >= MAXLRSC) {
        w_printf(tr_wnd, "Line does not have DECTalk allocated\n");
        return(0);
    } if (lp -> conn_port != lp -> ln_rsc[i].rsc_port) {
        w_printf(_wnd, "Line does not have DECTalk connected\n");
        return(0);
    } n = sscanf(arg, "%s %s", ann_nm, ann_fl);
    if (n == 0) {
        w_printf(tr_wnd, "Announcement name is required\n");
        return(0);
    }
    if (n == 2) { /* speak file */
        if (strcmp(ann_nm, "-f") != 0) {
            w_printf(tr_wnd, "Bad announce argument: '%s'\n", ann_nm);
            return(0);
        }
        return(spk_file(lp, ann_fl));
```

```
    )
    /* else, n = 1 -> an announcement name is specified */ if (!read_ann(lp, ann_nm, &ann)) {
        w_printf(tr_wnd, "Unknown announcement name: '%s'\n", ann_nm);
        return(0);
    } for (n=0; n<8; n++) {
        for (i=strlen(ann.ann_line[n])-1; i>=0 && ann.ann_line[n][i] == ' '; i--);
        if (i < 0) continue;

ann.ann_line[n][i+1] = '\0';
        t_speak(lp, ann.ann_line[n]);
        dt_puts(lp -> conn_port, "                    ");
        dt_puts(lp -> conn_port, ann.ann_line[n]);
        dt_putc(lp -> conn_port, '\n');
    }
    lp -> l_parms[0] = dt_mark(lp -> conn_port);
    lp -> state = WT_SPK;
    stat(lp, S_BEGIN, "SPEAK", "");
    return(1);
}
/*
 * PRIMITIVE: ANSWER
 */
answer(lp, arg)
struct phone_line *lp;
char *arg;
{
    msp_aw(lp -> line_equip);
    return(1);
}
/*
 * PRIMITIVE: CLEANUP
 */
cleanup(lp, arg)
struct phone_line *lp;
char *arg;
{
    lp -> lastkey = ' ';
    lp -> ta_hd = lp -> ta_tl = 0;
    return(clrbuf(lp, -1));
}
/*
 * PRIMITIVE: COLLECT
 */
collect(lp, arg)
struct phone_line *lp;
char *arg;
{
    int n, n_keys, buf, tval;
    char c, endkey[8];

if (lp -> on_off == E_ONHOOK) {
        return(0);
    } n = sscanf(arg, "%d %d %d %s", &n_keys, &buf, &tval, endkey);
    switch (n) {
    case 0:
        n_keys = 1;
    case 1:
        buf = 0;
    case 2:
        tval = -1;
    case 3:
        *endkey = '\0';
    }

/* see what chars we have in the type-ahead buffer */
    while (n_keys && (lp -> ta_hd != lp -> ta_tl)) {
        lp -> lastkey = lp -> ta_buffer[lp -> ta_hd];
        addbuf(lp, buf, lp -> ta_buffer[lp -> ta_hd++]);
        if (lp -> ta_hd == TABUFLEN) lp -> ta_hd = 0;
        if (lp -> lastkey == *endkey)
```

```
                n_keys = 0;
            else
                n_keys--;
        }
        if (n_keys == 0) return(1);

lp -> l_parms[0] = n_keys;
        lp -> l_parms[1] = buf;
        lp -> l_parms[2] = tval;
        lp -> l_parms[3] = *endkey;
        new_state(lp, WT_DIGIT);
        stat(lp, S_BEGIN, "DIGIT", "");

set_tmr(lp, tval);  /* start the inter-digit timer */
        return(1);
}
/*
 * PRIMITIVE: CONF
 */
do_conf(lp, arg)
struct phone_line *lp;
char *arg;
{
        int n, eqp, i, cmax;
        char cname[9], msp_nm[4];

if (lp -> on_off == E_ONHOOK) {
                return(0);
        } n = sscanf(arg, "%d %s", &cmax, cname);
        if (n != 2) {
                w_printf(tr_wnd, "Invalid number of parms to conf\n");
                return(0);
        } switch (cmax) {
        case 4:
                strcpy(msp_nm, "C4");
                break;
        case 8:
                strcpy(msp_nm, "C8");
                break;
        default:
                w_printf(tr_wnd, "Invalid conference size - must be 4 or 8\n");
                return(0);
        }
        eqp = msp_rv(msp_nm);
        if (eqp == 0) return(0);

strtconf(cname, eqp, cmax, lp -> line_equip);
        return(1);
}
/*
 * PRIMITIVE: CONNECT
 */
connect(lp, arg)
struct phone_line *lp;
char *arg;
{
        char carg[NCARGS][CARGLEN];
        char eqp1[8], eqp2[8], eqp3[8], dir;
        int n, i, j, time, old_state;

time = 0;
        old_state = lp -> state;

if (lp -> on_off == E_ONHOOK) {
                /* how can we connect an onhook phone to anything */
                return(0);
        } sprintf(eqp1, "%04d", lp -> line_equip);

n = sscanf(arg, "%s %s %s %s %s %s %s",
            carg[0], carg[1], carg[2], carg[3], carg[4], carg[5], carg[6]);
```

```
        i = 0;
        j = connspec(lp, carg, i, eqp2, &dir);
        if (j == 0) return(0);
        i = i + j;
        conndir(eqp1, eqp2, dir);
        if (i < n) {
            time = atoi(carg[i++]);
            if (i != n) {
                j = connspec(lp, carg, i, eqp3, &dir);
                if (j == 0) return(0);
                i = i + j;
                conndir(eqp1, eqp3, dir);
            }
            else {
                *eqp3 = '\0';
                /* don't change state if this is only a temporary connection */
                new_state(lp, old_state);
            }
        }
        if (i != n) {
            w_printf(tr_wnd, "Invalid number of arguments to connect\n");
            return(0);
        }
    }
    msp_gp(eqp1, eqp2, time, eqp3);
    return(1);
}
/*
 * PRIMITIVE: DECTALK
 */
do_dtk(lp, arg)
struct phone_line *lp;
char *arg;
{
    char darg[8][3];
    int n, i, port;

for (i=0; i<MAXLRSC; i++)
        if (strcmp(lp -> ln_rsc[i].rsc_nm, spchdvc) == 0) break;

if (i >= MAXLRSC) {
        w_printf(tr_wnd, "Line does not have DECTalk allocated\n");
        return(0);
    } port = lp -> ln_rsc[i].rsc_port;

n = sscanf(arg, "%s %s %s %s %s %s %s %s",
        darg[0], darg[1], darg[2], darg[3],
        darg[3], darg[5], darg[6], darg[7]);

for (i=0; i<n; i++) {
        if (strcmp(darg[i], "KP") == 0)
            dt_phone(port, PH_KEYPAD, "");
        else if (strcmp(darg[i], "NK") == 0)
            dt_phone(port, PH_NOKEYPAD, "");
        else {
            w_printf(tr_wnd, "Invalid DECTalk mnemonic: '%s'\n", darg[i]);
            return(0);
        }
    }
    return(1);
}
/*
 * PRIMITIVE: DEQUEUE
 */
dequeue(lp, arg)
struct phone_line *lp;
char *arg;
{
    int i;
    struct phone_line *qlp;
    char qnm[9];

i = sscanf(arg, "%s", qnm);
```

```
    if (i == 0) {
        w_printf(tr_wnd, "Need a queue name\n");
        return(0);
    } for (i=0; i<MAXQ; i++)
        if (strcmp(qnm, qname[i]) == 0) break;

if (i >= MAXQ)
        /* no such queue - just return */
        return(0);

qlp = qhd[i];   /* point to first in queue */
    qhd[i] = qlp -> qnxt;   /* advance queue ptr */
    if (qhd[i] == NULL) {
        /* queue is now empty */
        qtl[i] = NULL;
        qname[i][0] = '\0';
    }

/* send an event to the line we just freed */
    if (qlp) add_evt(qlp, E_DEQUEUE, "", "", "", "", "");
    return(1);
}
/*
 * PRIMITIVE: ENQUEUE
 */
enqueue(lp, arg)
struct phone_line *lp;
char *arg;
{
    int i, timer;
    char qnm[9];

if (lp -> on_off == E_ONHOOK) {
        return(0);
    } i = sscanf(arg, "%s %d", qnm, &timer);
    if (i == 0) {
        w_printf(tr_wnd, "Need a queue name\n");
        return(0);
    }
    if (i == 1) timer = -1;

for (i=0; i<MAXQ; i++)
        if (strcmp(qnm, qname[i]) == 0) break;

if (i >= MAXQ) {
        /* didn't find a queue by that name - create one */
        for (i=0; i<MAXQ; i++) {
            if (qname[i][0] == '\0') {
                strcpy(qname[i], qnm);
                break;
            }
        }
        if (i >= MAXQ) {
            w_printf(tr_wnd, "Too Many active queues\n");
            mexit();
        }
    }

/* add to queue i */
    lp -> qnxt = NULL;
    if (qhd[i] == NULL) {
        /* first in queue */
        qhd[i] = qtl[i] = lp;
    }
    else {
        if (qtl[i]) qtl[i] -> qnxt = lp;
        qtl[i] = lp;
    }
    new_state(lp, ENQUEUED);
    set_tmr(lp, timer);
    return(1);
}
```

```
/*
 * PRIMITIVE: FREE
 */
do_free(lp, arg)
struct phone_line *lp;
char *arg;
{
    int i, s, r, o;
    char r_name[9], str1[16], str2[16];

i = sscanf(arg, "%s", r_name);
    if (i == 0) {
        w_printf(tr_wnd, "Resource name required\n");
        return(0);
    }

/* find the slot in the line structure */
    for (s=0; s<MAXLRSC; s++)
        if (strcmp(r_name, lp -> ln_rsc[s].rsc_nm) == 0) break;
    if (s >= MAXLRSC) {
        w_printf(tr_wnd, "Line %04d does not have %s allocated\n",
            lp -> line_equip, r_name);
        return(0);
    }

/* find the slot in the resource structure */
    r = lp -> ln_rsc[s].rsc_occ;

/* find the occurrence of the resource that is being used */
    if (PC_MANAGED(r)) {
        for (o=0; o<rsc[r].n_rsc; o++)
            if (lp == rsc[r].r_occ[o].rln) break;
        if (o >= rsc[r].n_rsc) {
            w_printf(tr_wnd, "Something's wrong in the resource routines\n");
            mexit();
        }
    }

/* free the resource at the MSP */
    if (MSP_MANAGED(r)) {
        if (!PC_MANAGED(r))
            seteqp(NULL, lp -> ln_rsc[s].rsc_equip);
        msp_rls(lp -> ln_rsc[s].rsc_equip);
    }

/* free the resource at the PC */
if (PC_MANAGED(r)) {
    rsc[r].r_occ[o].rln = NULL;

/* see if we can give the resource to a queued up line */
    if (rsc[r].rfrst) {
        /* assign resource to first line on queue and nudge that line */
        rsc[r].r_occ[o].rln = rsc[r].rfrst;
        sprintf(str1, "%04d", rsc[r].r_occ[o].reqp);
        sprintf(str2, "%d", rsc[r].r_occ[o].rport);
        add_evt(rsc[r].rfrst, E_RSCAVL, r_name, str1, str2, "", "");

/* remove the line from the queue */
        rsc[r].rfrst = rsc[r].rfrst -> qnxt;
        if (rsc[r].rfrst == NULL)
            rsc[r].rlast = NULL;
    }
}

/* break any logical connection and remove resource from line structure */
/*
 * PRIMITIVE: FREE
 */
do_free(lp, arg)
struct phone_line *lp;
char *arg;
{
    int i, s, r, o;
    char r_name[9], str1[16], str2[16];
```

```
    i = sscanf(arg, "%s", r_name);
    if (i == 0) {
        w_printf(tr_wnd, "Resource name required\n");
        return(0);
    }

/* find the slot in the line structure */
    for (s=0; s<MAXLRSC; s++)
        if (strcmp(r_name, lp -> ln_rsc[s].rsc_nm) == 0) break;
    if (s >= MAXLRSC) {
        w_printf(tr_wnd, "Line %04d does not have %s allocated\n",
            lp -> line_equip, r_name);
        return(0);
    }

/* find the slot in the resource structure */
    r = lp -> ln_rsc[s].rsc_occ;

/* find the occurrence of the resource that is being used */
    if (PC_MANAGED(r)) {
        for (o=0; o<rsc[r].n_rsc; o++)
            if (lp == rsc[r].r_occ[o].rln) break;
        if (o >= rsc[r].n_rsc) {
            w_printf(tr_wnd, "Something's wrong in the resource routines\n");
            mexit();
        }
    }

/* free the resource at the MSP */
    if (MSP_MANAGED(r)) {
        if (!PC_MANAGED(r))
            seteqp(NULL, lp -> ln_rsc[s].rsc_equip);
        msp_rls(lp -> ln_rsc[s].rsc_equip);
    }

/* free the resource at the PC */
    if (PC_MANAGED(r)) {
        rsc[r].r_occ[o].rln = NULL;

/* see if we can give the resource to a queued up line */
        if (rsc[r].rfrst) {
            /* assign resource to first line on queue and nudge that line */
            rsc[r].r_occ[o].rln = rsc[r].rfrst;
            sprintf(str1, "%04d", rsc[r].r_occ[o].reqp);
            sprintf(str2, "%d", rsc[r].r_occ[o].rport);
            add_evt(rsc[r].rfrst, E_RSCAVL, r_name, str1, str2, "", "");

/* remove the line from the queue */
            rsc[r].rfrst = rsc[r].rfrst -> qnxt;
            if (rsc[r].rfrst == NULL)
                rsc[r].rlast = NULL;
        }
    }

/* break any logical connection and remove resource from line structure */
    if (lp -> ln_rsc[s].rsc_equip == lp -> conn_equip) {
        lp -> conn_equip = 0;
        lp -> conn_port = -1;
        msp_tone(lp -> line_equip, "SI");
    }
    lp -> ln_rsc[s].rsc_equip = 0;
    lp -> ln_rsc[s].rsc_port = -1;
    lp -> ln_rsc[s].rsc_nm[0] = '\0';
    return(1);
}

/*
 * PRIMITIVE: EXIT
 */
do_exit(lp)
struct phone_line *lp;
{
    lp -> exit_flg = 1;
    return(1);
}
```

```
/*
 * PRIMITIVE: GETPKT
 */
getpkt(lp, arg)
struct phone_line *lp;
char *arg;
{
        int n, rc, bl, retry, nretries;
        char buf[2048], fraddr[16], bufname[8];

n = sscanf(arg, "%s %s", fraddr, bufname);
        if (n != 2) {
                w_printf(tr_wnd, "Invalid number of parameters to getpkt\n");
                return(0);
        } retry = 0;
        nretries = 0;
        do {
                rc = l3recv(myaddr, fraddr, buf, &bl);
        } while (rc    == 0 && (nretries == 0 || retry++ <= nretries));

if (rc == 0) return(0);         /* no packet received */ if (setbuf(lp, *bufname, buf, bl) == 0) {
                w_printf(tr_wnd, "Invalid packet target: '%c'\n", *bufname);
                return(0);
        }
}
/*
 * PRIMITIVE: JUMP
 */
jump(lp, arg)
struct phone_line *lp;
char *arg;
{
    int n, nlx, ntf;
    char ctf[8];

n = sscanf(arg, "%d %s", &nlx, ctf);
    switch (n) {
    case 0: nlx = 0;
    case 1: *ctf = 'm';
    } switch (*ctf) {
    case 'm': ntf = 0; break;
    case 't': ntf = 1; break;
    case 'f': ntf = 2; break;
    default:
        w_printf(tr_wnd, "Invalid execution path: '%c', must be 'm', 't', or 'f'\n", *ctf);
        return(0);
    } if (nlx < 0 || nlx > PROCSIZE) {
        w_printf(tr_wnd, "Invalid line number: %d\n", nlx);
        return(0);
    } inc_flg = 0;
    lp -> hdr -> lx = nlx;
    lp -> hdr -> ltf = ntf;
    return(1);
}
/*
 * PRIMITIVE: PULSE
 */
pulse(lp, arg)
struct phone_line *lp;
char *arg;
{
    char ctype[4], cname[9], digits[20];
    int n, prt;
    char eqp[8];
```

```
    if (lp -> on_off == E_ONHOOK) {
        return(0);
    } n = sscanf(arg, "%s %s %s", ctype, cname, digits);
    if (n != 3) {
        w_printf(tr_wnd, "Invalid number of parameters to Pulse\n");
        return(0);
    } nm2eqp(lp, *ctype, cname, eqp, &prt);
    if (*eqp == NULL) return(0);

msp_sd(eqp, digits);
    return(1);
}
/*
 * PRIMITIVE: PUTPKT
 */
putpkt(lp, arg)
struct phone_line *lp;
char *arg;
{
        int n, rc, bl;
        char toaddr[16], bufname[8], *bp, *getbuf();;

n = sscanf(arg, "%s %s", toaddr, bufname);
        if (n != 2) {
                w_printf(tr_wnd, "Invalid number of parameters to putpkt\n");
                return(0);
        } bp = getbuf(lp, *bufname, &bl);
        if (bp == NULL) {
                if (*bufname == 'S')
                        w_printf(tr_wnd, "String register is empty\n");
                else
                        w_printf(tr_wnd, "Invalid packet source: '%c'\n", *bufname);
                return(0);
        } rc = snd_pkt(toaddr, bp, bl);
        return(rc);
}
/*
 * PRIMITIVE: RECEIVE
 */
receive(lp, arg)
struct phone_line *lp;
char *arg;
{
    if (lp -> on_off == E_ONHOOK) {
        return(0);
    }
    msp_rd(lp -> line_equip, 1);
    return(collect(lp, arg));
}
/*
 * PRIMITIVE: RETURN
 */
do_return(lp, arg)
struct phone_line *lp;
char *arg;
{
    lp -> hdr -> lx = lp -> hdr -> nln;  /* make exec think we went past */
                                         /* the end of the procedure */ if (*arg == 't' || *arg == 'T' || *arg == '1')
        return(1);
    else
        return(0);
}
/*
 * PRIMITIVE: RING
 */
```

```
ring(lp, arg)
struct phone_line *lp;
char *arg;
{
    int n, reqp, timeout;
    char rparm[8], rtype[4];
    struct phone_line *rlp, *eq2lp();

if (lp -> on_off == E_ONHOOK) {
        return(0);
    } n = sscanf(arg, "%s %d %s %d", rtype, &reqp, rparm, &timeout);
    switch (n) {
    case 2:
        *rparm = '\0';
    case 3:
        timeout = -1;
    case 4:
        break;
    default:
        w_printf(tr_wnd, "Invalid number of parms to ring\n");
        return(0);
    } rlp = eq2lp(reqp);
    if (rlp == NULL) return(0);
    if (rlp -> state != IDLE) return(0);

if (*rtype != 'O' && *rtype != 'I') {
        w_printf(tr_wnd, "Invalid ringing type\n");
        return(0);
    } new_state(rlp, RINGING);
    rlp -> conn_equip = lp -> line_equip;
    rlp -> conn_lpt = lp;
    rlp -> conn_port = -1;
    msp_rng(*rtype, reqp, rparm);
    msp_tone(lp -> line_equip, "RB");
    new_state(lp, RINGBACK);
    lp -> conn_equip = reqp;
    lp -> conn_lpt = rlp;
    lp -> conn_port = -1;

set_tmr(lp, timeout);
    return(1);
}
/*
 * PRIMITIVE: ROUTE
 */
route(lp, arg)
struct phone_line *lp;
char *arg;
{
    int n, buf, rc;
    struct s_drctry drct;
    struct code_line cline;
    int desteqp;
    char tstr[32], intflg[4];
    char intproc[9], extproc[9];

if (lp -> on_off == E_ONHOOK) return(0);

n = sscanf(arg, "%d %s %s %s", &buf, intflg, intproc, extproc);
    switch (n) {
    case 0:
        buf = 0;
    case 1:
        *intflg = 'y';
    case 2:
        strcpy(intproc, "int_call");
    case 3:
        strcpy(extproc, "ext_call");
    }
```

```
    if (buf < 0 || buf >= NBUFS) {
        w_printf(tr_wnd, "Illegal buffer number\n");
        return(0);
    } if (*(lp -> key_buf[buf]) == '\0') return(0);

if (*intflg == 'y') {
        if (lp -> key_buf[buf][0] == '1')
            rc = read_dir(lp, &(lp -> key_buf[buf][1]), &drct);
        else
            rc = read_dir(lp, lp -> key_buf[buf], &drct);
        if (rc) {
            strcpy(cline.p_name, drct.pr_nm);
            strcpy(cline.p_arg,  drct.pr_arg);
            cline.t_name[0] = cline.f_name[0] = '\0';
            cline.t_arg[0]  = cline.f_arg[0]  = '\0';
            rc = load_line(lp, &cline);
            inc_flg = 0;
            return(rc);
        }
    } if (desteqp = localcall(lp -> line_npa, lp -> key_buf[buf])) {
        /* intra-MSP call */
        sprintf(tstr, "%04d %04d %s", desteqp, lp -> line_equip,
            lp -> key_buf[buf]);
        load_proc(lp, intproc, tstr);
        inc_flg = 0;
    }
    else {
        /* extra-MSP call */
        sprintf(tstr, "%s %04d", lp -> key_buf[buf], lp -> line_equip);
        load_proc(lp, extproc, tstr);
        inc_flg = 0;
    }
}
/*
 * PRIMITIVE: SET
 */
set(lp, arg)
struct phone_line *lp;
char *arg;
{
    int n, i, neg, rc;
    char tgt[16];
    char p[6][8];

n = sscanf(arg, "%s", tgt);
    if (isnumber(tgt))
        return(setbuf(lp, arg));

w_printf(tr_wnd, "Invalid SET Target: '%s'\n", tgt);
    return(0);
} setbuf(lp, arg)
struct phone_line *lp;
char *arg;
{
    int bufn, n;
    int arg1, arg2;
    char *cp, *lstp, bval[16], junk[16], oper[4], string[32];

n = sscanf(arg, "%d %s", &bufn, bval);
    if (n == 1)
        *bval = '\0';

if (n == 0) {
        w_printf(tr_wnd, "Invalid number of parameters\n");
        return(0);
    } if (bufn < 0 || bufn > NBUFS) {
        w_printf(tr_wnd, "Invalid buffer number\n");
        return(0);
```

```c
    }
    if (*bval != '@') {
        for (cp = arg; *cp && *cp != ' '; cp++);
        for (       ;       *cp == ' '; cp++);
        if (*cp) {
            for (lstp = arg + strlen(arg) - 1; lstp > arg && *lstp == ' '; lstp--);
            *(lstp+1) = '\0';
        }
        strcpy(lp -> key_buf[bufn], cp);
        t_buffer(lp, bufn, lp -> key_buf[bufn]);
        return(1);
    }

/* function evaluation              */
/* @exp - arithmetic expression     */
/* @sub - substring expression      */
/**********************************/ if (strcmp(bval, "@exp") == 0) {
        n = sscanf(arg, "%s %s %d %s %d", junk, junk, &arg1, oper, &arg2);
        if (n != 5) {
            w_printf(tr_wnd, "Invalid numeric expression\n");
            return(0);
        }
        if (strlen(oper) != 1) {
            w_printf(tr_wnd, "Invalid numeric expression\n");
            return(0);
        }
        switch (*oper) {
        case '+':   n = arg1 + arg2; break;

case '-':   n = arg1 - arg2; break;

case '/':
            if (arg2 == 0) {
                w_printf(tr_wnd, "Divide by zero\n");
                return(0);
            }
            n = arg1 / arg2;
            break;

case '*':   n = arg1 * arg2; break;

default:
            w_printf(tr_wnd, "Invalid numeric expression\n");
            return(0);
        }
        sprintf(lp -> key_buf[bufn], "%d", n);
        t_buffer(lp, bufn, lp -> key_buf[bufn]);
        return(1);
    }
    else if (strcmp(bval, "@sub") == 0) {
        n = sscanf(arg, "%s %s %s %d %d", junk, junk, string, &arg1, &arg2);
        if (n == 4) arg2 = 999;

if (arg1 < 0 || arg1 >= strlen(string)) {
            w_printf(tr_wnd, "Invalid substring index\n");
            return(0);
        }
        strncpy(lp -> key_buf[bufn], &string[arg1], arg2);
        if (arg1 + arg2 <= strlen(string))
            lp -> key_buf[bufn][arg2] = '\0';

t_buffer(lp, bufn, lp -> key_buf[bufn]);
        return(1);
    }
    else {
        w_printf(tr_wnd, "Invalid function name: '%s'\n", bval);
        return(0);
    }
}
```

```
/*
 * PRIMITIVE: SETLINE
 */
set_line(lp, arg)
struct phone_line *lp;
char *arg;
{
        int n;
        char eqp[8], bufn[4], string[32];
        struct phone_line *llp, *eq2lp();

n = sscanf(arg, "%s %s %s", eqp, bufn, string);

if (n < 2 || n > 3) {
                w_printf(tr_wnd, "Invalid number of parameters to setline\n");
                return(0);
        } if (n == 2) *string = '\0';

llp = eq2lp(atoi(eqp));
        if (llp == NULL) {
                w_printf(tr_wnd, "Invalid equipment number: '%s'\n", eqp);
                return(0);
        } n = atoi(bufn);
        if (isdigit(*bufn) || *bufn == 'S') {
                setbuf(llp, *bufn, string, -1);
                return(1);
        }
        else {
                w_printf(tr_wnd, "Invalid buffer number: %s\n", bufn);
                return(0);
        }
}
/*
 * PRIMITIVE: SETPROC
 */
set_proc(lp, arg)
struct phone_line *lp;
char *arg;
{
    char s_proc[16], d_proc[16], r_proc[16];
    struct phone_line *llp, *eq2lp();
    int n, eqpn;

n = sscanf(arg, "%d %s %s %s", &eqpn, s_proc, d_proc, r_proc);
    switch (n) {
    case 0:
        w_printf(tr_wnd, "Equipment number needed\n");
        return(0);
    case 1:
        *s_proc = '\0';
    case 2:
        *d_proc = '\0';
    case 3:
        *r_proc = '\0';
    } llp = eq2lp(eqpn);
    if (llp == NULL) {
        w_printf(tr_wnd, "Invalid equipment number\n");
        return(0);
    } if (*s_proc == '-') *s_proc = '\0';
    if (*d_proc == '-') *d_proc = '\0';
    if (*r_proc == '-') *r_proc = '\0';

set_pproc(llp, s_proc, d_proc, r_proc);
    return(1);
}
```

```c
/*
 * PRIMITIVE: STAT
 */
do_stat(lp, arg)
struct phone_line *lp;
char *arg;
{
    char args[4][8], avg_str[16];
    int n, i, j, rc;

n = sscanf(arg, "%s %s %s %s", args[0], args[1], args[2], args[3]);

rc = 1;
    for (i=0; i<n; i++) {
        if (strcmp(args[i], "on") == 0) {
            lp -> stat_flg = 1;
        }
        else if (strcmp(args[i], "off") == 0) {
            lp -> stat_flg = 0;
        }
        else {
            w_printf(tr_wnd, "Invalid stat option: '%s'\n", args[i]);
            rc = 0;
        }
    }
    return(rc);
}
/*
 * PRIMITIVE: SWITCH
 */
do_switch(lp, arg)
struct phone_line *lp;
char *arg;
{
    char key_name[16], sw_val[16];
    struct s_key_actn key_actn;
    int n, rc;

n = sscanf(arg, "%s %s", key_name, sw_val);
    if (n == 0) {
        w_printf(tr_wnd, "Key Action Record-name required\n");
        return(0);
    } if (n == 1) {
        *sw_val = lp -> lastkey;
    } rc = read_key(lp, key_name, &key_actn);
    if (!rc) {
        w_printf(tr_wnd, "Unknown key action record: '%s'\n", key_name);
        return(0);
    } switch (*sw_val) {
    case '1': n = 0; break;
    case '2': n = 1; break;
    case '3': n = 2; break;
    case '4': n = 3; break;
    case '5': n = 4; break;
    case '6': n = 5; break;
    case '7': n = 6; break;
    case '8': n = 7; break;
    case '9': n = 8; break;
    case '*': n = 9; break;
    case '0': n = 10; break;
    case '#': n = 11; break;
    default:
        w_printf(tr_wnd, "Unknown switch value: '%c'\n", *sw_val);
        return(0);
    } load_line(lp, &key_actn.key[n]);
    inc_flg = 0;
    return(1);
}
```

```
/*
 * PRIMITIVE: TALK
 */
talk(lp)
struct phone_line *lp;
{
    if (lp -> on_off == E_ONHOOK) {
        return(0);
    }
    new_state(lp, TALKING);
    return(1);
}
/*
 * PRIMITIVE: TEST
 */
test(lp, arg)
struct phone_line *lp;
char *arg;
{
    char arg1[16], arg2[16], arg3[16];
    int n;

n = sscanf(arg, "%s %s %s", arg1, arg2, arg3);
    if (n == 3) return(tstinf(lp, arg1, arg2, arg3));
    if (n == 2) return(tstprf(lp, arg1, arg2));
    if (n == 1) return(tstprf(lp, arg1, ""));
    return(0);
} tstinf(lp, arg1, oper, arg2)
struct phone_line *lp;
char *arg1, *arg2, *oper;
{
    int n;

n = strcmp(arg1, arg2);

if (strcmp(oper, "eq") == 0)
        if (n == 0)
            return(1);
        else
            return(0);

if (strcmp(oper, "ne") == 0)
        if (n != 0)
            return(1);
        else
            return(0);

if (strcmp(oper, "lt") == 0)
        if (n < 0)
            return(1);
        else
            return(0);

if (strcmp(oper, "le") == 0)
        if (n <= 0)
            return(1);
        else
            return(0);

if (strcmp(oper, "gt") == 0)
        if (n > 0)
            return(1);
        else
            return(0);

if (strcmp(oper, "ge") == 0)
        if (n >= 0)
            return(1);
        else
            return(0);

w_printf(tr_wnd, "Invalid test operator: '%s'\n", oper);
    return(0);
}
```

```
tstprf(lp, oper, arg1)
struct phone_line *lp;
char *oper, *arg1;
{
    struct phone_line *llp, *eq2lp();
    int neg;

if (strcmp(oper, "idle") == 0) {
        /* idle equip */
        llp = eq2lp(atoi(arg1));
        if (llp == NULL) return(0);
        if (llp -> state != IDLE) return(0);
        return(1);
    } if (strcmp(oper, "conf") == 0) {
        /* test for active conference */
        if (confeqp(arg1) == 0) return(0);
        return(1);
    } if (strcmp(oper, "cnfl") == 0) {
        /* test for full conference */
        if (confull(arg1) == 0) return(0);
        return(1);
    } if (strcmp(oper, "pvn") == 0) {
        /* test for line-on-a-pvn */
        if (lp -> pvn_nbr == 0) return(0);
        return(1);
    } if (strcmp(oper, "dial") == 0) {
        /* test for dial suspension */
        if (lp -> dial_susp == 0) return(0);
        return(1);
    } w_printf(tr_wnd, "Invalid test operator: '%s'\n", oper);
    return(0);
}
/*
 * PRIMITIVE: WAKEUP
 */
wakeup(lp, args)
struct phone_line *lp;
char *args;
{
    struct phone_line *llp;
    char retval[8];
    int eqp, n;

n = sscanf(args, "%d %s", &eqp, retval);
    switch (n) {
    case 1:
        strcpy(retval, "1");
    case 2:
        break;
    default:
        w_printf(tr_wnd, "Equipment number required\n");
        return(0);
    } llp = eq2lp(eqp);
    if (llp == NULL) {
        w_printf(tr_wnd, "Invalid equipment number\n");
        return(0);
    } if (*retval == 't' || *retval == 'T' || *retval == '1')
        *retval = '1';
    else
        *retval = '0';
```

```
        add_evt(llp, E_WAKEUP, retval, "", "", "", "");

return(1);
}
```

APPENDIX 2

Key Records of DTMF Key Records
Database 14

Bernardis-Fowler-Schwartz 1-1-1

DTMF KEYS DATABASE LISTING                                     DATABASE PREFIX: cur Keys Record: 0-npa

```
+-------------------------+------------------------+----------------------+----
1|switch    npaxxx        |                        |                      |
2|switch    npaxxx        |                        |                      |
3|switch    npaxxx        |                        |                      |
4|switch    npaxxx        |                        |                      |
5|switch    npaxxx        |                        |                      |
6|switch    npaxxx        |                        |                      |
7|switch    npaxxx        |                        |                      |
8|switch    npaxxx        |                        |                      |
9|switch    npaxxx        |                        |                      |
*|reorder                 |                        |                      |
0|getcarr                 |                        |                      |
#|reorder                 |                        |                      |
+-------------------------+------------------------+----------------------+----
```
                              TABLE 2-1

Keys Record: 10-npa

```
+-------------------------+------------------------+----------------------+----
1|op_carr                 |                        |                      |
2|switch    npaxxx        |                        |                      |
3|switch    npaxxx        |                        |                      |
4|switch    npaxxx        |                        |                      |
5|switch    npaxxx        |                        |                      |
6|switch    npaxxx        |                        |                      |
7|switch    npaxxx        |                        |                      |
8|switch    npaxxx        |                        |                      |
9|switch    npaxxx        |                        |                      |
*|reorder                 |                        |                      |
0|reject    bad_nbr       |                        |                      |
#|reorder                 |                        |                      |
+-------------------------+------------------------+----------------------+----
```
                              TABLE 2-2

Keys Record: calltype

```
+-------------------------+------------------------+----------------------+----
1|collcall                |                        |                      |
2|bill3rd                 |                        |                      |
3|return    0             |                        |                      |
4|return    0             |                        |                      |
5|return    0             |                        |                      |
6|return    0             |                        |                      |
7|return    0             |                        |                      |
8|return    0             |                        |                      |
9|return    0             |                        |                      |
*|reorder                 |                        |                      |
0|return    0             |                        |                      |
#|reorder                 |                        |                      |
+-------------------------+------------------------+----------------------+----
```
                              TABLE 2-3

DTMF KEYS DATABASE LISTING                                    DATABASE PREFIX: cur Keys Record: d41x

```
+-------------------------+-------------------------+-------------------------+
1|route     0             |                         |                         |
2|coll_rte 4 0 5          |                         |                         |
3|coll_rte 4 0 5          |                         |                         |
4|coll_rte 4 0 5          |                         |                         |
5|coll_rte 4 0 5          |                         |                         |
6|coll_rte 4 0 5          |                         |                         |
7|coll_rte 4 0 5          |                         |                         |
8|coll_rte 4 0 5          |                         |                         |
9|coll_rte 4 0 5          |                         |                         |
*|reorder                 |                         |                         |
0|coll_rte 4 0 5          |                         |                         |
#|reorder                 |                         |                         |
+-------------------------+-------------------------+-------------------------+
```
TABLE 2-4

Keys Record: d4xx

```
+-------------------------+-------------------------+-------------------------+
1|collect  1 0 5          |switch    d41x           |reorder                  |
2|coll_rte 5 0 5          |                         |                         |
3|coll_rte 5 0 5          |                         |                         |
4|coll_rte 5 0 5          |                         |                         |
5|coll_rte 5 0 5          |                         |                         |
6|coll_rte 5 0 5          |                         |                         |
7|coll_rte 5 0 5          |                         |                         |
8|coll_rte 5 0 5          |                         |                         |
9|coll_rte 5 0 5          |                         |                         |
*|reorder                 |                         |                         |
0|coll_rte 5 0 5          |                         |                         |
#|reorder                 |                         |                         |
+-------------------------+-------------------------+-------------------------+
```
TABLE 2-5

Keys Record: d61x

```
+-------------------------+-------------------------+-------------------------+
1|route     0             |                         |                         |
2|coll_rte 4 0 5          |                         |                         |
3|coll_rte 4 0 5          |                         |                         |
4|coll_rte 4 0 5          |                         |                         |
5|coll_rte 4 0 5          |                         |                         |
6|coll_rte 4 0 5          |                         |                         |
7|coll_rte 4 0 5          |                         |                         |
8|coll_rte 4 0 5          |                         |                         |
9|coll_rte 4 0 5          |                         |                         |
*|reorder                 |                         |                         |
0|coll_rte 4 0 5          |                         |                         |
#|reorder                 |                         |                         |
+-------------------------+-------------------------+-------------------------+
```
TABLE 2-6

DTMF KEYS DATABASE LISTING                                    DATABASE PREFIX: cur

Keys Record: d6xx

```
+-------------------------+-------------------+------------+
1|collect  1 0 5          |switch    d61x     |reorder     
2|coll_rte 5 0 5          |                   |            
3|coll_rte 5 0 5          |                   |            
4|coll_rte 5 0 5          |                   |            
5|coll_rte 5 0 5          |                   |            
6|coll_rte 5 0 5          |                   |            
7|coll_rte 5 0 5          |                   |            
8|coll_rte 5 0 5          |                   |            
9|coll_rte 5 0 5          |                   |            
*|reorder                 |                   |            
0|coll_rte 5 0 5          |                   |            
#|reorder                 |                   |            
+-------------------------+-------------------+------------+
```

TABLE 2-7

Keys Record: d91x

```
+-------------------------+-------------------+------------+
1|route    0              |                   |            
2|coll_rte 4 0 5          |                   |            
3|coll_rte 4 0 5          |                   |            
4|coll_rte 4 0 5          |                   |            
5|coll_rte 4 0 5          |                   |            
6|coll_rte 4 0 5          |                   |            
7|coll_rte 4 0 5          |                   |            
8|coll_rte 4 0 5          |                   |            
9|coll_rte 4 0 5          |                   |            
*|reorder                 |                   |            
0|coll_rte 4 0 5          |                   |            
#|reorder                 |                   |            
+-------------------------+-------------------+------------+
```

TABLE 2-8

Keys Record: d9xx

```
+-------------------------+-------------------+------------+
1|collect  1 0 5          |switch    d91x     |reorder     
2|coll_rte 5 0 5          |                   |            
3|coll_rte 5 0 5          |                   |            
4|coll_rte 5 0 5          |                   |            
5|coll_rte 5 0 5          |                   |            
6|coll_rte 5 0 5          |                   |            
7|coll_rte 5 0 5          |                   |            
8|coll_rte 5 0 5          |                   |            
9|coll_rte 5 0 5          |                   |            
*|reorder                 |                   |            
0|coll_rte 5 0 5          |                   |            
#|reorder                 |                   |            
+-------------------------+-------------------+------------+
```

TABLE 2-9

DTMF KEYS DATABASE LISTING    DATABASE PREFIX: cur

Keys Record: firstkey

```
+------------------------+------------------------+------------------------+
1|internpa               |                        |                        |
2|coll_rte  6 0 5        |                        |                        |
3|coll_rte  6 0 5        |                        |                        |
4|collect   1 0 5        |switch    d4xx          |reorder                 |
5|coll_rte  6 0 5        |                        |                        |
6|collect   1 0 5        |switch    d6xx          |reorder                 |
7|coll_rte  6 0 5        |                        |                        |
8|coll_rte  6 0 5        |                        |                        |
9|collect   1 0 5        |switch    d9xx          |reorder                 |
*|reorder                |                        |                        |
0|op_asst                |                        |                        |
#|reorder                |                        |                        |
+------------------------+------------------------+------------------------+
```
TABLE 2-10

Keys Record: firstpvn

```
+------------------------+------------------------+------------------------+
1|collect   3 0 5        |pvnroute                |reorder                 |
2|collect   3 0 5        |pvnroute                |reorder                 |
3|collect   3 0 5        |pvnroute                |reorder                 |
4|collect   3 0 5        |pvnroute                |reorder                 |
5|collect   3 0 5        |pvnroute                |reorder                 |
6|collect   3 0 5        |pvnroute                |reorder                 |
7|collect   3 0 5        |pvnroute                |reorder                 |
8|collect   3 0 5        |pvnroute                |reorder                 |
9|pvnoffnt               |                        |                        |
*|reorder                |                        |                        |
0|collect   3 0 5        |pvnroute                |reorder                 |
#|collect   1 0 5        |switch    pvn_svc       |reorder                 |
+------------------------+------------------------+------------------------+
```
TABLE 2-11

Keys Record: npa20x

```
+------------------------+------------------------+------------------------+
1|return    1            |                        |                        |
2|return    1            |                        |                        |
3|return    1            |                        |                        |
4|return    1            |                        |                        |
5|return    1            |                        |                        |
6|return    1            |                        |                        |
7|return    1            |                        |                        |
8|return    1            |                        |                        |
9|return    1            |                        |                        |
*|reorder                |                        |                        |
0|return    0            |                        |                        |
#|reorder                |                        |                        |
+------------------------+------------------------+------------------------+
```
TABLE 2-12

DTMF KEYS DATABASE LISTING

DATABASE PREFIX: cur

Keys Record: npa21x

```
+---------------------------+------------------------+-----------------------+
1|return   0                |                        |                       |
2|return   1                |                        |                       |
3|return   1                |                        |                       |
4|return   1                |                        |                       |
5|return   1                |                        |                       |
6|return   1                |                        |                       |
7|return   1                |                        |                       |
8|return   1                |                        |                       |
9|return   1                |                        |                       |
*|reorder                   |                        |                       |
0|return   0                |                        |                       |
#|reorder                   |                        |                       |
+---------------------------+------------------------+-----------------------+
```

TABLE 2-13

Keys Record: npa2xx

```
+---------------------------+------------------------+-----------------------+
1|coll_sw   1 0 5 npa21x    |                        |                       |
2|collect   1 0 5           |return   0              |reorder                |
3|collect   1 0 5           |return   0              |reorder                |
4|collect   1 0 5           |return   0              |reorder                |
5|collect   1 0 5           |return   0              |reorder                |
6|collect   1 0 5           |return   0              |reorder                |
7|collect   1 0 5           |return   0              |reorder                |
8|collect   1 0 5           |return   0              |reorder                |
9|collect   1 0 5           |return   0              |reorder                |
*|reorder                   |                        |                       |
0|coll_sw   1 0 5 npa20x    |                        |                       |
#|reorder                   |                        |                       |
+---------------------------+------------------------+-----------------------+
```

TABLE 2-14

Keys Record: npa30x

```
+---------------------------+------------------------+-----------------------+
1|return   1                |                        |                       |
2|return   1                |                        |                       |
3|return   1                |                        |                       |
4|return   1                |                        |                       |
5|return   1                |                        |                       |
6|return   1                |                        |                       |
7|return   1                |                        |                       |
8|return   1                |                        |                       |
9|return   1                |                        |                       |
*|reorder                   |                        |                       |
0|return   0                |                        |                       |
#|reorder                   |                        |                       |
+---------------------------+------------------------+-----------------------+
```

TABLE 2-15

DTMF KEYS DATABASE LISTING

DATABASE PREFIX: cur

Keys Record: npa31x

```
+-----------------------------+------------------------+------------------------+
|1|return    0                |                        |                        |
|2|return    1                |                        |                        |
|3|return    1                |                        |                        |
|4|return    1                |                        |                        |
|5|return    1                |                        |                        |
|6|return    1                |                        |                        |
|7|return    1                |                        |                        |
|8|return    1                |                        |                        |
|9|return    1                |                        |                        |
|*|reorder                    |                        |                        |
|0|return    0                |                        |                        |
|#|reorder                    |                        |                        |
+-----------------------------+------------------------+------------------------+
```
TABLE 2-16

Keys Record: npa3xx

```
+-----------------------------+------------------------+------------------------+
|1|coll_sw   1 0 5 npa31x     |                        |                        |
|2|collect   1 0 5            |return    0             |reorder                 |
|3|collect   1 0 5            |return    0             |reorder                 |
|4|collect   1 0 5            |return    0             |reorder                 |
|5|collect   1 0 5            |return    0             |reorder                 |
|6|collect   1 0 5            |return    0             |reorder                 |
|7|collect   1 0 5            |return    0             |reorder                 |
|8|collect   1 0 5            |return    0             |reorder                 |
|9|collect   1 0 5            |return    0             |reorder                 |
|*|reorder                    |                        |                        |
|0|coll_sw   1 0 5 npa30x     |                        |                        |
|#|reorder                    |                        |                        |
+-----------------------------+------------------------+------------------------+
```
TABLE 2-17

Keys Record: npa40x

```
+-----------------------------+------------------------+------------------------+
|1|return    1                |                        |                        |
|2|return    1                |                        |                        |
|3|return    1                |                        |                        |
|4|return    1                |                        |                        |
|5|return    1                |                        |                        |
|6|return    1                |                        |                        |
|7|return    0                |                        |                        |
|8|return    1                |                        |                        |
|9|return    1                |                        |                        |
|*|reorder                    |                        |                        |
|0|return    0                |                        |                        |
|#|reorder                    |                        |                        |
+-----------------------------+------------------------+------------------------+
```
TABLE 2-18

DTMF KEYS DATABASE LISTING                           DATABASE PREFIX: cur

Keys Record: npa41x

```
+---------------------------+---------------------------+---------------------------+
| 1|return    0             |                           |                           |
| 2|return    1             |                           |                           |
| 3|return    1             |                           |                           |
| 4|return    1             |                           |                           |
| 5|return    1             |                           |                           |
| 6|return    1             |                           |                           |
| 7|return    1             |                           |                           |
| 8|return    1             |                           |                           |
| 9|return    1             |                           |                           |
| *|reorder                 |                           |                           |
| 0|return    0             |                           |                           |
| #|reorder                 |                           |                           |
+---------------------------+---------------------------+---------------------------+
```
TABLE 2-19

Keys Record: npa4xx

```
+---------------------------+---------------------------+---------------------------+
| 1|coll_sw  1 0 5 npa41x   |                           |                           |
| 2|collect  1 0 5          |return    0                |reorder                    |
| 3|collect  1 0 5          |return    0                |reorder                    |
| 4|collect  1 0 5          |return    0                |reorder                    |
| 5|collect  1 0 5          |return    0                |reorder                    |
| 6|collect  1 0 5          |return    0                |reorder                    |
| 7|collect  1 0 5          |return    0                |reorder                    |
| 8|collect  1 0 5          |return    0                |reorder                    |
| 9|collect  1 0 5          |return    0                |reorder                    |
| *|reorder.                |                           |                           |
| 0|coll_sw  1 0 5 npa40x   |                           |                           |
| #|reorder                 |                           |                           |
+---------------------------+---------------------------+---------------------------+
```
TABLE 2-20

Keys Record: npa50x

```
+---------------------------+---------------------------+---------------------------+
| 1|return    1             |                           |                           |
| 2|return    1             |                           |                           |
| 3|return    1             |                           |                           |
| 4|return    1             |                           |                           |
| 5|return    1             |                           |                           |
| 6|return    1             |                           |                           |
| 7|return    1             |                           |                           |
| 8|return    0             |                           |                           |
| 9|return    1             |                           |                           |
| *|reorder                 |                           |                           |
| 0|return    1             |                           |                           |
| #|reorder                 |                           |                           |
+---------------------------+---------------------------+---------------------------+
```
TABLE 2-21

DTMF KEYS DATABASE LISTING

DATABASE PREFIX: cur

Keys Record: npa51x

```
+-----------------------+-----------------------+-----------------------+
|1|return   0           |                       |                       |
|2|return   1           |                       |                       |
|3|return   1           |                       |                       |
|4|return   1           |                       |                       |
|5|return   1           |                       |                       |
|6|return   1           |                       |                       |
|7|return   1           |                       |                       |
|8|return   1           |                       |                       |
|9|return   1           |                       |                       |
|*|reorder              |                       |                       |
|0|return   0           |                       |                       |
|#|reorder              |                       |                       |
+-----------------------+-----------------------+-----------------------+
```

TABLE 2-22

Keys Record: npa5xx

```
+-----------------------+-----------------------+-----------------------+
|1|coll_sw   1 0 5 npa51x|                      |                       |
|2|collect   1 0 5       |return    0           |reorder                |
|3|collect   1 0 5       |return    0           |reorder                |
|4|collect   1 0 5       |return    0           |reorder                |
|5|collect   1 0 5       |return    0           |reorder                |
|6|collect   1 0 5       |return    0           |reorder                |
|7|collect   1 0 5       |return    0           |reorder                |
|8|collect   1 0 5       |return    0           |reorder                |
|9|collect   1 0 5       |return    0           |reorder                |
|*|reorder               |                      |                       |
|0|coll_sw   1 0 5 npa50x|                      |                       |
|#|reorder               |                      |                       |
+-----------------------+-----------------------+-----------------------+
```

TABLE 2-23

Keys Record: npa60x

```
+-----------------------+-----------------------+-----------------------+
|1|return   0           |                       |                       |
|2|return   1           |                       |                       |
|3|return   1           |                       |                       |
|4|return   1           |                       |                       |
|5|return   1           |                       |                       |
|6|return   1           |                       |                       |
|7|return   1           |                       |                       |
|8|return   1           |                       |                       |
|9|return   1           |                       |                       |
|*|reorder              |                       |                       |
|0|return   0           |                       |                       |
|#|reorder              |                       |                       |
+-----------------------+-----------------------+-----------------------+
```

TABLE 2-24

DTMF KEYS DATABASE LISTING                    DATABASE PREFIX: cur

Keys Record: npa61x

```
+-------------------------------+-------------------------+-------------------------+
1|return    0                   |                         |                         |
2|return    1                   |                         |                         |
3|return    1                   |                         |                         |
4|return    1                   |                         |                         |
5|return    1                   |                         |                         |
6|return    1                   |                         |                         |
7|return    1                   |                         |                         |
8|return    1                   |                         |                         |
9|return    1                   |                         |                         |
*|reorder                       |                         |                         |
0|return    0                   |                         |                         |
#|reorder                       |                         |                         |
+-------------------------------+-------------------------+-------------------------+
```
TABLE 2-25

Keys Record: npa6xx

```
+-------------------------------+-------------------------+-------------------------+
1|coll_sw  1 0 5 npa61x         |                         |                         |
2|collect  1 0 5                |return    0              |reorder                  |
3|collect  1 0 5                |return    0              |reorder                  |
4|collect  1 0 5                |return    0              |reorder                  |
5|collect  1 0 5                |return    0              |reorder                  |
6|collect  1 0 5                |return    0              |reorder                  |
7|collect  1 0 5                |return    0              |reorder                  |
8|collect  1 0 5                |return    0              |reorder                  |
9|collect  1 0 5                |return    0              |reorder                  |
*|reorder                       |                         |                         |
0|coll_sw  1 0 5 npa60x         |                         |                         |
#|reorder                       |                         |                         |
+-------------------------------+-------------------------+-------------------------+
```
TABLE 2-26

Keys Record: npa70x

```
+-------------------------------+-------------------------+-------------------------+
1|return    1                   |                         |                         |
2|return    1                   |                         |                         |
3|return    1                   |                         |                         |
4|return    1                   |                         |                         |
5|return    1                   |                         |                         |
6|return    1                   |                         |                         |
7|return    1                   |                         |                         |
8|return    1                   |                         |                         |
9|return    1                   |                         |                         |
*|reorder                       |                         |                         |
0|return    0                   |                         |                         |
#|reorder                       |                         |                         |
+-------------------------------+-------------------------+-------------------------+
```
TABLE 2-27

DTMF KEYS DATABASE LISTING                                DATABASE PREFIX: cur

Keys Record: npa71x

```
+------------------------------+----------------------+----------------------+----+
1|return    0                  |                      |                      |
2|return    1                  |                      |                      |
3|return    1                  |                      |                      |
4|return    1                  |                      |                      |
5|return    1                  |                      |                      |
6|return    1                  |                      |                      |
7|return    1                  |                      |                      |
8|return    1                  |                      |                      |
9|return    0                  |                      |                      |
*|reorder                      |                      |                      |
0|return    0                  |                      |                      |
#|reorder                      |                      |                      |
+------------------------------+----------------------+----------------------+----+
```
TABLE 2-28

Keys Record: npa7xx

```
+------------------------------+----------------------+----------------------+----+
1|coll_sw   1 0 5 npa71x       |                      |                      |
2|collect   1 0 5              |return    0           |reorder               |
3|collect   1 0 5              |return    0           |reorder               |
4|collect   1 0 5              |return    0           |reorder               |
5|collect   1 0 5              |return    0           |reorder               |
6|collect   1 0 5              |return    0           |reorder               |
7|collect   1 0 5              |return    0           |reorder               |
8|collect   1 0 5              |return    0           |reorder               |
9|collect   1 0 5              |return    0           |reorder               |
*|reorder                      |                      |                      |
0|coll_sw   1 0 5 npa70x       |                      |                      |
#|reorder                      |                      |                      |
+------------------------------+----------------------+----------------------+----+
```
TABLE 2-29

Keys Record: npa80x

```
+------------------------------+----------------------+----------------------+----+
1|return    1                  |                      |                      |
2|return    1                  |                      |                      |
3|return    1                  |                      |                      |
4|return    1                  |                      |                      |
5|return    1                  |                      |                      |
6|return    1                  |                      |                      |
7|return    1                  |                      |                      |
8|return    1                  |                      |                      |
9|return    1                  |                      |                      |
*|reorder                      |                      |                      |
0|return    1                  |                      |                      |
#|reorder                      |                      |                      |
+------------------------------+----------------------+----------------------+----+
```
TABLE 2-30

DTMF KEYS DATABASE LISTING                               DATABASE PREFIX: cur

Keys Record: npa81x

```
+--------------------------+----------------------+----------------------+
1|return    0              |                      |                      |
2|return    1              |                      |                      |
3|return    1              |                      |                      |
4|return    1              |                      |                      |
5|return    1              |                      |                      |
6|return    1              |                      |                      |
7|return    1              |                      |                      |
8|return    1              |                      |                      |
9|return    1              |                      |                      |
*|reorder                  |                      |                      |
0|return    0              |                      |                      |
#|reorder                  |                      |                      |
+--------------------------+----------------------+----------------------+
```
TABLE 2-31

Keys Record: npa8xx

```
+--------------------------+----------------------+----------------------+
1|coll_sw   1 0 5 npa81x   |                      |                      |
2|collect   1 0 5          |return    0           |reorder               |
3|collect   1 0 5          |return    0           |reorder               |
4|collect   1 0 5          |return    0           |reorder               |
5|collect   1 0 5          |return    0           |reorder               |
6|collect   1 0 5          |return    0           |reorder               |
7|collect   1 0 5          |return    0           |reorder               |
8|collect   1 0 5          |return    0           |reorder               |
9|collect   1 0 5          |return    0           |reorder               |
*|reorder                  |                      |                      |
0|coll_sw   1 0 5 npa80x   |                      |                      |
#|reorder                  |                      |                      |
+--------------------------+----------------------+----------------------+
```
TABLE 2-32

Keys Record: npa90x

```
+--------------------------+----------------------+----------------------+
1|return    1              |                      |                      |
2|return    1              |                      |                      |
3|return    0              |                      |                      |
4|return    1              |                      |                      |
5|return    1              |                      |                      |
6|return    1              |                      |                      |
7|return    1              |                      |                      |
8|return    0              |                      |                      |
9|return    0              |                      |                      |
*|reorder                  |                      |                      |
0|return    1              |                      |                      |
#|reorder                  |                      |                      |
+--------------------------+----------------------+----------------------+
```
TABLE 2-33

DTMF KEYS DATABASE LISTING

DATABASE PREFIX: cur

Keys Record: npa91x

```
+------------------------+----------------------+----------------------+
1|return   0             |                      |                      |
2|return   1             |                      |                      |
3|return   1             |                      |                      |
4|return   1             |                      |                      |
5|return   1             |                      |                      |
6|return   1             |                      |                      |
7|return   0             |                      |                      |
8|return   1             |                      |                      |
9|return   1             |                      |                      |
*|reorder                |                      |                      |
0|return   0             |                      |                      |
#|reorder                |                      |                      |
+------------------------+----------------------+----------------------+
```

TABLE 2-34

Keys Record: npa9xx

```
+------------------------+----------------------+----------------------+
1|coll_sw  1 0 5 npa91x  |                      |                      |
2|collect  1 0 5         |return   0            |reorder               |
3|collect  1 0 5         |return   0            |reorder               |
4|collect  1 0 5         |return   0            |reorder               |
5|collect  1 0 5         |return   0            |reorder               |
6|collect  1 0 5         |return   0            |reorder               |
7|collect  1 0 5         |return   0            |reorder               |
8|collect  1 0 5         |return   0            |reorder               |
9|collect  1 0 5         |return   0            |reorder               |
*|reorder                |                      |                      |
0|coll_sw  1 0 5 npa90x  |                      |                      |
#|reorder                |                      |                      |
+------------------------+----------------------+----------------------+
```

TABLE 2-35

Keys Record: npaxxx

```
+------------------------+----------------------+----------------------+
1|collect  2 0 5         |return   0            |reorder               |
2|coll_sw  1 0 5 npa2xx  |                      |                      |
3|coll_sw  1 0 5 npa3xx  |                      |                      |
4|coll_sw  1 0 5 npa4xx  |                      |                      |
5|coll_sw  1 0 5 npa5xx  |                      |                      |
6|coll_sw  1 0 5 npa6xx  |                      |                      |
7|coll_sw  1 0 5 npa7xx  |                      |                      |
8|coll_sw  1 0 5 npa8xx  |                      |                      |
9|coll_sw  1 0 5 npa9xx  |                      |                      |
*|reorder                |                      |                      |
0|collect  2 0 5         |return   0            |reorder               |
#|reorder                |                      |                      |
+------------------------+----------------------+----------------------+
```

TABLE 2-36

DTMF KEYS DATABASE LISTING                                    DATABASE PREFIX: cur Keys Record: pvn_svc

```
+------------------------------+------------------------------+------------------------------+
1|pvn_fwd              |                              |                              |
2|can_fwd              |                              |                              |
3|reorder              |                              |                              |
4|reorder              |                              |                              |
5|reorder              |                              |                              |
6|reorder              |                              |                              |
7|reorder              |                              |                              |
8|reorder              |                              |                              |
9|reorder              |                              |                              |
*|reorder              |                              |                              |
0|reorder              |                              |                              |
#|reorder              |                              |                              |
+------------------------------+------------------------------+------------------------------+
```

TABLE 2-37

APPENDIX 3

Procedure Records of Procedures
Databases 16

Bernardis-Fowler-Schwartz 1-1-1

PROCEDURE DATABASE LISTING                                     DATABASE PREFIX: cur

Procedure: 500nbr

| | | |
|---|---|---|
| collect   7 0 5<br>ONCcall | | reorder |

TABLE 3-1

Procedure: 800nbr

| | | |
|---|---|---|
| collect   7 0 5<br>getscp    800 %0<br>test      %1 eq 0000000000 | reject    bad_nbr | reorder<br>set       0 1%1<br>route     0 |

TABLE 3-2

Procedure: 911call

| | | |
|---|---|---|
| conf      4 e911<br>do911<br>connect   C e911 | | exit |

TABLE 3-3

PROCEDURE DATABASE LISTING

DATABASE PREFIX: cur

Procedure: ONCcall

```
+-----------------------------+---------------------+---------------------+
|getscp   ONC %0 %N%L         |                     |can_msg   no_nbrs    |
|                             |                     |return    0          |
|tryonc   %1                  |return    1          |                     |
|tryonc   %2                  |return    1          |                     |
|tryonc   %3                  |return    1          |                     |
|dtmfon                       |                     |                     |
|can_msg  all_busy            |                     |                     |
|collect  1 5 10              |free      RS         |free      RS         |
|                             |jump      2 m        |return    0          |
+-----------------------------+---------------------+---------------------+
```

TABLE 3-4

Procedure: alert

```
+-----------------------------+---------------------+---------------------+
|getscp   ALT $0              |                     |                     |
|set      1 IA%N%L            |                     |                     |
|putpkt   PSAP 1              |                     |                     |
|putpkt   PSAP S              |                     |                     |
|set      1 D%N%L%N%L         |                     |                     |
|putpkt   PSAP 1              |                     |                     |
|getpkt   PSAP 1              |                     |                     |
|getkey                       |                     |                     |
|altkey                       |jump      7          |                     |
|alrt2                        |                     |                     |
+-----------------------------+---------------------+---------------------+
```

TABLE 3-5

Procedure: alrt2

```
+-----------------------------+---------------------+---------------------+
|set      1 C%N%L             |                     |                     |
|putpkt   PSAP 1              |                     |                     |
|set      1 R%N%LC            |                     |                     |
|putpkt   PSAP 1              |                     |                     |
|getpkt   PSAP 1              |                     |                     |
|                             |                     |                     |
|                             |                     |                     |
|                             |                     |                     |
|                             |                     |                     |
+-----------------------------+---------------------+---------------------+
```

TABLE 3-6

PROCEDURE DATABASE LISTING                                     DATABASE PREFIX: cur Procedure: altkey

| | | |
|---|---|---|
| test %5 eq X<br>set  0 1%4<br>route 0 | return  0 | |

TABLE 3-7

Procedure: ann_call

| | | |
|---|---|---|
| test    %1 eq 0000000000<br>set     6 %5<br>getscp  NME %1<br>can_msg callid2 | can_msg  callerid | |

TABLE 3-8

Procedure: bill3rd

| | | |
|---|---|---|
| dtmfon<br>can_msg  bill_nbr<br>collect  10 3 5<br>free     RS<br>valb3<br>set      9 %3<br>op_route | | exit<br><br>reorder<br><br>exit |

TABLE 3-9

PROCEDURE DATABASE LISTING                              DATABASE PREFIX: cur

Procedure: can_fwd

```
+-------------------------+-------------------------+-------------------------+
|getscp   FWD %P %N%L %N%L|                         |                         |
|can_msg  can_fwd         |                         |                         |
|                         |                         |                         |
|                         |                         |                         |
|                         |                         |                         |
|                         |                         |                         |
|                         |                         |                         |
+-------------------------+-------------------------+-------------------------+
```
TABLE 3-10

Procedure: can_msg

```
+-------------------------+-------------------------+-------------------------+
|allocate DECTALK         |                         |                         |
|connect  R DECTALK 2     |                         |                         |
|announce $0              |                         |                         |
|free     DECTALK         |                         |                         |
|                         |                         |                         |
|                         |                         |                         |
|                         |                         |                         |
+-------------------------+-------------------------+-------------------------+
```
TABLE 3-11

Procedure: ccAprmpt

```
+-------------------------+-------------------------+-------------------------+
|connect  T PH 2          |                         |                         |
|                         |                         |                         |
|                         |                         |                         |
|                         |                         |                         |
|                         |                         |                         |
|                         |                         |                         |
|                         |                         |                         |
+-------------------------+-------------------------+-------------------------+
```
TABLE 3-12

PROCEDURE DATABASE LISTING                                        DATABASE PREFIX: cur Procedure: ccBprmpt

| | | |
|---|---|---|
| can_msg  ccprompt | | |

TABLE 3-13

Procedure: cc_coll

| | | |
|---|---|---|
| set          9<br>collect      1 9<br>test         %9 eq 0<br>collect      9 9 5<br>set          8<br>collect      4 8 5<br>return       1 | return    0 | return    0<br>reorder<br>reorder |

TABLE 3-14

Procedure: cc_val

| | | |
|---|---|---|
| getscp    CC $0 $1 %N%L<br>test      %5 eq 0<br><br>test      %7 eq 0 | free         RS<br>can_msg      thanks<br>return       1<br>can_msg      bad_cc1<br>set          7 1<br>return       0 | free         RS<br>can_msg      bad_cc2<br>exit |

TABLE 3-15

PROCEDURE DATABASE LISTING                              DATABASE PREFIX: cur

Procedure: chk_rsrc

```
+--------------------------------+---------------------------+-----------------------------+
|test    $0 eq 4                 |                           |return   0                   |
|set     4 @sub %0 0 6           |                           |                             |
|set     5 @sub %L 0 3           |                           |                             |
|set     5 %N%5                  |                           |                             |
|test    %4 eq %5                |                           |return   0                   |
|set     9 1                     |                           |                             |
|return  1                       |                           |                             |
|                                |                           |                             |
|                                |                           |                             |
|                                |                           |                             |
+--------------------------------+---------------------------+-----------------------------+
```
TABLE 3-16

Procedure: chk_sac

```
+--------------------------------+---------------------------+-----------------------------+
|test    %0 eq 811               |pvnrmt                     |                             |
|coll_rej 7 0 5                  |                           |                             |
|                                |                           |                             |
|                                |                           |                             |
|                                |                           |                             |
|                                |                           |                             |
|                                |                           |                             |
|                                |                           |                             |
|                                |                           |                             |
+--------------------------------+---------------------------+-----------------------------+
```
TABLE 3-17

Procedure: civ_auth

```
+--------------------------------+---------------------------+-----------------------------+
|dtmfon                          |                           |exit                         |
|set      5                      |                           |                             |
|can_msg  civ_auth               |                           |                             |
|collect  4 5 5                  |                           |reorder                      |
|                                |                           |                             |
|                                |                           |                             |
|                                |                           |                             |
|                                |                           |                             |
+--------------------------------+---------------------------+-----------------------------+
```
TABLE 3-18

PROCEDURE DATABASE LISTING

DATABASE PREFIX: cur

Procedure: civ_fail

```
+------------------------+------------------------+------------------------+
|free     RS             |                        |                        |
|can_msg  civ_fail       |                        |                        |
|return   0              |                        |                        |
|                        |                        |                        |
|                        |                        |                        |
|                        |                        |                        |
|                        |                        |                        |
+------------------------+------------------------+------------------------+
```
TABLE 3-19

Procedure: civ_ok

```
+------------------------+------------------------+------------------------+
|can_msg  civ_ok         |                        |                        |
|                        |                        |                        |
|                        |                        |                        |
|                        |                        |                        |
|                        |                        |                        |
|                        |                        |                        |
|                        |                        |                        |
+------------------------+------------------------+------------------------+
```
TABLE 3-20

Procedure: civ_oper

```
+------------------------+------------------------+------------------------+
|test     idle 0011      |                        |connect  T BT           |
|                        |                        |return   0              |
|ring     I 0011 %E      |talk                    |return   0              |
|                        |return   1              |                        |
|                        |                        |                        |
|                        |                        |                        |
|                        |                        |                        |
+------------------------+------------------------+------------------------+
```
TABLE 3-21

PROCEDURE DATABASE LISTING                    DATABASE PREFIX: cur

Procedure: coll_pvn

```
+---------------------------+---------------------+---------------------------+
|set       1                |                     |reorder                    |
|collect   1 1 5            |return    0          |                           |
|test      $1 eq #          |                     |reorder                    |
|collect   3 1 5            |                     |                           |
|return    1                |                     |                           |
|                           |                     |                           |
|                           |                     |                           |
|                           |                     |                           |
|                           |                     |                           |
+---------------------------+---------------------+---------------------------+
```
TABLE 3-22

Procedure: coll_rej

```
+---------------------------+---------------------+---------------------------+
|collect   $0 $1 $2         |                     |                           |
|reject    bad_nbr          |                     |                           |
|                           |                     |                           |
|                           |                     |                           |
|                           |                     |                           |
|                           |                     |                           |
|                           |                     |                           |
+---------------------------+---------------------+---------------------------+
```
TABLE 3-23

Procedure: coll_rst

```
+---------------------------+---------------------+---------------------------+
|collect   $0 $1 $2         |                     |                           |
|reject    billdeny         |                     |                           |
|                           |                     |                           |
|                           |                     |                           |
|                           |                     |                           |
|                           |                     |                           |
|                           |                     |                           |
+---------------------------+---------------------+---------------------------+
```
TABLE 3-24

PROCEDURE DATABASE LISTING

DATABASE PREFIX: cur

Procedure: coll_rte

| collect $0 $1 $2 | route    $1 | reorder |
|---|---|---|
|  |  |  |

TABLE 3-25

Procedure: coll_sw

| collect $0 $1 $2 | switch    $3 | reorder |
|---|---|---|
|  |  |  |

TABLE 3-26

Procedure: collcall

| valcoll<br>op_route |  | exit |
|---|---|---|
|  |  |  |

TABLE 3-27

PROCEDURE DATABASE LISTING

DATABASE PREFIX: cur

Procedure: conf911

```
|set      0 D%N%L%6
|putpkt   PSAP 0
|getpkt   PSAP 0
|connect  C e911
|set      0 C%N%L
|putpkt   PSAP 0
```

TABLE 3-28

Procedure: conngab

```
|free     RS
|free     DECTALK
|connect  T PH 2 C $0
|return   1
```

TABLE 3-29

Procedure: cust_vfy

| | | |
|---|---|---|
| `civ_auth` | | |
| `getscp   CIV %N%L %5` | | |
| `test     %5 eq 0` | `civ_fail` | |
| | `exit` | |
| `can_msg  -s` | | |
| `set      0` | | |
| `collect  1 0 10` | | `exit` |
| `free     RS` | | |
| `test     %0 eq 0` | `civ_oper` | `civ_ok` |

TABLE 3-30

PROCEDURE DATABASE LISTING

DATABASE PREFIX: cur

Procedure: do911

| | | |
|---|---|---|
| getscp 911 S %N%L<br>set    0 IC%N%L<br>set    6 %N%L<br>putpkt PSAP 0<br>putpkt PSAP S<br>try911 %1 psap911<br>try911 %2 psap911<br>try911 %3 psap911<br>return 0 | return 1<br>return 1<br>return 1 | |

TABLE 3-31

Procedure: do911b

| | | |
|---|---|---|
| getscp 911 %5 %6<br>try911 %1 conf911<br>try911 %2 conf911<br>try911 %3 conf911<br>return 0 | return 1<br>return 1<br>return 1 | |

TABLE 3-32

Procedure: dtmfon

| | | |
|---|---|---|
| allocate RS<br>connect R RS I | | return 0 |

TABLE 3-33

PROCEDURE DATABASE LISTING                                    DATABASE PREFIX: cur Procedure: ext_call

| allocate TRUNK          |  | connect  T EB |
| pulse    R TRUNK 9$0    |  | exit          |
| connect  R TRUNK 2      |  |               |
| talk                    |  |               |

TABLE 3-34

Procedure: ext_pvn

| allocate TRUNK          |  | connect  T EB |
| pulse    R TRUNK 9$0    |  | exit          |
| connect  R TRUNK 2      |  |               |
| talk                    |  |               |

TABLE 3-35

Procedure: freeret

| free     $0   |  |  |
| return   $1   |  |  |

TABLE 3-36

PROCEDURE DATABASE LISTING

DATABASE PREFIX: cur

Procedure: fwdauth

```
|set        6                          |                     |reorder
|set        0                          |                     |
|can_msg    pvnauth5                   |                     |
|collect    4 6 5                      |                     |
|set        A %6                       |                     |
|getscp     PVA %P %7 5%A %0           |                     |
|test       %5 eq 0                    |                     |
```

TABLE 3-37

Procedure: gab

```
|test       conf $0         |           |ring       O $1
|                           |           |jump       2 m
|connect    T PH 2 C $0     |           |connect    T BT
|                           |           |exit
```

TABLE 3-38

Procedure: gabmenu

```
|dtmfon                     |           |exit
|allocate DECTALK           |           |
|connect  R DECTALK 2       |           |
|announce gabavl            |           |
|testgabs                   |           |free       RS
|                           |           |free       DECTALK
```

TABLE 3-39

PROCEDURE DATABASE LISTING

DATABASE PREFIX: cur

Procedure: getDTK

| allocate DECTALK<br>connect R DECTALK 2 | | |
|---|---|---|

TABLE 3-40

Procedure: get_base

| coll_pvn | set     7 %1******<br>return  1 | set     7 %N%L<br>return  1 |
|---|---|---|

TABLE 3-41

Procedure: get_dist

| set     9<br>collect 1 9 5<br><br>test    $9 eq 1 | return  1 | set     9 0<br>return  1<br>set     9 0<br>return  1 |
|---|---|---|

TABLE 3-42

PROCEDURE DATABASE LISTING

DATABASE PREFIX: cur

Procedure: get_to

| coll_pvn | set      8 %1******  <br>return   1 | set      8 %N%L  <br>return   1 |
|---|---|---|

TABLE 3-43

Procedure: getauth

| dtmfon  <br>set      6  <br>can_msg  pvnauth$0  <br>collect  4 6 5  <br>set      A %6  <br>free     RS | | exit  <br><br>reorder |
|---|---|---|

TABLE 3-44

Procedure: getcarr

| collect  3 1 5  <br>set      0  <br>collect  1 0 5  <br>switch   npaxxx | | reorder  <br><br>reorder  <br>return   1 |
|---|---|---|

TABLE 3-45

PROCEDURE DATABASE LISTING　　　　　　　　　　DATABASE PREFIX: cur

Procedure: getcc

```
+---------------------------+------------------------+--------------------------+
|getscp    OST %N%L         |                        |                          |
|set       7 @sub %6 0 1    |                        |                          |
|test      %7 eq 1          |return    0             |                          |
|set       7 0              |                        |                          |
|test      %5 eq A          |getccA                  |                          |
|test      %5 eq B          |getccB                  |                          |
|op_minus                   |                        |                          |
|exit                       |                        |                          |
|                           |                        |                          |
|                           |                        |                          |
+---------------------------+------------------------+--------------------------+
```
TABLE 3-46

Procedure: getccA

```
+---------------------------+------------------------+--------------------------+
|dtmfon                     |                        |exit                      |
|ccAprmpt                   |                        |                          |
|cc_coll   2                |                        |free      RS              |
|                           |                        |return    0               |
|cc_val    %9 %8            |                        |jump      1               |
|                           |                        |                          |
|                           |                        |                          |
|                           |                        |                          |
|                           |                        |                          |
|                           |                        |                          |
+---------------------------+------------------------+--------------------------+
```
TABLE 3-47

Procedure: getccB

```
+---------------------------+------------------------+--------------------------+
|dtmfon                     |                        |exit                      |
|ccAprmpt                   |                        |                          |
|cc_coll   2                |jump      8             |                          |
|test      x%9 eq 0         |free      RS            |                          |
|                           |return    0             |                          |
|ccBprmpt                   |                        |                          |
|cc_coll   5                |                        |free      RS              |
|                           |                        |return    0               |
|cc_val    %9 %8            |                        |jump      1               |
|                           |                        |                          |
+---------------------------+------------------------+--------------------------+
```
TABLE 3-48

PROCEDURE DATABASE LISTING

DATABASE PREFIX: cur

Procedure: getkey

```
|set       0 K%N%L        |                    |
|putpkt    PSAP 0         |                    |
|getpkt    PSAP 5         |                    |set      4 @sub %5 1
|test      %5 eq -        |                    |set      5 @sub %5 0 1
|                         |                    |return   1
|wakeup    %E 0           |                    |
|talk                     |set      5 X        |jump     0 m
|                         |set      4          |
|                         |return   1          |
```

TABLE 3-49

Procedure: getrpvn

```
|getscp    RPV $0         |                    |
|set       A %6           |                    |
|set       P %8           |                    |
```

TABLE 3-50

Procedure: initgab

```
|stat      on             |                         |
|test      conf $0        |connect  T PH 2 C $0     |
|conf      4 $0           |                         |exit
|connect   T PH 2 C $0    |                         |
```

TABLE 3-51

PROCEDURE DATABASE LISTING

DATABASE PREFIX: cur

Procedure: initgab1

| initgab gab1 | | |
|---|---|---|
| | | |

TABLE 3-52

Procedure: initgab2

| initgab gab2 | | |
|---|---|---|
| | | |

TABLE 3-53

Procedure: int_911

| test    idle $0<br>setproc  $0 - $5<br>setline  $0 6 $6<br>ring     I $0 | setproc  $0<br>return   1 | return   0<br>setproc  $0<br>return   0 |
|---|---|---|

TABLE 3-54

PROCEDURE DATABASE LISTING

DATABASE PREFIX: cur

Procedure: int_call

| | | |
|---|---|---|
| test    idle $0          |                    | connect  T BT |
|                          |                    | return   0 |
| ring    I $0 $1          | talk               | return   0 |
|                          | return    1        | |

TABLE 3-55

Procedure: int_pvn

| | | |
|---|---|---|
| test    idle $0          |                    | connect  T BT |
|                          |                    | return   0 |
| test    $3 eq 0          | pvn_dist $0 $1     | |
| ring    I $0 $1          | talk               | return   0 |
|                          | return    1        | |

TABLE 3-56

Procedure: int_q

| | | |
|---|---|---|
| test    idle $0          |                    | return   0 |
| ring    I $0 $1 8        | talk               | connect  T PH 2 |
|                          | return    1        | return   0 |

TABLE 3-57

PROCEDURE DATABASE LISTING                    DATABASE PREFIX: cur

Procedure: intcpt

```
+-----------------------------+------------------------+------------------------+
|dtmfon                       |                        |exit                    |
|can_msg   int_cd             |                        |                        |
|set       2                  |                        |                        |
|collect   4 2 5              |                        |reorder                 |
|free      RS                 |                        |                        |
|test      %2 eq $0           |can_msg   int_ok        |can_msg   int_blk       |
|                             |route     0 n           |return    0             |
|                             |                        |                        |
|                             |                        |                        |
|                             |                        |                        |
+-----------------------------+------------------------+------------------------+
```
TABLE 3-58

Procedure: internpa

```
+-----------------------------+------------------------+------------------------+
|set       0                  |                        |                        |
|set       1                  |                        |                        |
|collect   1 0 5              |                        |reorder                 |
|switch    0-npa              |                        |coll_rej  7 0 5         |
|test      x%0 eq x800        |800nbr                  |                        |
|test      x%0 eq x500        |500nbr                  |                        |
|test      x%0 eq x%N         |intranpa                |                        |
|test      x%1 eq x           |set       0 1%0         |set       0 10%1%0      |
|                             |coll_rte  7 0 5         |coll_rte  7 0 5         |
|                             |                        |                        |
+-----------------------------+------------------------+------------------------+
```
TABLE 3-59

Procedure: intranpa

```
+-----------------------------+------------------------+------------------------+
|set       0                  |                        |                        |
|coll_rte  7 0 5              |                        |                        |
|                             |                        |                        |
|                             |                        |                        |
|                             |                        |                        |
|                             |                        |                        |
|                             |                        |                        |
|                             |                        |                        |
+-----------------------------+------------------------+------------------------+
```
TABLE 3-60

PROCEDURE DATABASE LISTING

DATABASE PREFIX: cur

Procedure: key911

| | | |
|---|---|---|
| test    %5 eq X<br>test    %5 eq A<br>do911b<br>return   1 | return    0<br>connect   T SI<br>alert     %4 | |

TABLE 3-61

Procedure: nopvnrmt

| | | |
|---|---|---|
| can_msg   nopvnrmt<br>return    0 | | |

TABLE 3-62

Procedure: op_asst

| | | |
|---|---|---|
| set      0<br>set      1<br>collect   1 0 2<br>switch    10-npa<br>collect   7 0 5<br>getcc<br>op_route | | op_minus<br>chk_sac<br>reorder<br>op_plus |

TABLE 3-63

PROCEDURE DATABASE LISTING                                      DATABASE PREFIX: cur Procedure: op_carr

```
+-------------------------+-------------------------+-------------------------+
|set       0              |                         |reorder                  |
|collect   1 0 5          |                         |return    0              |
|switch    0-npa          |                         |                         |
|return    1              |                         |                         |
|                         |                         |                         |
|                         |                         |                         |
|                         |                         |                         |
|                         |                         |                         |
+-------------------------+-------------------------+-------------------------+
```
TABLE 3-64

Procedure: op_minus

```
+-------------------------+-------------------------+-------------------------+
|can_msg   op_minus       |                         |                         |
|                         |                         |                         |
|                         |                         |                         |
|                         |                         |                         |
|                         |                         |                         |
|                         |                         |                         |
|                         |                         |                         |
+-------------------------+-------------------------+-------------------------+
```
TABLE 3-65

Procedure: op_plus

```
+-------------------------+-------------------------+-------------------------+
|dtmfon                   |                         |exit                     |
|can_msg   op_plus        |                         |                         |
|set       5              |                         |                         |
|collect   1 5 10         |                         |reorder                  |
|switch    calltype       |                         |jump      1 m            |
|free      RS             |                         |                         |
|                         |                         |                         |
|                         |                         |                         |
+-------------------------+-------------------------+-------------------------+
```
TABLE 3-66

PROCEDURE DATABASE LISTING                                           DATABASE PREFIX: cur Procedure: op_route

```
+--------------------------+---------------------+---------------------+
|set      3 @sub %0 0 3    |                     |                     |
|test     %3 eq %N         |set       0 1%0     |                     |
|                          |route     0          |                     |
|test     x%1 eq x         |set       0 1%0     |set       0 1%0      |
|                          |route     0          |route     0          |
|                          |                     |                     |
+--------------------------+---------------------+---------------------+
```
TABLE 3-67

Procedure: psap911

```
+--------------------------+---------------------+---------------------+
|wakeup   %E 1             |                     |                     |
|set      0 D%N%L%6        |                     |                     |
|putpkt   PSAP 0           |                     |                     |
|getpkt   PSAP 0           |                     |                     |
|connect  C e911           |                     |                     |
|getkey   %N%L             |                     |                     |
|key911                    |jump      5          |                     |
|set      0 C%N%L          |                     |                     |
|putpkt   PSAP 0           |                     |                     |
+--------------------------+---------------------+---------------------+
```
TABLE 3-68

Procedure: pvn_cnd

```
+--------------------------+---------------------+---------------------+
|getscp   NME $0           |                     |                     |
|dtmfon                    |                     |exit                 |
|ann_call                  |                     |                     |
|collect  1 5 10           |                     |exit                 |
|test     %K eq *          |connect   E $1       |wakeup    $1 0       |
|                          |talk                 |exit                 |
|                          |                     |                     |
+--------------------------+---------------------+---------------------+
```
TABLE 3-69

PROCEDURE DATABASE LISTING                    DATABASE PREFIX: cur

Procedure: pvn_dist

| | | |
|---|---|---|
| setproc $0 - pvn_cnd<br>setline $0 1 %1<br>ring    O $0 RB<br>connect T RB | setproc  $0 | can_msg  busy%P<br>setproc  $0 |

TABLE 3-70

Procedure: pvn_fwd

| | | |
|---|---|---|
| dtmfon<br>can_msg  pvnfwd1<br>get_base<br>fwdauth<br>can_msg  pvnfwd2<br>get_to<br>can_msg  pvnfwd3<br>get_dist<br>pvn_fwd2 | | exit     0<br><br>reject   pvnauth |

TABLE 3-71

Procedure: pvn_fwd2

| | | |
|---|---|---|
| getscp   FWD %P %7 %8 %9<br>free     RS<br>can_msg  fwdres%5 | | |

TABLE 3-72

PROCEDURE DATABASE LISTING

DATABASE PREFIX: cur

Procedure: pvnauth

| | | |
|---|---|---|
| chk_rsrc $0<br>getscp PVA %P %N%L $0%A<br>test %5 eq 0<br>test %A eq 0000<br>getauth $0<br>getscp PVA %P %N%L $0%A<br>test %5 eq 0 | return 1<br>return 1 | return 0 |

TABLE 3-73

Procedure: pvninpa

| | | |
|---|---|---|
| set 0<br>set 1<br>receive 1 0 5<br>switch 0-npa<br>test x%0 eq x800<br>test x%0 eq x500<br>test x%0 eq x%N<br>test x%1 eq x | 800nbr<br>500nbr<br>intranpa<br>set 0 1%0<br>coll_rte 7 0 5 | reorder<br>coll_rej 7 0 5<br>set 0 10%1%0<br>coll_rte 7 0 5 |

TABLE 3-74

Procedure: pvnoffnt

| | | |
|---|---|---|
| set 0<br>pvnauth 1<br>set 0<br>receive 1 0 5<br>test %K ne 1<br>set 0<br>pvnauth 2<br>set 0 1<br>pvninpa | switch firstkey | reject pvnoffnt<br>reorder<br>reject pvnauth |

TABLE 3-75

PROCEDURE DATABASE LISTING

DATABASE PREFIX: cur

Procedure: pvnrmt

| | | |
|---|---|---|
| getcc<br>getrpvn %9 %8<br>test %P eq 0000<br>set 0<br>receive 1 0 10<br>switch firstpvn | nopvnrmt | op_plus<br><br>reorder |

TABLE 3-76

Procedure: pvnroute

| | | |
|---|---|---|
| getscp PVX %P %0 %N%L<br>set 5 @sub %0 0 3<br>test %5 eq 500<br>test %0 eq 0000000000<br>pvnauth 4<br>set 0 1%0<br>route 0 y int_pvn ext_<br>test %9 eq 0 | ONCcall<br><br>reject pvnbadno<br><br><br>set 0 @sub %0 1<br>getscp PVD %P %N%L %0 | reject pvnauth |

TABLE 3-77

Procedure: rcg_init

| | | |
|---|---|---|
| allocate NEC<br>set 1 S%N%L<br>putpkt NEC 1<br>dtmfon<br>can_msg rcg_wlcm | | |

TABLE 3-78

PROCEDURE DATABASE LISTING

DATABASE PREFIX: cur

Procedure: rcg_loop

```
|can_msg  rcg_loop |
|set      1        |
|collect  1 1 5    |
|test     %1 ne 1  |
```

TABLE 3-79

Procedure: rcg_rte

```
|set      2 @sub %1 0 1 |  |set      0 @sub %1 1 |
|test     %2 eq 1       |  |route    0           |
|                       |  |return   1           |
|dtmfon                 |
|can_msg  rcg_rej       |
|set      1             |
|collect  1 1 5         |
|free     RS            |
|test     %1 ne 1       |
```

TABLE 3-80

Procedure: rcg_tr1

```
|can_msg  rcg_pr1       |
|set      1             |
|collect  10 1 5        |
|can_msg  rcg_pr2       |
|set      2 T%1         |
|putpkt   NEC 2         |
|getpkt   NEC 2         |
|connect  T PH 2 R NEC  |
|getpkt   NEC 2         |
```

TABLE 3-81

PROCEDURE DATABASE LISTING                    DATABASE PREFIX: cur

Procedure: rcg_trn

| |rcg_init<br>|rcg_trl<br>|rcg_loop<br>|set     1 F<br>|putpkt  NEC 1<br>|free    NEC<br>|free    RS<br>|can_msg rcg_thks | | |jump    1 |
|---|---|---|

TABLE 3-82

Procedure: recog

| |allocate NEC<br>|set     1 R%N%L<br>|putpkt  NEC 1<br>|getpkt  NEC 1<br>|connect T PH 2 R NEC<br>|getpkt  NEC 1<br>|free    NEC<br>|rcg_rte | | |jump    0 |
|---|---|---|

TABLE 3-83

Procedure: reject

| |can_msg $0<br>|exit | | | |
|---|---|---|

TABLE 3-84

PROCEDURE DATABASE LISTING

DATABASE PREFIX: cur

Procedure: reorder

```
+----------------------------+----------------------------+----------------------------+
|connect   T IN              |                            |                            |
|exit                        |                            |                            |
|                            |                            |                            |
|                            |                            |                            |
|                            |                            |                            |
|                            |                            |                            |
+----------------------------+----------------------------+----------------------------+
```
TABLE 3-85

Procedure: restart

```
+----------------------------+----------------------------+----------------------------+
|stat      on                |                            |                            |
|cleanup                     |                            |                            |
|receive   1 0 10            |                            |reorder                     |
|test      %P ne 0000        |switch    firstpvn          |switch    firstkey          |
|                            |stat      off               |stat      off               |
|                            |                            |                            |
|                            |                            |                            |
|                            |                            |                            |
+----------------------------+----------------------------+----------------------------+
```
TABLE 3-86

Procedure: routehm

```
+----------------------------+----------------------------+----------------------------+
|set       0 6995171         |                            |                            |
|route     0                 |                            |                            |
|                            |                            |                            |
|                            |                            |                            |
|                            |                            |                            |
+----------------------------+----------------------------+----------------------------+
```
TABLE 3-87

PROCEDURE DATABASE LISTING                                DATABASE PREFIX: cur

Procedure: rstrtec

| stat    on           | switch   firstpvn | reorder              |
|----------------------|-------------------|----------------------|
| cleanup              | stat     offstpvn | switch   firstkey    |
| receive  1 0 10      |                   | stat     off         |
| test     %P ne 0000  |                   |                      |

TABLE 3-88

Procedure: rsttrnk

| stat    on        |  | reorder |
|-------------------|--|---------|
| cleanup           |  |         |
| receive  1 0 10   |  |         |
| switch   firstkey |  |         |
| stat     off      |  |         |

TABLE 3-89

Procedure: startup

| stat    on           | switch   firstpvn | reorder             |
|----------------------|-------------------|---------------------|
| cleanup              | stat     off      | switch   firstkey   |
| collect  1 0 10      |                   | stat     off        |
| test     %P ne 0000  |                   |                     |

TABLE 3-90

PROCEDURE DATABASE LISTING

DATABASE PREFIX: cur

Procedure: strtrtec

| stat     on          | switch   firstpvn | reorder              |
| cleanup              | stat     off      | switch   firstkey    |
| can_msg  rtectone    |                   | stat     off         |
| receive  1 0 10      |                   |                      |
| test     %P ne 0000  |                   |                      |

TABLE 3-91

Procedure: strttalk

| stat   on  |   |   |
| talk       |   |   |
| stat   off |   |   |

TABLE 3-92

Procedure: strttrnk

| stat     on        |   | reorder |
| answer             |   |         |
| cleanup            |   |         |
| receive  1 0 10    |   |         |
| switch   firstkey  |   |         |
| stat     off       |   |         |

TABLE 3-93

PROCEDURE DATABASE LISTING

DATABASE PREFIX: cur

Procedure: testgab

```
|test     conf $0          |                        |return   0
|set      2 1              |                        |
|test     cnfl $0          |announce $0fl           |
|                          |return   0              |
|announce $0               |                        |
|announce gabprmpt         |                        |
|set      5                |                        |
|collect  1 5 2            |                        |return   0
|return   1                |                        |
```

TABLE 3-94

Procedure: testgabs

```
|set      2 0              |                        |
|testgab  gab1             |conngab  gab1           |
|testgab  gab2             |conngab  gab2           |
|test     $2 eq 0          |announce gabnone        |
|                          |return   0              |
|announce gabloop          |                        |
|collect  1 5 5            |                        |return   0
|jump                      |                        |
```

TABLE 3-95

Procedure: try911

```
|test     x$0 eq x00000000 |return   0              |
|set      5 $1             |                        |
|set      0 1$0            |                        |
|route    0 y int_911      |                        |
```

TABLE 3-96

PROCEDURE DATABASE LISTING

DATABASE PREFIX: cur

Procedure: tryonc

| | | |
|---|---|---|
| test    x$0 eq x<br>set     0 1$0<br>route   0 y int_q | return   0 | |

TABLE 3-97

Procedure: valb3

| | | |
|---|---|---|
| set     7 @sub %6 2 1<br>test    %7 eq 1<br><br>getscp  B3 %3 %N%L<br>test    %5 eq 0<br><br>return  1 | can_msg  b3_orig<br>return   0 | can_msg  b3_term<br>return   0 |

TABLE 3-98

Procedure: valccnup

| | | |
|---|---|---|
| free    RS<br>valcc | | |

TABLE 3-99

PROCEDURE DATABASE LISTING

DATABASE PREFIX: cur

Procedure: valcoll

```
+-------------------------------+----------------------------+----------------------------
|set      7 @sub %6 1 1         |                            |
|test     %7 eq 1               |can_msg    col_orig         |
|                               |return     0                |
|getscp   COL %0 %N%L           |                            |
|test     %5 eq 0               |                            |can_msg    col_term
|                               |                            |return     0
|return   1                     |                            |
|                               |                            |
|                               |                            |
|                               |                            |
+-------------------------------+----------------------------+----------------------------
```

TABLE 3-100

What is claimed is:

1. A method for allowing an administrator of a telephone system to provide new services to a plurality of terminating means in a telephone network by generating a response event in the system in response to a request event to control the operation of the terminating means connected to the telephone network through interposed server means, comprising the steps of:
   monitoring by the server means for the occurrence of the request event initiated by any one of the terminating means;
   detecting the request event and processing the request event with processor means coupled to said server means, said processor means including a directly accessible database for storing state transition rules, said processing step including the steps of directly accessing from said database a stored state transition rule corresponding to the request event and providing control information corresponding to the response event in accordance with said state transition rule;
   activating the server means in accordance with said control information corresponding to the response event for communication to the terminating means; and
   when invoked by the administrator through means for directly accessing said database, modifying said state transition rules to provide the new services without reconfiguring said server means.

2. The method of claim 1 wherein the step of providing control information includes the step of translating said database stored rule into a corresponding primitive server instruction for activating said server means.

3. The method of claim 2 wherein the step of translating said database stored rule includes interpreting said state transition rule into a set of program instructions.

4. The method of claim 2 comprising the further steps of accessing and translating a plurality of said state transition rules stored in said database, said plurality of rules adapted to activate said server means to fully define a telephone service.

5. The method of claim 4 wherein the step of accessing and translating a plurality of rules is preceded by a step of accessing a state transition rule which indicates which plurality of rules to access.

6. The method of claim 1 further comprising the step of inserting additional state transition rules into the database.

7. The method of claim 1 wherein said state transition rules are provided with a return variable and further comprising the steps of:
   setting the value of said return variable in accordance with said request event;
   determining the value of the return variable of the state transition rule; and
   extracting a further state transition rule in accordance with the determined value.

8. The method of claim 1 wherein the step of processing the request event further comprises the steps of:
   selecting one of a plurality of records within the database in accordance with the request event;
   selecting one of a plurality of lines within the selected record in accordance with the request event, each line containing a primitive;
   translating the selected primitive into a predetermined program code;
   determining a command packet in accordance with the program code; and
   transmitting the command packet to the server means.

9. A method for generating a response event in a telephone system in response to a request event to control the operation of a plurality of terminating means connected to server means, comprising the steps of:
   monitoring by the server means for the occurrence of the request event initiated by any one of the terminating means;
   detecting the request event and processing the request event with processor means coupled to said server means, said processor means including a directly accessible database for storing state transition rules, said processing step including the steps of directly accessing from said database a stored state transition rule corresponding to the request event and providing control information corresponding to the response event in accordance with said state transition rule;
   activating the server means in accordance with said control information corresponding to the response event for communication to the terminating means,
   accessing an external database not directly accessible by said processor in accordance with said state transition rule, said external database storing further state transition rules;
   extracting from said external database an externally stored state transition rule;
   providing additional control information corresponding to an additional response event in accordance with said externally stored state transition rule; and
   further activating said server means in accordance with said additional control information.

10. A telephone system for allowing a user to provide new services to a plurality of terminating means in a telephone network comprising:

server means connected to said terminating means for connecting said terminating means to the telephone network, said server means having program sequences for controllig its operation and means including certain of said program sequences for monitoring the occurrence of a request event at any one of said terminating means, and processor means distinct from said server means for controlling said server means, said processor means including directly accessible database storage means for storing state transition rules, means for accessing said database storage means to extract from said database storage means a state transition rule corresponding to the request event, for executing said rule to provide control information corresponding to the response event, and for returning information to said terminating means in response to said control information, and means directly accessible by the user for changing said state transition rules to modify the services available to the user without changing the program sequences of said server means.

11. The telephone system of claim 10 wherein said means for changing said state transition rules comprises database management means.

12. A method for allowing an administrator of a telephone system to provide new services to a plurality of terminating means in a telephone network by generating a response event in the system in response to a request event to control the operation of the terminating means connected to the telephone network through a first of a plurality of server means, comprising the steps of:

monitoring by the first server means for the occurrence of the request event initiated by any one of the terminating means;

detecting and processing the request event, said processing step including the steps of accessing a directly accessible database storing state transition rules, extracting from said database a stored state transition rule corresponding to the request event;

providing control information to said first server means corresponding to the response event in accordance with said state transition rules;

transmitting control information from said first server means to another server means in accordance with said control information; and activating said additional server means in accordance with said transmitted control information for controlling the additional server means.

13. The method of claim 12 wherein the step of controlling said additional server means includes the step of controlling further terminating means coupled to said additional server means.

14. The method of claim 12 wherein the step of controlling said additional server means includes the step of routing said control information through said additional server means.

15. A method for allowing an administrator of a telephone system to provide new services to a plurality of terminating means in a telephone network by generating a response event in the system in response to a request event to control the operation of the terminating means connected to the telephone network through interposed server means having first processing means and program sequences for controlling the operation of said server means, said method comprising the steps of:

monitoring by the server means for the occurrence of the request event initiated by the terminating means;

detecting the request event by the server means;

transmitting request information from the server means to said processor means having a directly accessible database for storing state transition rules;

accessing said database by said second processor means and extracting from said database a state transition rule corresponding to the request event;

transmitting said state transition rule from said second processor means to said first processor means;

producing by said first processor means control information corresponding to the response event in accordance with said externally stored state transition rule;

activating said server means in accordance with said control information corresponding to the response event for controlling the terminating means; and when prompted by the administrator through means for directly accessing said database, modifying said state transition rules to provide the new services without modifying said program sequences.

16. A method for generating a response event in a telephone system in response to a request event to control the operation of a plurality of terminating means connected to server means, said method comprising the steps of:

monitoring by the server means for the occurrence of the request event initiated by any of the terminating means;

upon detection of the request event, processing the request event with processor means coupled to said server means, said processor means including a directly accessible database for storing state transition procedures, said processing step comprising the step of accessing said directly accessible database storing state transition rules, and extracting from said directly accessible database a directly accessible state transition rule corresponding to the request event;

accessing an external database not directly accessible to said processor means in accordance with said directly accessible state transition rule, said external database storing further state transition rules;

extracting from said external database an externally stored state transition rule;

providing control information corresponding to the response event in accordance with said externally stored state transition rule; and activating said server means in accordance with said control information corresponding to the response event for controlling the terminating means.

17. A system for allowing a user of a telephone system to provide new services to a plurality of terminating means in a telephone network by generating a response event in the telephone system in response to a request event to control the operation of the terminating means connected to the telephone network through interposed server means, comprising:

means for monitoring by the server means for the occurrence of the request event initiated by any one of the terminating means;

processor means coupled to said server means for detecting and processing the request event, said processor means including a directly accessible database for storing state transition rules, means for directly accessing from said database a stored state transition rule corresponding to the request event, and means for providing control information corresponding to the response event in accordance with said state transition rule;

means for activating said server means in accordance with said control information corresponding to the response event for controlling the terminating means; and means for directly accessing said database and for modifying said state transition rules, when invoked by the user, to provide the new services without reconfiguring said server means.

18. The system of claim 17 in which there is provided means for translating said database stored rule into a corresponding primitive server instruction for activating said server means.

19. The system of claim 18 in which there is provided means for interpreting said state transition rule into a set of program instructions.

20. The system of claim 18 further comprising means for accessing and translating a plurality of state transition rules stored in said database said plurality of rules adapted to activate said server means to fully define a telephone service.

21. The system of claim 20 in which there is provided means for accessing a state transition rule which indicates which plurality of rules to access.

22. The system of claim 17 further comprising means for inserting additional state transition rules into the database.

23. The system of claim 17 wherein said state transition rules are provided with a return variable and further comprising:
means for setting the value of said return variable in accordance with said request events;
means for determining the value of the return variable of the state transition rule; and
means for extracting a further state transition rule in accordance with the determined value.

24. The system of claim 17 in which there is provided:
means for selecting one of a plurality of records within the database in accordance with the request event;
means for selecting one of a plurality of lines within the selected record in accordance with the request event, each line containing a primitive;
means for translating the selected primitive into a predetermined program code;
means for determining a command packet in accordance with the program code; and
means for transmitting the command packet to the server means.

25. A system for generating a response event in a telephone system in response to a request event to control the operation of a plurality of terminating means connected to server means, comprising:
means for monitoring by the server means for the occurrence of the request event initiated by any one of the terminating means;
processor means coupled to said server means for detecting and processing the request event, said processor means including a directly accessible database for storing state transition rules, means for directly accessing from said database a stored state transition rule corresponding to the request event, and means for providing control information corresponding to the response event in accordance with said state transition rule;
means for activating said server means in accordance with said control information corresponding to the response event for controlling the terminating means;
means for accessing an external database in accordance with said state transition rule, said external database storing further state transition rules;
means for extracting from said external database an externally stored state transition rule;
means for providing further control information corresponding to a further response event in accordance with said externally stored state transition rule; and
means for further activating said server means in accordance with said further control information.

26. A method for allowing a user to provide new telephone services to a plurality of terminating means in a telephone network comprising the steps of:
connecting server means to said terminating means and to the telephone network, said server means having program sequences for controlling its operation and means including certain of said program sequences for monitoring the occurrence of a request event at any one of said terminating means, and processor means distinct from said server means;
controlling said server means with said controlling step including accessing directly accessible database storage means storing state transition rules,
said accessing step including extracting from said database storage means a state transition corresponding to the request event, executing said rule to provide control information corresponding to the response event, and returning information to said terminating means in response to said control information, and
modifying the service available to the user without changing the program sequences of the server means by changing said state transition rules.

27. The method of claim 26 wherein the step of changing said state transition rules comprises changing records within said database using database management means.

28. A system for allowing an administrator of a telephone system to provide new services to a plurality of terminating means in a telephone network by generating a response event in the system in response to a request event to control the operation of the terminating means connected to the telephone network through a first of a plurality of server means, comprising:
means for monitoring by the first server means for the occurrence of the request event initiated by any one of the terminating means;
processor means coupled to said server means for detecting and processing the request event, said processing means including means for accessing a directly accessible database storing state transition rules and extracting from said database a stored state transition rule corresponding to the request event;
means for providing control information to said first server means, said control information corresponding to the response event in accordance with said state transition rules;

means for transmitting said control information from said first server means to another server means in accordance with said control information; and means for activating said additional server means in accordance with said transmitted control information for controlling the additional server means.

29. The system of claim 28 in which there is provided means for controlling further terminating means coupled to said additional server means.

30. The system of claim 28 in which there is provided means for routing said control information through said additional server means.

31. A system for allowing a user of a telephone system to provide new services to a plurality of terminating means in a telephone network by generating a response event in the telephone system in response to a request event to control the operation of the terminating means connected to the telephone network through interposed server means having first processing means, said system comprising:

means for monitoring by the server means for the occurrence of the request event initiated by the terminating means;

means for detecting the request event by the server means;

means for transmitting request information from the server means to second processor means, said second processor means having a directly accessible database for storing state transition rules;

means for accessing said database by said second processor means and extracting from said database a state transition rule corresponding to the request event;

means for transitting said state transition rule from said second processor means to said first processor means;

said first processor means including means for producing control information corresponding to the response event in accordance with said state transition rule;

means for activating said server means in accordance with said control information corresponding to the response event for controlling the terminating means; and means for directly accessing said database and for modifying said state transition rules, when invoked by the user, to provide the new services without reconfiguring said server means.

32. A system for generating a response event in a telephone system in response to a request event to control the operation of a plurality of terminating means connected to server means, said system comprising:

means for monitoring by the server means for the occurrence of the request event initiated by any of the terminating means;

means for detecting and processing the request event, said processing means comprising means for accessing a directly accessible database storing state transition rules, and means for extracting from said directly accessible database a directly accessible state transition rule corresponding to the request event;

means for accessing an external database in accordance with said directly accessible state transition rule, said external database storing further state transition rules;

means for extracting from said external database an externally stored state transition rule;

means for providing control information corresponding to the response event in accordance with said externally stored state transition rule; and means for activating said server means in accordance with said control information corresponding to the response event for controlling the terminating means.

33. A method for allowing a user of a telephone system to provide new services to a plurality of terminating means in a telephone network, the method comprising interconnecting the terminating means to the telephone network through interposed server means controlling the operation of said server means with program sequences stored in said server means, monitoring by said server means for the occurrence of a request event at any one of the terminating means using certain of said program sequences, controlling said server means with processor means distinct from said server means, said processor controlling step including the steps of storing in directly accessible storage means state transition rules, accessing said database storage means to extract from said database storage means a state transition rule corresponding to the request event, executing said rule to provide control information corresponding to a response event, returning information to said terminating means in response to said control information, and when invoked by the user, changing said state transition rules through means for directly accessing said processor means to modify the services without changing said program sequences stored in said server means.

* * * * *

UNITED STATES PATENT AND TRADEMARK OFFICE
CERTIFICATE OF CORRECTION

PATENT NO.  :  4,782,517

DATED       :  November 1, 1988

INVENTOR(S) :  J. J. Bernardis - C. F. Fowler - B. K. Schwartz

It is certified that error appears in the above-identified patent and that said Letters Patent is hereby corrected as shown below:

```
Column 11, line 13, "80 and 82" should read --80 and 88--.
Column 13, line 64, "timer" should read --time--.
Column 15, line 30, "of" should read --or--.
Column 16, line 53, "Table 3-4" should read --Table 3-14--.
Column 19, line 53, "line 1" should read --line of--.
Column 155, line 61, "bya" should read --by a --.
Column 157, line 7, "controllig"  should read --controlling--.
Column 158, line 9, "said" should read --second--.
Column 161, line 34, "transitting" should read --transmitting--.
```

Signed and Sealed this

Sixth Day of October, 1992

Attest:

DOUGLAS B. COMER

Attesting Officer        Acting Commissioner of Patents and Trademarks